United States Patent
Kimura et al.

(10) Patent No.: US 9,315,330 B2
(45) Date of Patent: Apr. 19, 2016

(54) VIBRATION DEVICE, ARTICLE CONVEYANCE DEVICE, AND ARTICLE SORTING DEVICE

(75) Inventors: Tetsuyuki Kimura, Tokyo (JP); Yasushi Muragishi, Tokyo (JP)

(73) Assignee: SINFONIA TECHNOLOGY CO., LTD., Tokyo (JP)

( * ) Notice: Subject to any disclaimer, the term of this patent is extended or adjusted under 35 U.S.C. 154(b) by 89 days.

(21) Appl. No.: 14/129,489

(22) PCT Filed: May 31, 2012

(86) PCT No.: PCT/JP2012/064064
§ 371 (c)(1),
(2), (4) Date: Dec. 26, 2013

(87) PCT Pub. No.: WO2013/008553
PCT Pub. Date: Jan. 17, 2013

(65) Prior Publication Data
US 2014/0190791 A1    Jul. 10, 2014

(30) Foreign Application Priority Data

Jul. 8, 2011  (JP) ................... 2011-152340
Dec. 12, 2011 (JP) ................... 2011-271098

(51) Int. Cl.
| | |
|---|---|
| B65G 27/18 | (2006.01) |
| B65G 27/26 | (2006.01) |
| B65G 27/32 | (2006.01) |
| B65G 47/26 | (2006.01) |
| B65G 27/24 | (2006.01) |
| B07B 13/11 | (2006.01) |
| B06B 1/06 | (2006.01) |

(52) U.S. Cl.
CPC .............. *B65G 27/18* (2013.01); *B06B 1/0603* (2013.01); *B07B 13/113* (2013.01); *B65G 27/26* (2013.01); *B65G 27/32* (2013.01); *Y10T 74/18856* (2015.01)

(58) Field of Classification Search
None
See application file for complete search history.

(56) References Cited

U.S. PATENT DOCUMENTS

| | | | | |
|---|---|---|---|---|
| 5,205,395 A | * | 4/1993 | Bruno et al. ........... | B65G 27/32 198/389 |
| 2003/0234155 A1 | | 12/2003 | Kanamori et al. | |
| 2004/0112712 A1 | | 6/2004 | Brooks et al. | |

FOREIGN PATENT DOCUMENTS

| | | |
|---|---|---|
| JP | 61-75716 A | 4/1986 |
| JP | 2-43118 A | 2/1990 |

(Continued)

OTHER PUBLICATIONS

International Search Report dated Aug. 21, 2012 issued in corresponding application No. PCT/JP2012/064064.

*Primary Examiner* — Kavel Singh
(74) *Attorney, Agent, or Firm* — Westerman, Hattori, Daniels & Adrian, LLP

(57) ABSTRACT

A vibration device includes a base, a movable bench elastically supported with respect to the base, a first horizontal excitation unit that vibrates the movable bench in a first horizontal direction, a second horizontal excitation unit that vibrates the movable bench in a second horizontal direction that crosses the first horizontal direction, a vertical excitation unit that vibrates the movable bench in a vertical direction, and first and second middle benches between the base and the movable bench, wherein first to third plate-like spring members elastically connect the base, the first and second middle benches, and the movable bench sequentially in the first horizontal direction, the second horizontal direction, and the vertical direction.

7 Claims, 38 Drawing Sheets

(56) References Cited

FOREIGN PATENT DOCUMENTS

| | | |
|---|---|---|
| JP | 8-116683 A | 5/1996 |
| JP | 11-199026 A | 7/1999 |
| JP | 2004-75387 A | 3/2004 |
| JP | 2005-255351 A | 9/2005 |
| JP | 2008-168956 A | 7/2008 |

* cited by examiner

Fig. 14
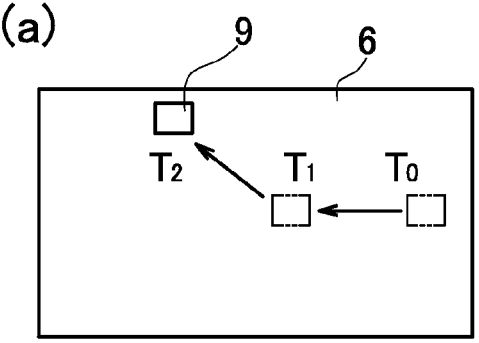
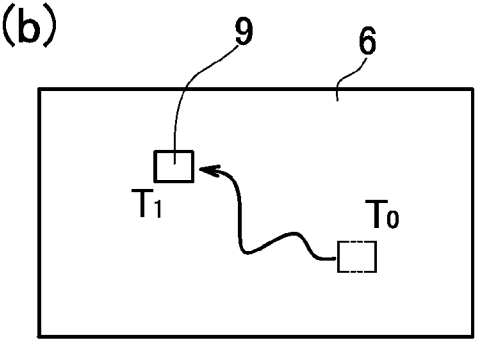
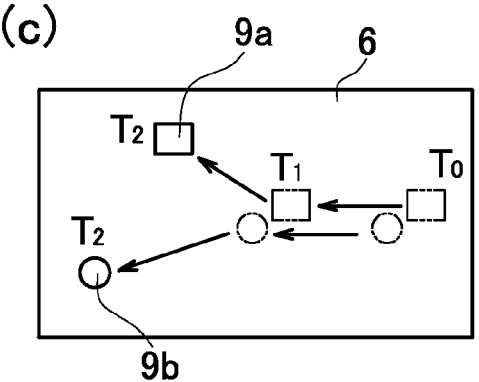
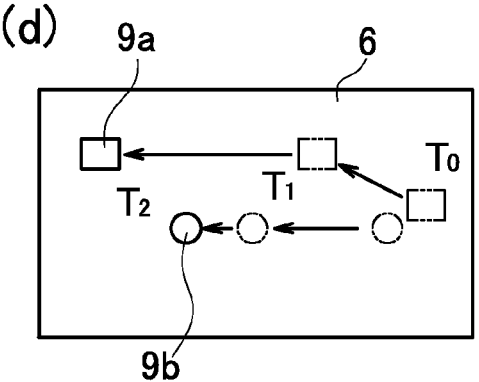
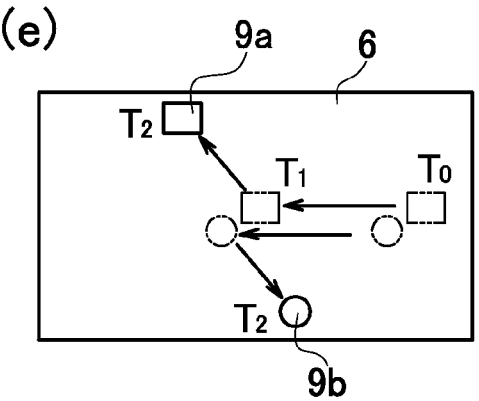
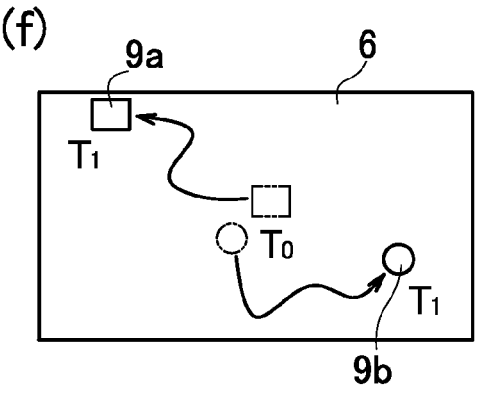

Fig. 18

(a) $\phi x = \phi 21, \phi y = \phi 22$

|  | W21($\mu$21) | W22($\mu$22) | W23($\mu$23) |
|---|---|---|---|
| Vx | + | − | − |
| Vy | + | + | − |
| MOVEMENT REGION | D | C | A |

(b) $\phi x = \phi 21, \phi y = \phi 24$

|  | W21($\mu$21) | W22($\mu$22) | W23($\mu$23) |
|---|---|---|---|
| Vx | + | − | − |
| Vy | − | − | + |
| MOVEMENT REGION | B | A | C |

(c) $\phi x = \phi 22, \phi y = \phi 21$

|  | W21($\mu$21) | W22($\mu$22) | W23($\mu$23) |
|---|---|---|---|
| Vx | + | + | − |
| Vy | + | − | − |
| MOVEMENT REGION | D | B | A |

(d) $\phi x = \phi 22, \phi y = \phi 23$

|  | W21($\mu$21) | W22($\mu$22) | W23($\mu$23) |
|---|---|---|---|
| Vx | + | + | − |
| Vy | − | + | + |
| MOVEMENT REGION | B | D | C |

Fig. 19

(e) $\phi x = \phi 23, \phi y = \phi 22$

|  | W21($\mu$21) | W22($\mu$22) | W23($\mu$23) |
|---|---|---|---|
| Vx | − | + | + |
| Vy | + | + | − |
| MOVEMENT REGION | C | D | B |

(f) $\phi x = \phi 23, \phi y = \phi 24$

|  | W21($\mu$21) | W22($\mu$22) | W23($\mu$23) |
|---|---|---|---|
| Vx | − | + | + |
| Vy | − | − | + |
| MOVEMENT REGION | A | B | D |

(g) $\phi x = \phi 24, \phi y = \phi 21$

|  | W21($\mu$21) | W22($\mu$22) | W23($\mu$23) |
|---|---|---|---|
| Vx | − | − | + |
| Vy | + | − | − |
| MOVEMENT REGION | C | A | B |

(h) $\phi x = \phi 24, \phi y = \phi 23$

|  | W21($\mu$21) | W22($\mu$22) | W23($\mu$23) |
|---|---|---|---|
| Vx | − | − | + |
| Vy | − | + | + |
| MOVEMENT REGION | A | C | D |

Fig. 20
(a) $\phi x = \phi 21$, $\phi y = \phi 22$
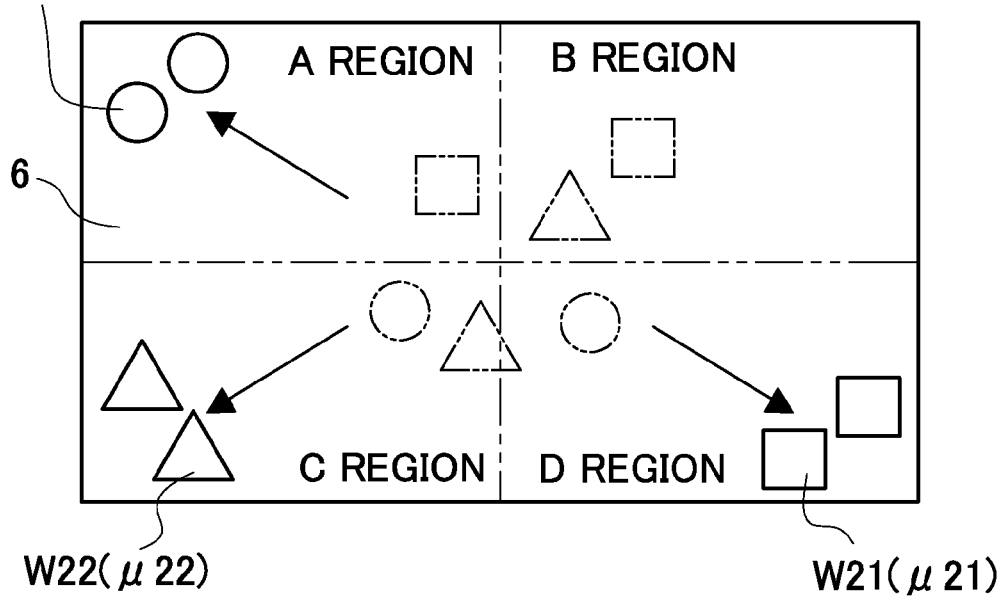
(b) $\phi x = \phi 21$, $\phi y = \phi 24$
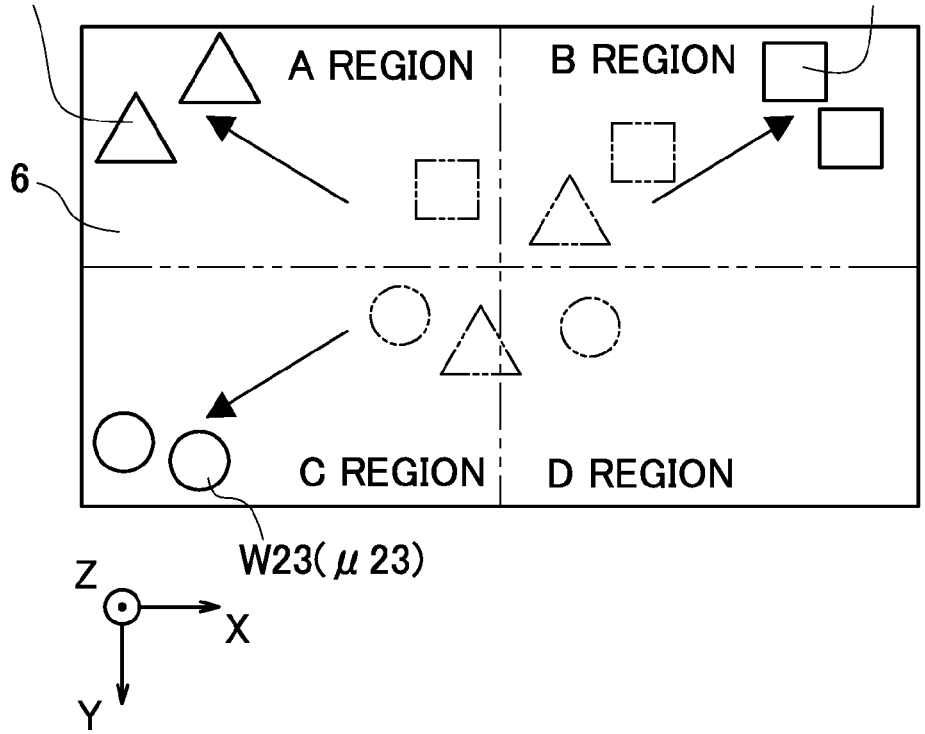

VIBRATION DEVICE, ARTICLE CONVEYANCE DEVICE, AND ARTICLE SORTING DEVICE

TECHNICAL FIELD

The present invention relates to an article conveyance device that conveys an article on a movable bench by vibration of the movable bench, an article sorting device that sorts a plurality of articles on the movable bench, and a vibration device applicable to the article conveyance device and the article sorting device.

BACKGROUND ART

Conventionally, as an article conveyance device that can convey an article and can arbitrarily change a conveyance direction on a conveyance line of the article, a various types of devices are known.

For example, as Patent Literature 1, there is a type of article conveyance device in which a large number of electrostatic actuators are disposed in a lattice shape on a conveyance surface of an article. In this device, the article is moved on a carrier, by providing a large number of square-shaped stators on the conveyance surface, and suspending the carrier therein via a spring member in advance, and by operating an attraction electrode provided at a bottom surface and a lateral face within the stator and thereby controlling operation of the carrier.

Also, Patent Literature 2 discloses a technique, in which a large number of small rollers are disposed on the conveyance surface of an article such that a rotation axis becomes parallel to the conveyance surface, and the rotation and direction of the rollers are controlled, thereby the conveyance direction of the article to be loaded on the rollers is controlled.

Also, Patent Literature 3 discloses a technique of controlling the conveyance direction of an article by alternately disposing rollers having rotation axes orthogonal to each other on the conveyance surface and by controlling the rotation of the rollers.

The article conveyance devices according to the conventional technologies of the Patent Literatures 1 to 3 are configured from a large number of equipments such as the electrostatic actuator and the small roller, and need to drive the equipments simultaneously, thereby the configuration becomes complex and a control scheme become also complex. Therefore, manufacturing costs and maintenance expenses become higher, and furthermore problems with the equipment are also easily caused. Also, in such configurations, since concavities and convexities are caused at the conveyance surface with which the article comes into contact, it becomes difficult to convey the article as the article becomes smaller with respect to the concavities and convexities. Thus, it is difficult to enable conveyance of articles having varying sizes from small to large by using a single article conveyance device.

As a device in which such problems do not happen, there is also suggested an article conveyance device that conveys the article by imparting vibration to the movable bench having the conveyance surface for loading the article.

For example, Patent Literature 4 discloses a technique of differing the conveyance direction by imparting vibrations having the same frequency in the vertical and horizontal directions with respect to a movable body (movable bench) that has a trajectory for the article conveyance to cause elliptical vibrations, and by setting a phase difference of the vibrations in each direction in accordance with the coefficient of friction. In this article conveyance device, since the conveyance surface on the movable bench can be configured as a plane, articles with a wide variety of shapes and sizes can be conveyed. Also, this article conveyance device has many advantages in terms of downsizing and the manufacturing cost, because both of a vibration device that is a mechanical device part, and a control system for controlling the vibration of this vibration device can be easily configured.

In addition, this article conveyance device can also be used as an article sorting device for sorting a plurality of types of articles having different coefficients of friction by differing only the control system, because the article conveyance device can control the conveyance direction in accordance with the coefficient of friction of the article. Similarly to the article conveyance device, this case also has many advantages in terms of the downsizing and the manufacturing cost because the simple configuration can be provided.

In the present invention, the above-described article conveyance device and article sorting device are referred together to as an article moving device which includes a device having a function of either conveying or sorting an article or a device having both functions. Also, in the present specification, a mechanical device part capable of being used commonly to these devices is referred to as a vibration device.

CITATION LIST

Patent Literature

[PTL 1] Japanese Unexamined Patent Application Publication No. H08-116683
[PTL 2] Japanese Unexamined Patent Application Publication No. 2004-75387
[PTL 3] Japanese Unexamined Patent Application Publication No. 2008-168956
[PTL 4] Japanese Unexamined Patent Application Publication No. 2005-255351

SUMMARY OF INVENTION

Technical Problem

However, the above-described vibration device causes the elliptical vibration to the movable bench having the conveyance surface by differing the phase difference between vibrations in two directions, and performs the conveyance or sorting of articles by utilizing the elliptical vibration, and the direction of the caused elliptical vibration is limited, resulting in that flexibility of directions to which the articles are made to be moved is low.

Thus, increasing the flexibility of movement directions of articles can be thought by further developing the vibration device described in the Patent Literature 4 so as to configure the device such that the movable bench having the conveyance surface can be vibrated not only in two directions, but also vibrated three-dimensionally and independently in three directions that are different from each other.

However, in order to enable the movable bench to be vibrated independently in the three directions, since a means that elastically supports the movable bench with respect to the three directions respectively, and a means for imparting the vibrations are needed, the configuration is complicated. Also, since there is a need to incorporate the above-described means under the movable bench, the height up to the conveyance surface is increased and the barycentric position tends to be high, and pitching and rolling of the movable bench are easily caused and therefore it can be thought that controls for moving the articles become difficult.

In addition, when using the vibration device according to the above-described Patent Literature 4, so as not to propagate this vibration to an installation surface, generally, a vibration isolation spring is provided at an under surface of a base and overall vibration device is put into a state of being elastically supported with respect to the installation surface. Thus, the transmission of vibrations to the surrounding devices and the generation of noise are suppressed, and the surrounding environment can be maintained properly.

However, in such a configuration, when the excitation force is allowed to act on the movable bench, the rotation moment is generated between the base and the movable bench, and the attitude of the base supported via the vibration isolation spring becomes an unstable state. Therefore, vibrations of the movable bench elastically supported with respect to a fixed bench become also unstable, and it can also be thought that desired vibrations cannot be caused to the movable bench.

In order to resolve the above problems, it is an object of the first invention in the present application to provide a vibration device capable of elastically supporting the movable bench effectively with a simple configuration, capable of reducing the height up to the conveyance surface, and capable of suppressing the pitching and rolling, and an article conveyance device and an article sorting device as an article moving device having excellent controllability and using the vibration device.

In addition, it is an object of the second invention in the present application to provide a vibration device capable of causing more stable vibrations to the movable bench by stabilizing the attitude of the base when the excitation force is allowed to act on the movable bench, with a simple configuration, and an article conveyance device and an article sorting device as an article moving device having excellent controllability and using this vibration device.

Solution to Problem

The present invention adopts the following means in order to achieve this object.

That is, a vibration device of the first invention is a vibration device comprising a base, a movable bench elastically supported with respect to the base, a first horizontal excitation means that vibrates the movable bench in a first horizontal direction, a second horizontal excitation means that vibrates the movable bench in a second horizontal direction that crosses the first horizontal direction, and a vertical excitation means that vibrates the movable bench in a vertical direction, the vibration device comprising: a first middle bench and a second middle bench between the base and the movable bench, and the vibration device including: a first horizontal elastic support means, a second horizontal elastic support means, and a vertical elastic support means that elastically connect the base, the first middle bench, the second middle bench, and the movable bench sequentially in the first horizontal direction, the second horizontal direction, and the vertical direction, wherein the first horizontal elastic support means is configured from a first plate-like spring member with a thickness direction approximately matching to the first horizontal direction and with a longitudinal direction arranged in a horizontal direction, the second horizontal elastic support means is configured from a second plate-like spring member with a thickness direction approximately matching to the second horizontal direction and with a longitudinal direction arranged in a horizontal direction, and the vertical elastic support means is configured from a third plate-like spring member with a thickness direction approximately matching to the vertical direction and with a longitudinal direction arranged in a horizontal direction.

With this configuration, the movable bench can be elastically supported in three directions by the plate-like spring members provided respectively in the three directions, and the plate-like spring members can control the vibrations independently without having an impact on each other because of having large rigidity in directions other than the plate thickness direction in which these members elastically support respectively. In addition, since these plate-like spring members are arranged in a direction where the longitudinal direction is horizontal, the height from the base to the movable bench can be suppressed, and the rolling and pitching of the movable bench can be suppressed.

Also, in order not to cause deformation in a twisted mode of each plate-like spring member while regulating translational movement in the three directions as described above, it is favorably configured such that a vibration device comprises a base, a movable bench elastically supported with respect to the base, a first horizontal excitation means that vibrates the movable bench in a first horizontal direction, a second horizontal excitation means that vibrates the movable bench in a second horizontal direction that crosses the first horizontal direction, and a vertical excitation means that vibrates the movable bench in a vertical direction, the vibration device comprises a first middle bench and a second middle bench between the base and the movable bench, the vibration device includes a first horizontal elastic support means, a second horizontal elastic support means, and a vertical elastic support means that elastically connect the base, the first middle bench, the second middle bench, and the movable bench sequentially in the first horizontal direction, the second horizontal direction, and the vertical direction, the first horizontal elastic support means is configured from a first plate-like spring member with a thickness direction approximately matching to the first horizontal direction and with a longitudinal direction arranged in a horizontal direction, the second horizontal elastic support means is configured from a second plate-like spring member with a thickness direction approximately matching to the second horizontal direction and with a longitudinal direction arranged in a horizontal direction, the vertical elastic support means is configured from a third plate-like spring member with a thickness direction approximately matching to the vertical direction and with a longitudinal direction arranged in a horizontal direction, and at least any of the first to third plate-like spring members are provided in parallel in plural while being separated at a predetermined distance.

Also, in order to further simplify and render compact the configuration, it is effective that the elastic support means and the excitation means are integrated, and thereby, it is favorably configured such that a vibration device comprises a base, a movable bench elastically supported with respect to the base, a first horizontal excitation means that vibrates the movable bench in a first horizontal direction, a second horizontal excitation means that vibrates the movable bench in a second horizontal direction that crosses the first horizontal direction, and a vertical excitation means that vibrates the movable bench in a vertical direction, the vibration device comprises a first middle bench and a second middle bench between the base and the movable bench, the vibration device includes a first horizontal elastic support means, a second horizontal elastic support means, and a vertical elastic support means that elastically connect the base, the first middle bench, the second middle bench, and the movable bench sequentially in the first horizontal direction, the second horizontal direction, and the vertical direction, the first horizontal elastic support means is configured from a first plate-like spring member with a thickness direction approximately matching to the first horizontal direction and with a longitudinal direction arranged in a horizontal direction, the second horizontal elastic support means is configured from a second plate-like spring member with a thickness direction approximately matching to the second horizontal direction and with a longitudinal direction arranged in a horizontal direction, the vertical elastic support means is configured from a third plate-like spring member with a thickness direction approximately matching to the vertical direction and with a longitudinal direction arranged in a horizontal direction, the first and second horizontal excitation means and the vertical excitation means are piezoelectric elements that are stuck on at least one face of the first to third plate-like spring members, and the first to third plate-like spring members are vibrated by applying sinusoidal voltage to these piezoelectric elements to cause periodic elongation.

In addition, in order not to cause the deformation in the twisted mode of each plate-like spring member while regulating translational movement, in the three directions, of the movable bench and in order to further simplify and render compact the configuration by integrating the elastic support means and the excitation means, it is favorably configured such that a vibration device comprises a base, a movable bench elastically supported with respect to the base, a first horizontal excitation means that vibrates the movable bench in a first horizontal direction, a second horizontal excitation means that vibrates the movable bench in a second horizontal direction that crosses the first horizontal direction, and a vertical excitation means that vibrates the movable bench in a vertical direction, the vibration device comprises a first middle bench and a second middle bench between the base and the movable bench, the vibration device includes a first horizontal elastic support means, a second horizontal elastic support means, and a vertical elastic support means that elastically connect the base, the first middle bench, the second middle bench, and the movable bench sequentially in the first horizontal direction, the second horizontal direction, and the vertical direction, the first horizontal elastic support means is configured from a first plate-like spring member with a thickness direction approximately matching to the first horizontal direction and with a longitudinal direction arranged in a horizontal direction, the second horizontal elastic support means is configured from a second plate-like spring member with a thickness direction approximately matching to the second horizontal direction and with a longitudinal direction arranged in a horizontal direction, the vertical elastic support means is configured from a third plate-like spring member with a thickness direction approximately matching to the vertical direction and with a longitudinal direction arranged in a horizontal direction, at least any of the first to third plate-like spring members are provided in parallel in plural while being separated at a predetermined distance, in addition, the first and second horizontal excitation means and the vertical excitation means are piezoelectric elements that are stuck on at least one face of the first to third plate-like spring members, and the first to third plate-like spring members are vibrated by applying sinusoidal voltage to these piezoelectric elements to cause periodic elongation.

Also, in order to be able to easily perform adjustments by which natural frequency with respect to each direction is made to be separated or closed, it is preferable that the effective length of each plate-like spring member is made to be changeable, and for achieving this, it is favorable that spring seats are provided between at least any of the base and the first middle bench and the first plate-like spring member, and between at least any of the first middle bench and the second middle bench and the second plate-like spring member, respectively, and positions of the spring seats are configured to be changeable with respect to the longitudinal directions of the first and second plate-like spring members, respectively.

Also, the vibration device of the second invention is a vibration device comprising a base supported on a ground surface via a vibration isolation spring, a movable bench elastically supported with respect to the base, a first horizontal excitation means that vibrates the movable bench in a first horizontal direction, a second horizontal excitation means that vibrates the movable bench in a second horizontal direction that crosses the first horizontal direction, and a vertical excitation means that vibrates the movable bench in a vertical direction, wherein the vibration device comprises a first middle bench and a second middle bench between the base and the movable bench, the vibration device includes a plurality of first horizontal elastic support means, a plurality of second horizontal elastic support means, and a plurality of vertical elastic support means that elastically connect the base, the first middle bench, the second middle bench, and the movable bench sequentially in the first horizontal direction, the second horizontal direction, and the vertical direction, and the vibration device is characterized to be configured such that if overall device is supposed as the a first mass body, a second mass body, and a third mass body with the first horizontal elastic support means and the second horizontal elastic support means as boundaries, respective barycentric positions of these mass bodies are almost the same in the vertical direction and horizontal direction.

With this configuration, three-dimensional vibration can be caused to the movable bench by elastically supporting the movable bench in three directions of two horizontal directions and the vertical direction and exciting vibrations in each direction, the rotation moment that occurs in association with excitation of vibrations in the horizontal direction can be suppressed to stabilize the attitude of the base, and vibrations can be correctly caused to the movable bench. In addition, propagation of vibrations with respect to the installation surface can be suppressed, and generation of noise and vibration can be prevented and the work environment can be improved.

In addition, while being based on this configuration, in order to be able to further stabilize the attitude of members to be attached via the horizontal elastic support means and to cause vibrations, it is favorably configured such that a vibration device comprises a base supported on a ground surface via a vibration isolation spring, a movable bench elastically supported with respect to the base, a first horizontal excitation means that vibrates the movable bench in a first horizontal direction, a second horizontal excitation means that vibrates the movable bench in a second horizontal direction that crosses the first horizontal direction, and a vertical excitation means that vibrates the movable bench in a vertical direction, the vibration device comprises a first middle bench and a second middle bench between the base and the movable bench, the vibration device includes a plurality of first horizontal elastic support means, a plurality of second horizontal elastic support means, and a plurality of vertical elastic support means that elastically connect the base, the first middle bench, the second middle bench, and the movable bench sequentially in the first horizontal direction, the second horizontal direction, and the vertical direction, and if overall device is supposed as a first mass body, a second mass body and a third mass body with the first horizontal elastic support means and the second horizontal elastic support means as boundaries, respective barycentric positions of these mass bodies are almost the same in the vertical direction and horizontal direction, and the barycentric position of each mass body and an attachment position of each horizontal elastic support means are almost the same in the vertical direction.

Also, in order to prevent occurrence of unexpected vibrations, such as swivel movement of the movable bench supported by the vertical elastic support means, it is favorably configured such that a vibration device comprises a base supported on a ground surface via a vibration isolation spring, a movable bench elastically supported with respect to the base, a first horizontal excitation means that vibrates the movable bench in a first horizontal direction, a second horizontal excitation means that vibrates the movable bench in a second horizontal direction that crosses the first horizontal direction, and a vertical excitation means that vibrates the movable bench in a vertical direction, the vibration device comprises a first middle bench and a second middle bench between the base and the movable bench, the vibration device includes a plurality of first horizontal elastic support means, a plurality of second horizontal elastic support means, and a plurality of vertical elastic support means that elastically connect the base, the first middle bench, the second middle bench, and the movable bench sequentially in the first horizontal direction, the second horizontal direction, and the vertical direction, and if overall device is supposed as a first mass body, a second mass body, and a third mass body with the first horizontal elastic support means and the second horizontal elastic support means as boundaries, respective barycentric positions of these mass bodies are configured to be almost the same in the vertical direction and horizontal direction, and in addition, the plurality of vertical elastic support means are provided so as to be symmetrical with respect to each excitation direction with the barycentric position of the each mass body as a center, and a counter weight with respect to the movable bench is provided at a position which are symmetrical with sandwiching the vertical elastic support means.

In addition, in order to stabilize the attitude of members to be attached via the horizontal elastic support means, and simultaneously to suppress swivel movement of the movable bench supported by the vertical elastic support means, it is favorably configured such that a vibration device comprises a base supported on a ground surface via a vibration isolation spring, a movable bench elastically supported with respect to the base, a first horizontal excitation means that vibrates the movable bench in a first horizontal direction, a second horizontal excitation means that vibrates the movable bench in a second horizontal direction that crosses the first horizontal direction, and a vertical excitation means that vibrates the movable bench in a vertical direction, the vibration device comprises a first middle bench and a second middle bench between the base and the movable bench, the vibration device includes a plurality of first horizontal elastic support means, a plurality of second horizontal elastic support means, and a plurality of vertical elastic support means that elastically connect the base, the first middle bench, the second middle bench, and the movable bench sequentially in the first horizontal direction, the second horizontal direction, and the vertical direction, and if overall device is supposed as a first mass body, a second mass body, and a third mass body with the first horizontal elastic support means and the second horizontal elastic support means as boundaries, respective barycentric positions of these mass bodies are almost the same in the vertical direction and horizontal direction, the barycentric position of each mass body and an attachment position of each horizontal elastic support means are configured to be almost the same in the vertical direction, in addition, the plurality of vertical elastic support means are provided so as to be symmetrical with respect to each excitation direction with the barycentric position of each mass body as a center, and a counter weight with respect to the movable bench is provided at a position which are symmetrical with sandwiching these vertical elastic support means.

Also, as the other configuration of this second invention, a vibration device comprising a base supported on a ground surface via a vibration isolation spring, a movable bench elastically supported with respect to the base, a horizontal excitation means that vibrates the movable bench in a horizontal direction, and a vertical excitation means that vibrates the movable bench in a vertical direction, the vibration device comprising a middle bench between the base and the movable bench, the vibration device including a plurality of horizontal elastic support means and a plurality of vertical elastic support means that elastically connect the base, the middle bench, and the movable bench sequentially in the horizontal direction and vertical direction, and the vibration device being configured such that if overall device is supposed as two mass bodies with the horizontal elastic support means as a boundary, respective barycentric positions of these mass bodies are almost the same in the vertical direction and horizontal direction, can be given.

Also configured in this way, the barycentric positions of mass bodies which are connected via the horizontal elastic support means, and relatively move in the horizontal direction are almost the same in the vertical direction, and thereby, it is possible to suppress the rotation moment which incidentally occurs by excitation force in the horizontal direction to stabilize the attitude of the base, and to correctly cause vibrations to the movable bench. Also, propagation of vibrations with respect to the installation surface can be suppressed, and generation of noise and vibration can be prevented and the work environment can be improved.

In addition, while being based on this configuration, in order to be able to cause vibrations with further stabilizing the attitude of members to be attached via the horizontal elastic support means, it is favorably configured such that a vibration device comprises a base supported on a ground surface via a vibration isolation spring, a movable bench elastically supported with respect to the base, a horizontal excitation means that vibrates the movable bench in a horizontal direction, and a vertical excitation means that vibrates the movable bench in a vertical direction, the vibration device comprises a middle bench between the base and the movable bench, the vibration device includes a plurality of horizontal elastic support means and a plurality of vertical elastic support means that elastically connect the base, the middle bench, and the movable bench sequentially in the horizontal direction and vertical direction, and if overall device is supposed as two mass bodies with the horizontal elastic support means as a boundary, respective barycentric positions of these mass bodies are almost the same in the vertical direction and horizontal direction, and the barycentric position of each mass body and an attachment position of each horizontal elastic support means are almost the same in the vertical direction.

Also, in order not to occur unexpected vibrations, such as swivel movement of the movable bench supported by the vertical elastic support means, it is favorably configured such that a vibration device comprises a base supported on a ground surface via a vibration isolation spring, a movable bench elastically supported with respect to the base, a horizontal excitation means that vibrates the movable bench in a horizontal direction, and a vertical excitation means that vibrates the movable bench in a vertical direction, the vibration device comprises a middle bench between the base and the movable bench, the vibration device includes a plurality of horizontal elastic support means and a plurality of vertical elastic support means that elastically connect the base, the middle bench, and the movable bench sequentially in the horizontal direction and vertical direction, and if overall device is supposed as two mass bodies with the horizontal elastic support means as a boundary, respective barycentric positions of these mass bodies are configured to be almost the same in the vertical direction and horizontal direction, in addition, the plurality of vertical elastic support means are provided so as to be symmetrical with respect to each excitation direction with the barycentric position of each mass body as a center, and a counter weight with respect to the movable bench is provided at a position which is symmetrical with sandwiching these vertical elastic support means.

In addition, in order to stabilize the attitude of members to be attached via the horizontal elastic support means, and simultaneously to suppress swivel movement of the movable bench supported by the vertical elastic support means, it is favorably configured such that a vibration device comprises a base supported on a ground surface via a vibration isolation spring, a movable bench elastically supported with respect to the base, a horizontal excitation means that vibrates the movable bench in a horizontal direction, and a vertical excitation means that vibrates the movable bench in a vertical direction, the vibration device comprises a middle bench between the base and the movable bench, the vibration device includes a plurality of horizontal elastic support means and a plurality of vertical elastic support means that elastically connect the base, the middle bench, and the movable bench sequentially in the horizontal direction and vertical direction, and if overall device is supposed as two mass bodies with the horizontal elastic support means as a boundary, respective barycentric positions of these mass bodies are almost the same in the vertical direction and horizontal direction, and the barycentric position of each mass body and an attachment position of each horizontal elastic support means are configured to be almost the same in the vertical direction, in addition, the plurality of vertical elastic support means are provided so as to be symmetrical with respect to each excitation direction with the barycentric position of each mass body as a center, and a counter weight with respect to the movable bench is provided at a position which is symmetrical with sandwiching the vertical elastic support means.

Also, when being on the basis of any configuration of the above-described second invention, in order to make the barycentric position of the base higher and to easily match the barycentric position to the other members to be provided on the base, and in order to be able to protect drive devices, such as the excitation means, it is favorable that a peripheral wall part raised from near an outer peripheral edge of the base is provided, and the peripheral wall part is configured to surround the elastic support means and the excitation means, and is configured as a barycentric adjustment member that adjusts the barycentric position of the base.

In order to be configured as an article conveyance device having excellent controllability and being capable of conveying articles on a movable bench in any direction, it is favorably configured such that an article conveyance device that conveys articles loaded on the movable bench by vibrations of the movable bench comprises either of the above-described vibration devices, a vibration control means that controls each excitation means so as to simultaneously generate periodic excitation forces by a plurality of the excitation means which the vibration device has, with a phase difference and at the same frequency, to cause three-dimensional vibration trajectory to the movable bench, and a vibration switching means that switches the amplitude and the phase difference of the periodic excitation forces by the each excitation means.

Also, in order to be configured as an article sorting device having excellent controllability and being capable of sorting a plurality of articles on a movable bench in accordance with the coefficients of friction, it is favorably configured such that an article sorting device that sorts a plurality of articles loaded on a movable bench by vibrations of the movable bench comprises either of the above-described vibration devices, and a vibration control means that controls each excitation means so as to simultaneously generate periodic excitation forces by a plurality of the excitation means which the vibration device has, with a phase difference and at the same frequency, to cause three-dimensional vibration trajectory to the movable bench, and the plurality of articles loaded on the movable bench are simultaneously sorted by setting a phase difference between periodic excitation force by the horizontal excitation means and periodic excitation force by the vertical excitation means, so as to move each article in a different direction on the basis on the magnitude, with respect to a reference coefficient of friction, of coefficient of friction which individual article has, with the predetermined reference coefficient of friction as a boundary.

Effects of Invention

According to the above-explained first invention, it is possible to provide a vibration device capable of effectively and elastically supporting a movable bench in three directions independently while having a simple configuration, and of reducing the height up to the conveyance surface and of suppressing the pitching and rolling of the movable bench, and an article conveyance device and an article sorting device having excellent controllability and using this vibration device. Also, according to the second invention, it is possible to provide a vibration device capable of stabilizing the attitude of a base even in a form in which the base is supported via a vibration isolation spring because the rotation moment that occurs at the time when an excitation force is allowed to act on a movable bench can be suppressed more effectively, capable of further stabilizing vibrations of the movable bench to be supported by the base to improve operation accuracy, and capable of suppressing propagation of vibrations to the installation surface to prevent noise and vibration, for example, to improve the work environment, and an article conveyance device and an article sorting device having excellent controllability and using this vibration device.

BRIEF DESCRIPTION OF DRAWINGS

FIG. 1 is a system configuration diagram of a vibration device according to a first embodiment of the present invention and an article conveyance device using the vibration device.

FIG. 2 is a perspective view of the vibration device.

FIG. 3 is an exploded perspective view of the vibration device.

FIG. 4 is a perspective view illustrating a main part of the vibration device.

FIG. 5 is a plan view illustrating a main part of the vibration device.

FIG. 6 is a front view illustrating a main part of the vibration device.

FIG. 7 is a plan view illustrating when a movable bench in the vibration device is moved in a first horizontal direction.

FIG. 8 is a plan view illustrating when the movable bench in the vibration device is moved in a second horizontal direction.

FIG. 9 is a front view illustrating when the movable bench in the vibration device is moved in a vertical direction.

FIG. 10 is a conceptual diagram illustrating an excitation direction of the vibration device.

FIG. 11 is a diagram illustrating a relationship between the phase difference among periodic excitation forces exerted in each direction in the vibration device and conveyance speed of the articles.

FIG. 12 is a diagram illustrating a relationship among the phase difference among periodic excitation forces exerted in each direction in the vibration device, the conveyance speed of articles, and the coefficient of friction thereof.

FIG. 13 is a diagram illustrating a relationship between the amplitude of the periodic excitation forces exerted in a horizontal direction in the same vibration device and the conveyance speed of the articles.

[FIG. 14] FIGS. 14 (a) through (f) each show a plan view exemplifying a conveyance trajectory for a case that the articles are conveyed using the vibration device.

FIG. 15 is a system configuration diagram of a vibration device according to a second embodiment of the present invention and an article sorting device using the vibration device.

FIG. 16 is a diagram illustrating a relationship between the phase difference among periodic excitation forces exerted in each direction in the vibration device and the movement speed of the articles.

[FIG. 18] FIGS. 18 (a) through (d) are explanatory diagrams illustrating respective movement regions of the plurality of articles having different coefficients of friction, when the phase difference in the X and Y directions is changed by using the vibration device.

[FIG. 19] FIGS. 19 (a) through (d) are explanatory diagrams illustrating respective movement regions of the plurality of articles having different coefficients of friction, when the phase difference in the X and Y directions is changed by using the vibration device.

[FIG. 20] FIGS. 20 (a) and (b) each is a plan view illustrating movement directions of the articles at the time of conditions illustrated in FIGS. 18(a) and 18(b).

FIG. 21 is a perspective view illustrating a vibration device according to a third embodiment of the present invention.

FIG. 22 is a system configuration diagram of a vibration device according to a fourth embodiment of the present invention and an article conveyance device using the vibration device.

FIG. 23 is a perspective view of the vibration device.

FIG. 24 is a plan view of the vibration device.

FIG. 25 is a perspective view in a state where a part of the vibration device is removed.

FIG. 26 is a perspective view illustrating a main part of the vibration device.

FIG. 27 is a plan view illustrating a main part of the vibration device.

FIG. 28 is a cross-sectional arrow view taken along line A-A in FIG. 24.

FIG. 29 is a cross-sectional arrow view taken along line B-B in FIG. 24.

FIG. 30 is a system configuration diagram of a vibration device according to a fifth embodiment of the present invention and an article sorting device using the vibration device.

FIG. 31 is a perspective view of a vibration device according to a sixth embodiment of the present invention.

FIG. 32 is a perspective view in a state where a part of the vibration device is removed.

FIG. 33 is a plan view of the vibration device.

FIG. 34 is a cross-sectional arrow view taken along line A-A in FIG. 33.

FIG. 35 is a perspective view of a vibration device according to a seventh embodiment of the present invention.

FIG. 36 is a perspective view in a state where a part of the vibration device is removed.

FIG. 37 is a plan view of the vibration device.

FIG. 38 is a cross-sectional arrow view taken along line A-A in FIG. 37.

DESCRIPTION OF EMBODIMENTS

Embodiments of the present invention will be explained below with reference to the drawings.

<First Embodiment>

Figure 1:
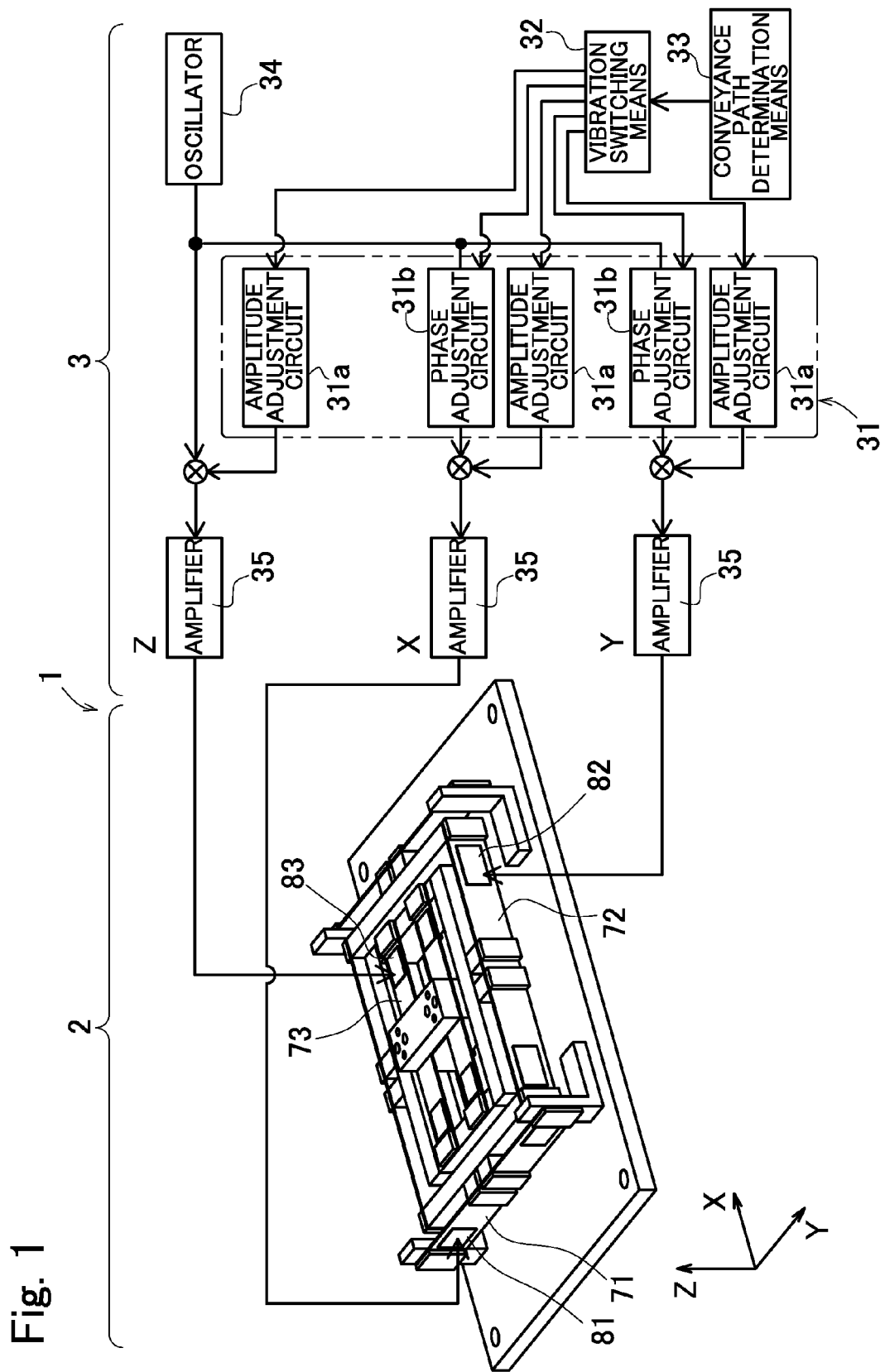
[FIG. 1]

In FIG. 1, a form in which a vibration device 2 according to a first embodiment of the present invention and in addition a control system unit 3 for controlling the vibration device 2 are configured as an article conveyance device 1 that is one of article moving devices, is illustrated.

The control system unit 3 is configured such that, by performing control of piezoelectric elements 81, 82, and 83 incorporated in the vibration device 2 as described later, periodic excitation forces in each direction, that is, in X as a first horizontal direction, Y as a second horizontal direction, and Z as a vertical direction are imparted to the vibration device 2 to cause vibrations.

Note that, each direction of the X, Y, and Z is defined as indicated in the coordinate axis illustrated in the drawings, and also in the following the explanation will be advanced along the coordinate axis illustrated in the drawings as appropriate.

Figure 2:
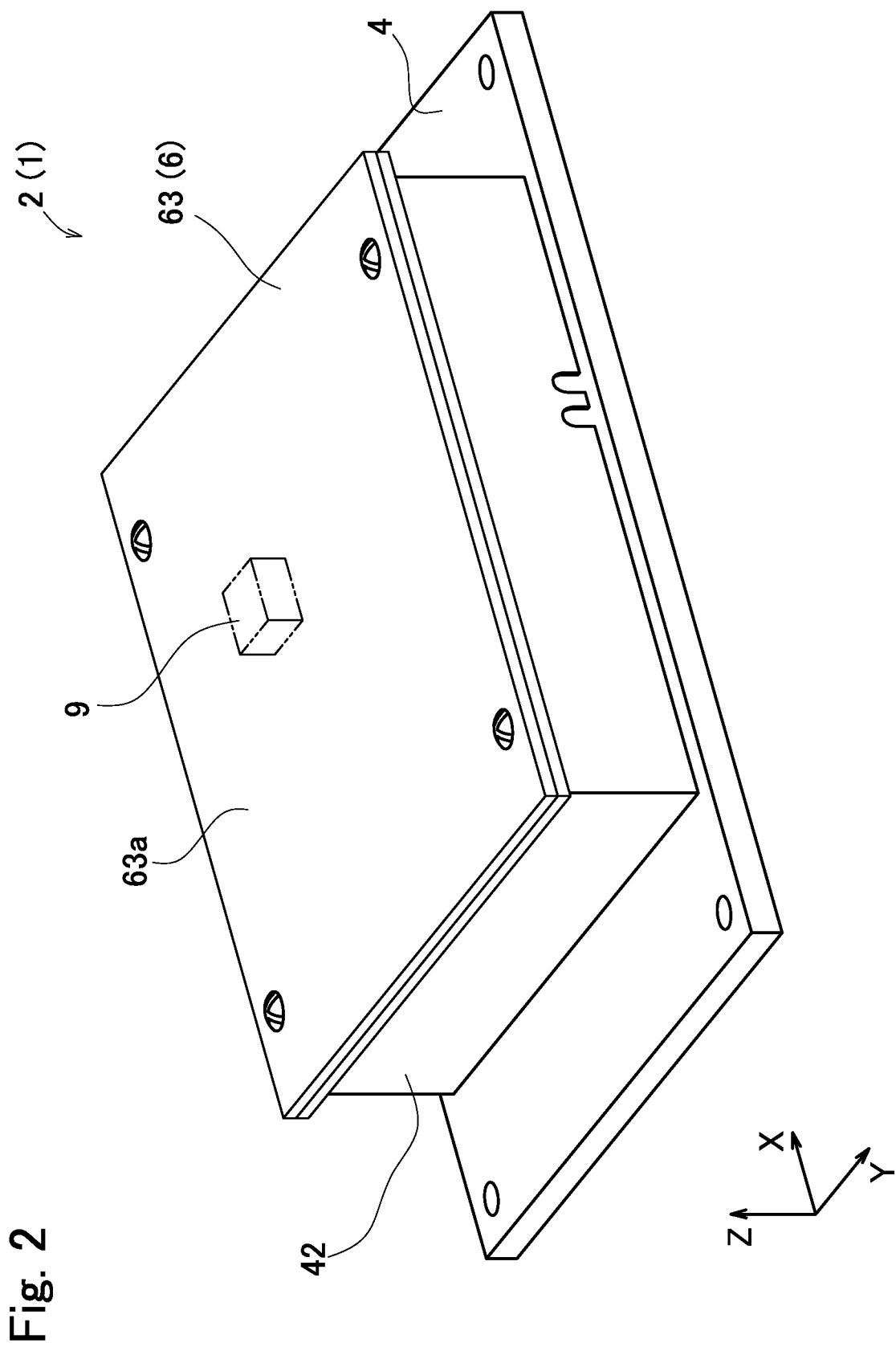
[FIG. 2]

FIG. 2 illustrates the above-described vibration device 2 as a state where the device is actually used. In this state, four faces of the front face, the back face, and the lateral faces are covered with a cover 42 installed on a base 4. Also, at a top face a rectangular-shaped conveyance bench 63 that configures a part of a movable bench 6 is provided, and a top face 63a of the conveyance bench 63 is made as a conveyance surface such that an article 9 to be conveyed can be loaded.

Figure 3:
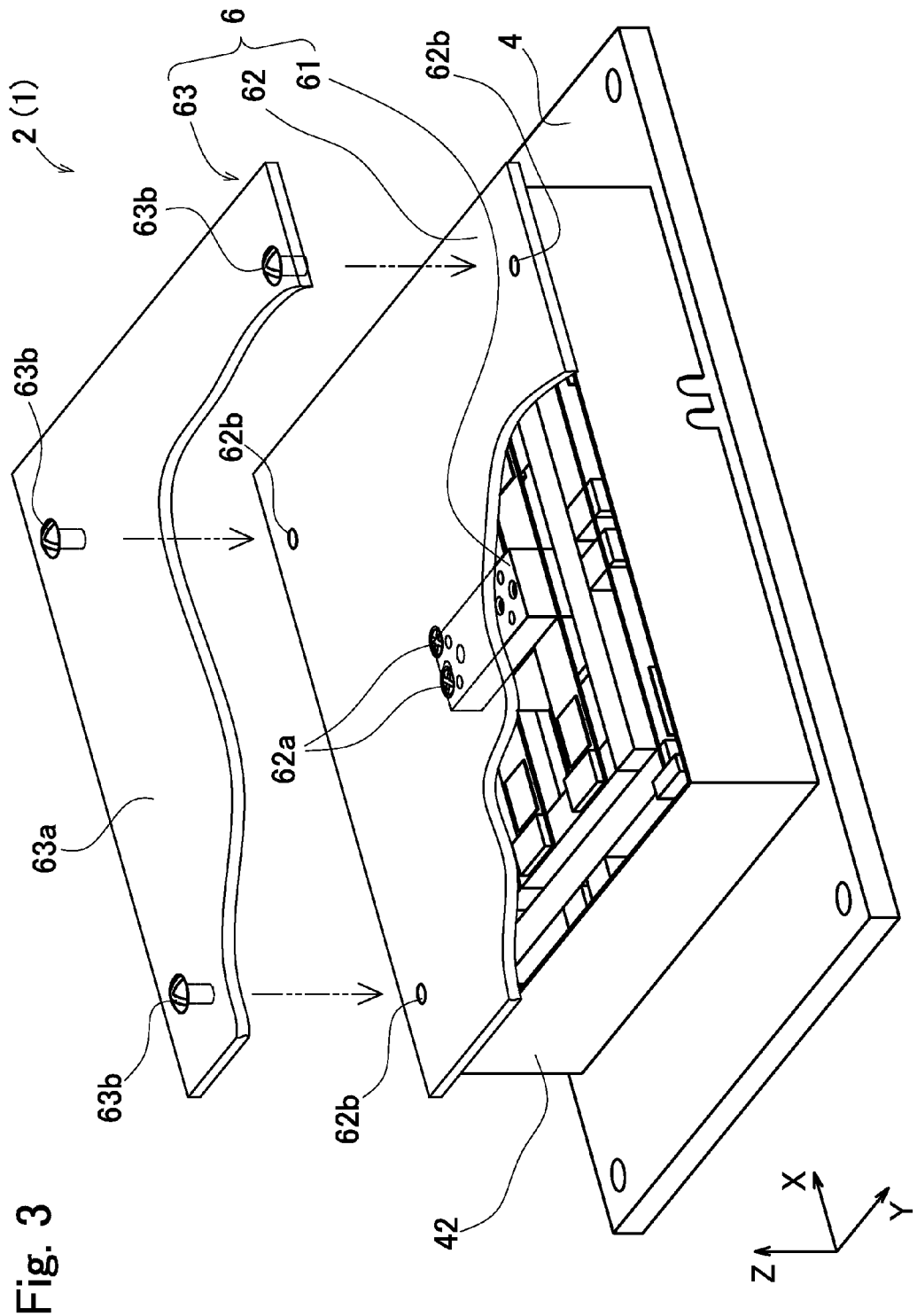
[FIG. 3]

In FIG. 3, a state where the conveyance bench 63 is removed from the above-described vibration device 2 is illustrated. The vibration device 2 has a movable seat 61 as a rectangular parallelepiped-like block elastically supported with respect to the three axis directions of the X, Y, and Z inside of that device, and a rectangular plate-like movable plate 62 is connected with respect to the movable seat 61 by four counter sunk screws 62a to 62a (only two screws are described in the drawing). Then, the above-described conveyance bench 63 is provided at a top face of the movable plate 62, and the movable plate 62 and the conveyance bench 63 are fastened using screw holes 62b to 62b and screws 63b to 63b provided near four corners.

The movable seat 61, the movable plate 62, and the conveyance bench 63 are integrated as the movable bench 6 and elastically supported inside of the vibration device 2, and vibrations are imparted to the movable bench 6 by an excitation means which is described later.

Figure 4:
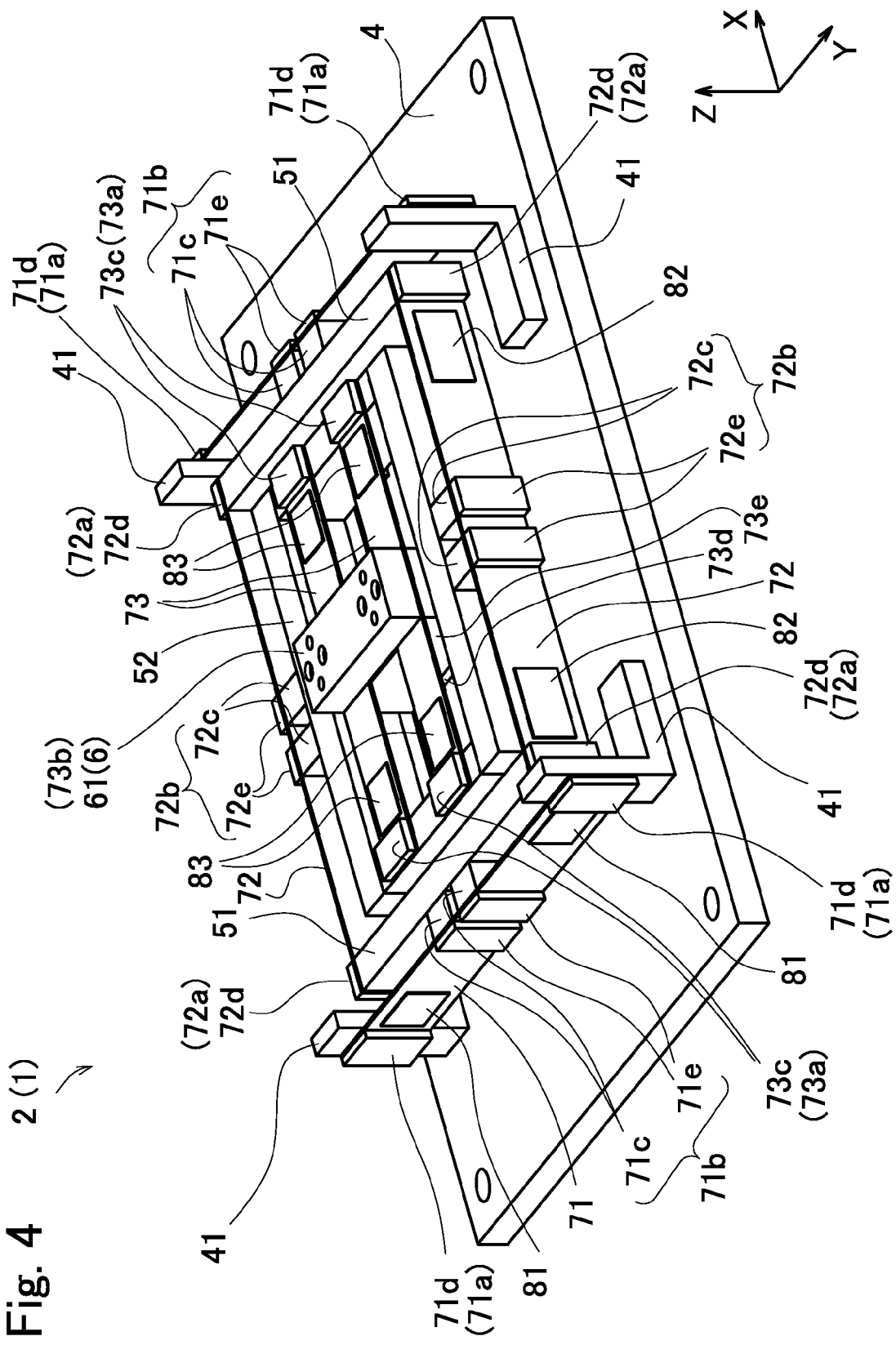
[FIG. 4]

A state where the above-described cover 42, movable plate 62, and conveyance bench 63 are removed is illustrated in FIG. 4. Hereinafter, configurations of the vibration device 2 according to the present embodiment will be explained in detail by using this figure.

The vibration device 2 is configured to elastically support the movable seat 61 in three directions of the X, Y, and Z with respect to the base 4, and first plate-like spring members 71 and 71 as a first horizontal elastic support means, second plate-like spring members 72 and 72 as a second horizontal elastic support means, and third plate-like spring members 73 and 73 as a vertical elastic support means are provided such that the base 4, first middle benches 51 and 51, a second middle bench 52, and the movable seat 61 as a rigid body portion are sequentially connected. In each of the plate-like spring members 71 to 73, because the plate thickness direction is respectively disposed so as to be in the X, Y, and Z directions, elastic deformations are easily made with respect to the directions.

In addition, the first to third piezoelectric elements 81 to 83 as an excitation means for vibrating the movable seat 61 in three directions of the X, Y, and Z are included.

Hereinafter, explanations for these configurations are provided in more detail.

First, the base 4 is configured as a rectangular-shaped plate, and bolt holes for installing to an external equipment or floor face not illustrated are formed at four corners. It is favorable to attach an elastic body having a small spring constant, such as a rubber vibration isolator, which is not illustrated in the figure, under the base 4 to be able to reduce the counterforce from the installation surface.

Figure 5:
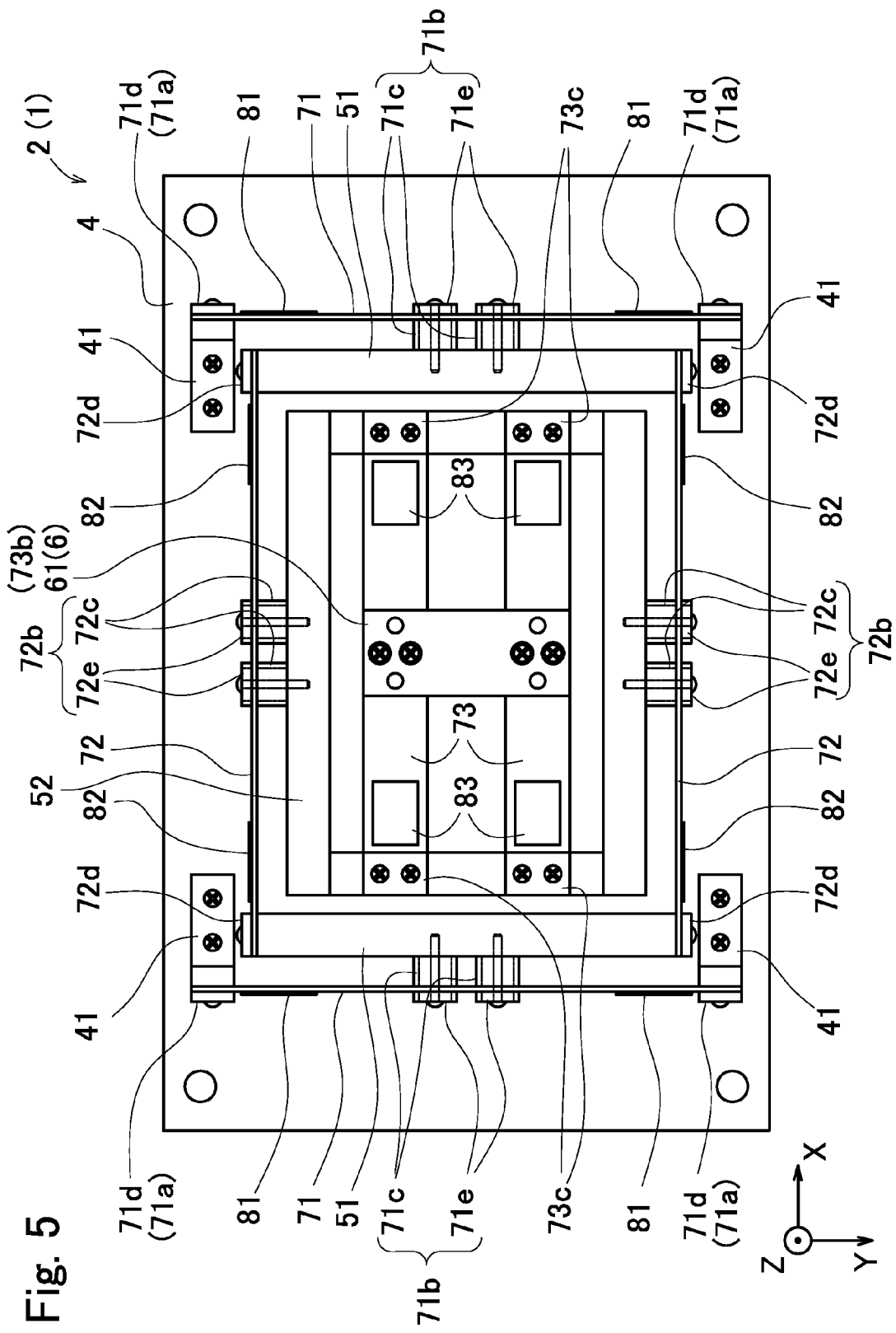
[FIG. 5]

Then, at four places positioned slightly closer to the center than the four corners, attachment blocks 41 are provided so as to be rectangularly disposed. Although the description is omitted in this figure, as illustrated in FIG. 5, each attachment block 41 is configured to be fixed with respect to the base 4 with using the screw.

Returning to FIG. 4, the attachment blocks 41 are formed as blocks having an L-shaped cross section respectively, and are in a state where one side that forms the letter L is abutted on the base 4, and the other side is raised. Then, the raised side is configured to form the YZ plane orthogonal to the X direction. Then, the first plate-like spring members 71 and 71 are provided to connect to the attachment blocks 41 and 41 which are adjacent in pairs in the Y direction. Since the first plate-like spring members 71 and 71 are attached in the YZ planes that the above-described respective attachment blocks 41 to 41 have, the plate thickness direction will be the X direction and the longitudinal direction will be the Y direction.

Also, the first plate-like spring members 71 and 71 will be provided in parallel by two parts separated at a predetermined distance in the X direction, because the members 71 and 71 are provided at two pairs of attachment blocks 41 to 41, respectively.

Also, both end parts of the first plate-like spring members 71 and 71 are supported such that the deflection angle is regulated, because the both end parts are fixed using screws not illustrated so as to be sandwiched between rectangular-shaped spring retainers 71*d* to 71*d* and the YZ plane which each of the above-described attachment blocks 41 to 41 has.

Then, near the center, in the longitudinal direction, of the first plate-like spring members 71 and 71, the first middle benches 51 and 51 are connected via spring seats 71*c* to 71*c*, respectively. The first middle benches 51 are formed in rectangular parallelepiped shapes extending in the Y direction, respectively.

The spring seats 71*c* to 71*c* are provided at the first plate-like spring members 71 and 71 by two respectively, and spring retainers 71*e* to 71*e* are provided so as to oppose to the respective spring seats 71*c* to 71*c*. The first plate-like spring members 71 and 71 are sandwiched by the opposing spring seats 71*c* to 71*c* and spring retainers 71*e* to 71*e*, and therefore the deflection angle is regulated, and the members 71 and 71 are connected to the above-described first middle benches 51 and 51 by screws (see FIG. 5) at these portions. Although the first middle benches 51 and 51 are in two-divided configuration, the benches 51 and 51 perform operations integrally because the benches 51 and 51 are connected by second plate-like spring members 72 and 72 which are described later.

The above-described first middle benches 51 and 51 are formed in the rectangular parallelepiped shape as described above, each of six faces are disposed to be in the direction orthogonal to each plane of the X, Y, and Z axes. Then, two second plate-like spring members 72 and 72 are provided so as to connect between XZ planes orthogonal to the Y axis which each has.

By attaching the members 72 and 72 in this way, the two second plate-like spring members 72 and 72 are disposed in parallel with the members 72 and 72 separated from each other at a predetermined distance in the Y direction while the plate thickness direction is orthogonal to the Y axis, and the longitudinal direction is directed to the X direction, respectively.

The second plate-like spring members 72 and 72 are supported such that the deflection angle is regulated, since such that both end parts are sandwiched between rectangular-shaped spring retainers 72*d* to 72*d* and the XZ planes that the above-described first middle benches 51 and 51 have, the members 72 and 72 are fixed by screws (see FIG. 5) in that portion.

Near the center, in the longitudinal direction, of the second plate-like spring members 72 and 72, the second middle bench 52 is connected via spring seats 72*c* to 72*c*.

The spring seats 72*c* to 72*c* are provided at the second plate-like spring members 72 and 72 by two respectively, and spring retainers 72*e* to 72*e* are provided so as to oppose to the respective spring seats 72*c* to 72*c*. The second plate-like spring members 72 and 72 are sandwiched by the opposing spring seats 72*c* to 72*c* and spring retainers 72*e* to 72*e*, and therefore the deflection angle is regulated, and the members 72 and 72 are connected to the above-described second middle bench 52 by screws (see FIG. 5) at these portions.

The second middle bench 52 is configured as a rectangular frame body as illustrated in the plan view of FIG. 5, and is formed by combining four rectangular parallelepiped blocks each having six faces which are orthogonal in the X, Y, and Z directions.

Figure 6:
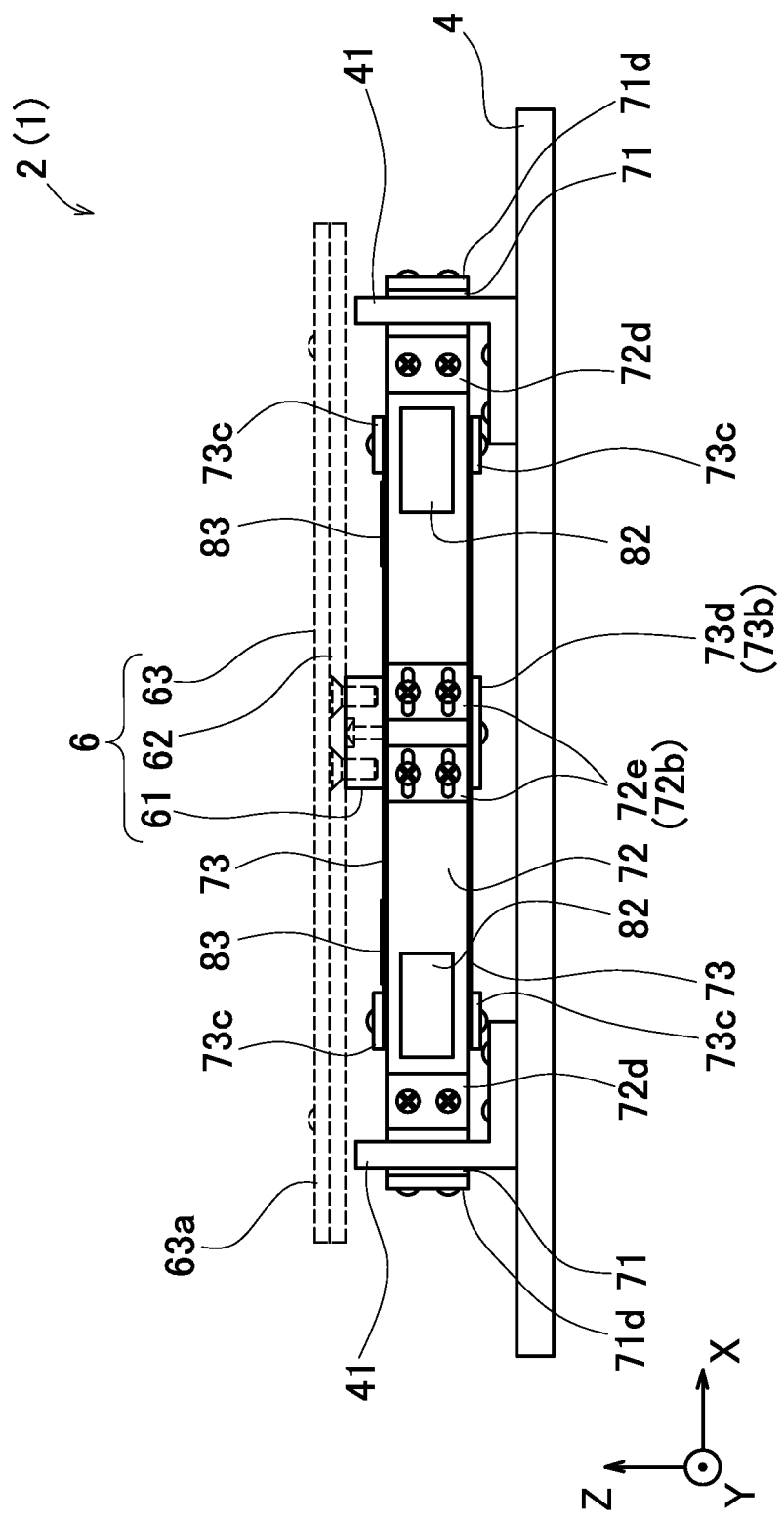
[FIG. 6]

In the spring seats 72*c* to 72*c* and the spring retainers 72*e* to 72*e*, as illustrated in FIG. 6, long holes are formed, and the second plate-like spring members 72 and 72 are configured to be connected to the second middle bench 52 by screws to be inserted in the long holes as illustrated in FIG. 5. The spring seats 72*c* to 72*c* and the spring retainers 72*e* to 72*e* are configured to be able to move by that long holes in the X direction, that is, in the longitudinal direction of the second plate-like spring members 72 and 72, and thereby the second plate-like spring members 72 and 72 are configured to be able to change the effective length that acts as the springs.

Similarly, long holes are also formed in regard to the spring seats 71c to 71c and spring retainers 71e to 71e for connecting the above-described first plate-like spring members 71 and 71 to the first middle benches 51 and 51, and because the members 71 and 71 are configured to be able to move by that long holes in the Y direction, and thereby the effective lengths of the first plate-like spring members 71 and 71 are also configured to be changeable.

As described above, the first plate-like spring members 71 and 71 and the second plate-like spring members 72 and 72 can change the spring constant and also change the natural frequency, by changing the effective length, respectively.

Returning to FIG. 4, a total of four third plate-like spring members 73 to 73 are provided by two respectively, at a top face and an under face of the second middle bench 52 configured as the rectangular frame body. The third plate-like spring members 73 to 73 are provided so as to connect, in the X direction, between respective XY planes that are formed as the top face and under face of portions existing at positions of two sides parallel to the Y direction, of sides that configure the rectangle each forming the second middle bench 52. The third plate-like spring members 73 to 73 are supported such that the deflection angle is regulated, since such that both end parts are sandwiched between rectangular-shaped spring retainers 73c to 73c and the XY planes that the above-described second middle bench 52 has, the members 73 to 73 are fixed using screws (see FIG. 5) at this portion.

Also, near the middle parts of the third plate-like spring members 73 and 73 connected to the top face of the second middle bench 52, and of the third plate-like spring members 73 and 73 connected to the under face of the second middle bench 52 (see FIG. 5), a spring-to-spring block 73e is provided in the gap in order to maintain the interval between both members.

In addition, below the spring-to-spring block 73e, a spring retainer 73e is provided with sandwiching the third plate-like spring members 73 and 73 connected to the under face of the second middle bench 52. The spring retainer 73e can perform fixing using screws, which are not illustrated, with the two third plate-like spring members 73 and 73 sandwiched between the retainer and the under face of the second middle bench 52.

Also, above the spring-to-spring block 73e, the above-described movable seat 61 is provided with sandwiching the third plate-like spring members 73 and 73 connected to the top face of the second middle bench 52. The movable seat 61 can perform fixing using screws in the form as illustrated in FIG. 5 with the two third plate-like spring members 73 and 73 sandwiched between the top face of the second middle bench 52 and the seat. Because the attachment of the movable plate 62 is performed at the top face of the movable seat 61 as illustrated in FIG. 3, consideration is given not to project heads of the above-described screws.

As described above, the vibration device 2 of the present embodiment illustrated in FIG. 4 has the configuration in which the first middle benches 51 and 51 are elastically supported in the X direction with respect to the base 4 by using the first plate-like spring members 71 and 71, the second middle bench 52 is elastically supported in the Y direction with respect to the first middle benches 51 and 51 by using the second plate-like spring member 72, and the movable seat 61 is elastically supported in the Z direction with respect to the second middle bench 52 by using the third plate-like spring member 73. Thereby, the movable bench 6 is configured to be elastically supported in each direction of the X, Y, and Z with respect to the base 4.

Respective plate-like spring members 71 to 73 have elasticity in the X, Y, and Z directions that are the plate thickness directions respectively, and have sufficient rigidity in the width directions and the longitudinal directions orthogonal to the thickness directions. Therefore, the support in each direction can be considered as being independent.

Also, with respect to each direction, the first to third plate-like spring members 71 to 73 are provided in parallel respectively, and the members are made to support in pairs, and thereby it is configured as if the members 71 to 73 configured one part of the parallel link. With this, respective plate-like spring members 71 to 73 are configured to be able to displace while keeping the relationship in which the clearance is constant between the members that are in pairs, without performing the twist movement.

In addition, the vibration device of the present embodiment has a first horizontal excitation means 81, a second horizontal excitation means 82, and a vertical excitation means 83 which are independent in the X, Y, and Z directions.

First, the first horizontal excitation means that is an excitation means in the X direction is configured from a total of four first piezoelectric elements 81 to 81 that are stuck on surfaces of two first plate-like spring members 71 and 71 by two respectively. The first piezoelectric elements 81 to 81 are allowed to cause displacements in the X direction, by causing elongations or contractions in the Y direction by being applied with voltage to cause bending for the first plate-like spring members 71 and 71.

Since the first plate-like spring members 71 and 71 have bend points in the middle, at which the bending direction changes, from a base-side connection point 71a positioned by a spring retainer 71d of an end part, to a first middle bench-side connection point 71b positioned by the spring seat 71c and a spring retainer 71e of the middle, affixing the first piezoelectric elements 81 to 81 up to that portions, instead, will inhibit the deformation and reduce the efficiency. Therefore, it is efficient that the first piezoelectric elements 81 to 81 are provided closer to any end parts, but avoiding the middle of the effective length of spring.

Figure 7:
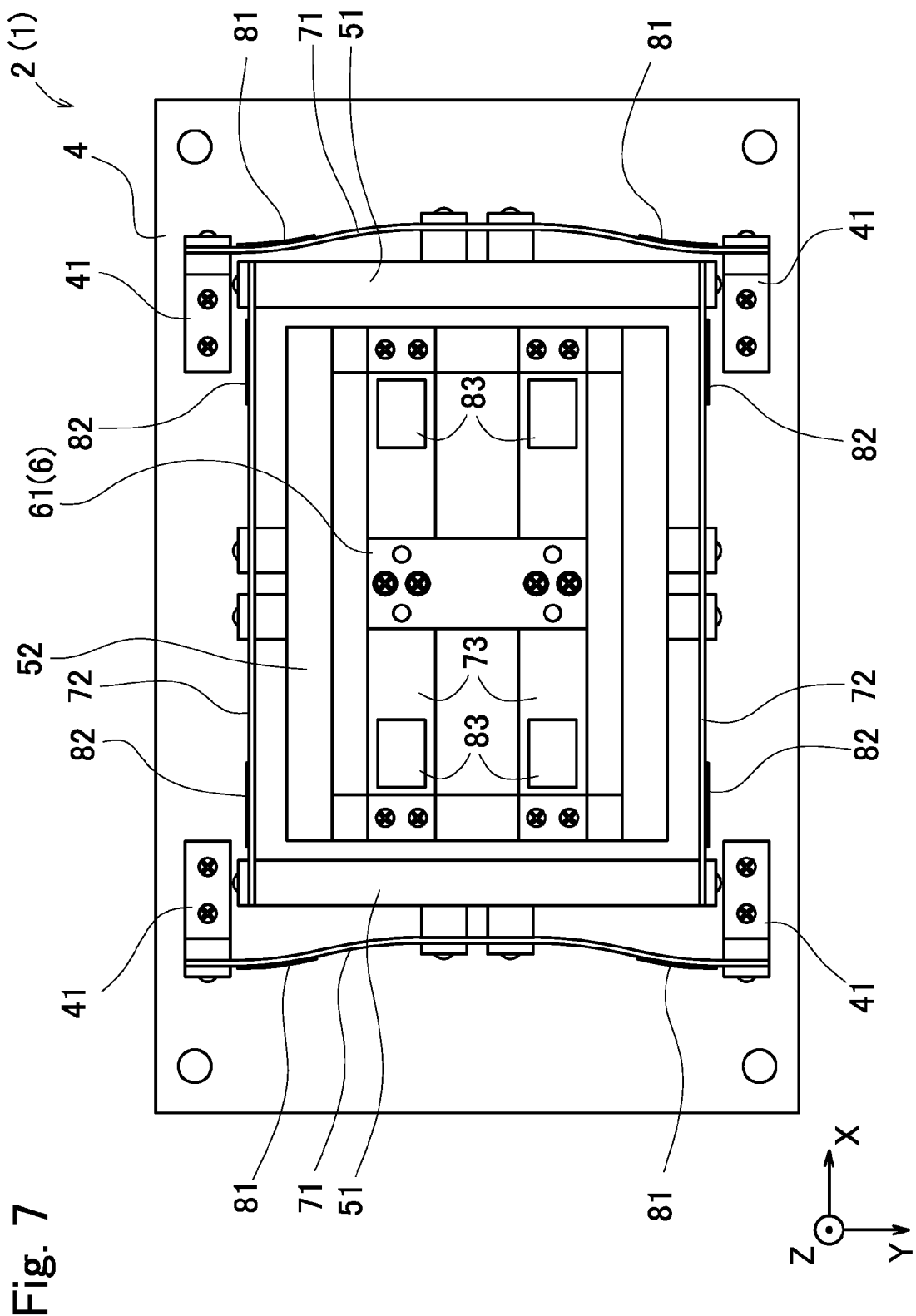
[FIG. 7]

The first piezoelectric elements 81 to 81 are provided at the same position from the end parts respectively, and are allowed to cause the same deformations by adjusting the output. By doing in this way, as illustrated in FIG. 7, the first plate-like spring members 71 and 71 can be deformed in the same manner while keeping the interval between the members 71 and 71 separated in the X direction, and the first middle benches 51 and 51 can be displaced only in the X direction while keeping the horizontal state.

Figure 8:
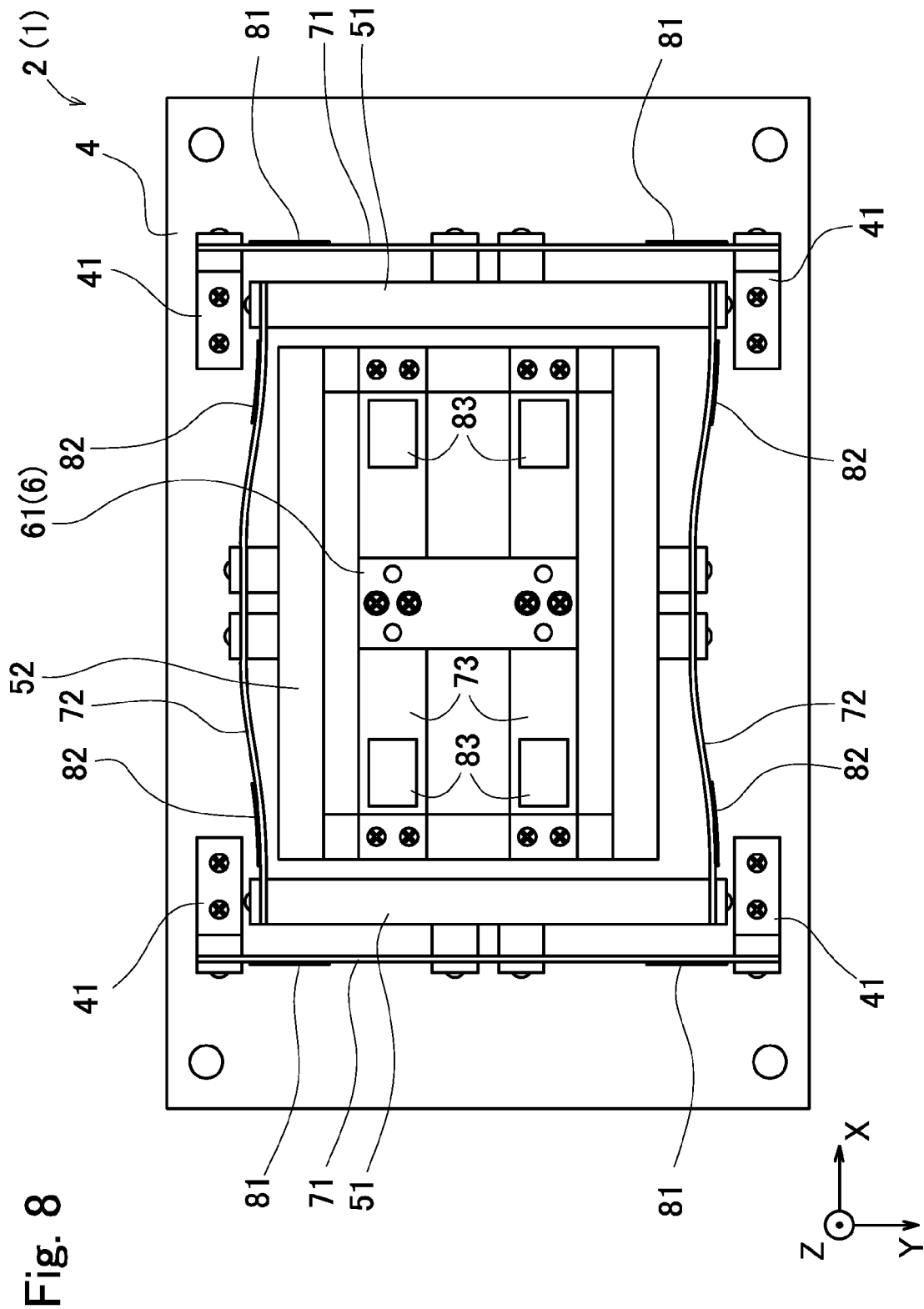
[FIG. 8]

Next, returning to FIG. 4, similar to the above-described first horizontal excitation means, the second horizontal excitation means that is an excitation means in the Y direction is configured from a total of four second piezoelectric elements 82 to 82 that are stuck on surfaces of the two second plate-like spring members 72 and 72 by two respectively. The second piezoelectric elements 82 to 82 are allowed to cause displacements in the Y direction by causing elongations or contraction in the X direction by being applied with voltage to cause bending for the second plate-like spring members 72 and 72. The second piezoelectric elements 82 to 82 are also attached at positions similar to the first piezoelectric elements 81 to 81, and by doing in this way, as illustrated in FIG. 8, can make the second plate-like spring members 72 and 72 separated in the Y direction to deform in the same manner while keeping the interval between the members 72 and 72, and can displace the second middle bench 52 only in the Y direction while keeping the horizontal state.

Figure 9:
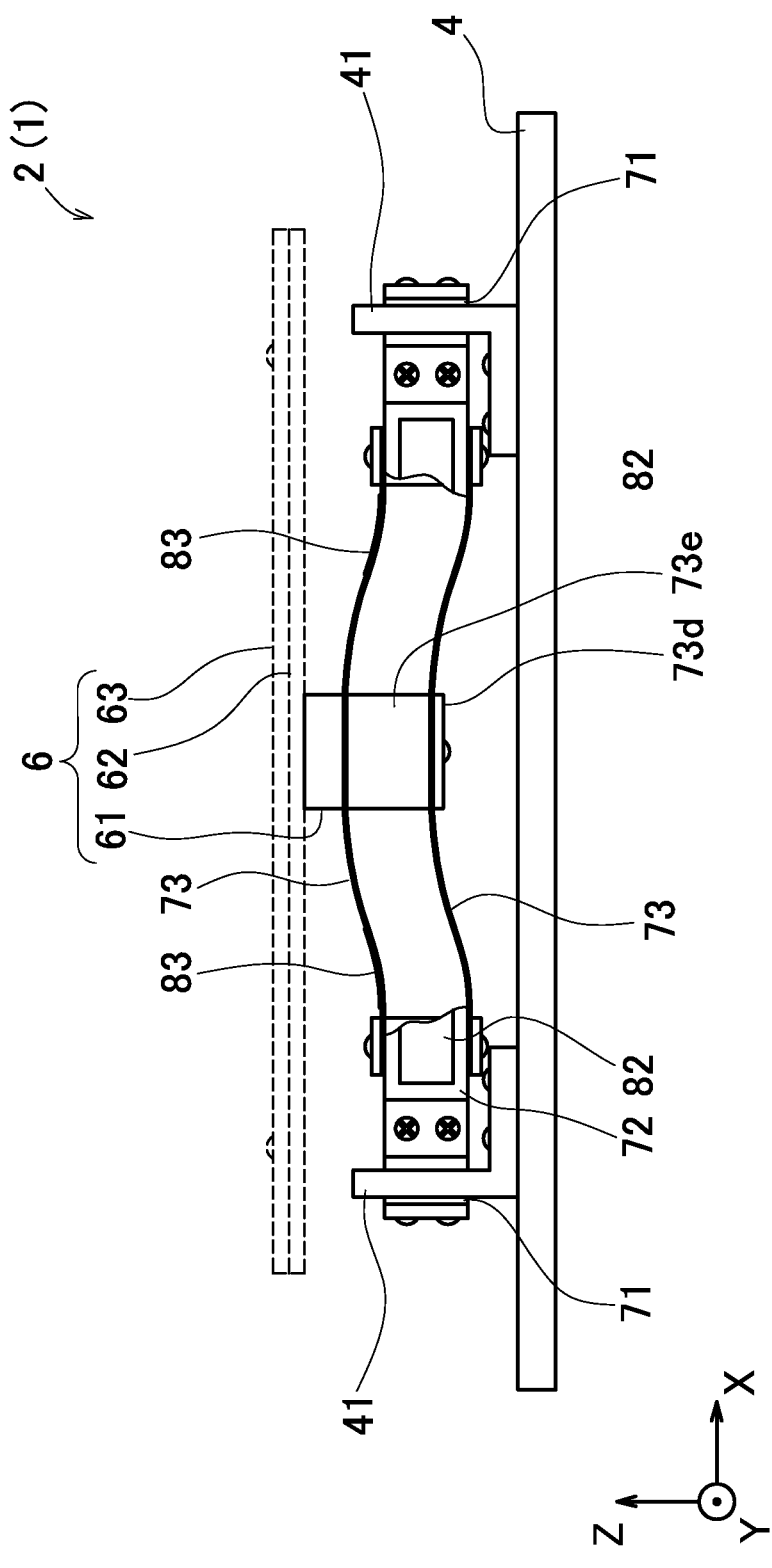
[FIG. 9]

In addition, returning to FIG. 4, the vertical excitation means that is an excitation means in the Z direction is configured from a total of four third piezoelectric elements 83 to 83 that are stuck by two respectively on surfaces of two plate-like spring members 73 and 73 of an upper side of the plate-like spring members 73 to 73 provided up and down by two. The third piezoelectric elements 83 to 83 are allowed to cause displacements in the Z direction by causing elongations or contractions in the X direction by being applied with voltage to cause bending for the third plate-like spring members 73 and 73. The third piezoelectric elements 83 to 83 are also attached at positions similar to the first piezoelectric elements 81 to 81 and the second piezoelectric elements 82 to 82, and by doing in this way, as illustrated in FIG. 9, can similarly make the third plate-like spring members 73 and 73 separated in the Z direction to deform while keeping the interval between the members 73 and 73, and can displace the movable seat 61 only in the Z direction while keeping the horizontal state. Note that, it is also possible to provide the third piezoelectric elements 83 to 83 in the two third plate-like spring members 73 and 73 provided at the lower side, and also in a total of four third plate-like spring members 73 to 73 of the upper side and the lower side.

As described above, by changing the voltage that can impart the displacement in each direction of the X, Y, and Z in the form of sinusoidal waves respectively, periodic excitation force can be imparted with respect to the movable seat 61 in each direction.

In relation to the vibration device 2 that is configured as described above, the control system unit 3 illustrated in FIG. 1 causes periodic excitation force for causing vibration in each direction of the X, Y, and Z, by imparting sinusoidal wave-formed control voltage to the first piezoelectric element 81, the second piezoelectric element 82, and the third piezoelectric element 83, respectively.

Therefore, the control system unit 3 includes an oscillator 34 for causing sinusoidal voltage, and this sinusoidal voltage is output to each piezoelectric element 81, 82, and 83 after being amplified by an amplifier 35. In addition, the above-described control system unit 3 has a vibration control means 31 for making detailed adjustment of the control voltage in each of the X, Y, and Z directions. Note that, by setting the frequency of the vibrations caused by the oscillator 34 as the frequency resonating with the vibration system of either of the X, Y, or Z directions, an effort is made so that electric power is saved by amplifying the vibration. At this time, in order to avoid interfering vibrations of the vibration system in all directions, the natural frequency in each direction may be separated. In that case, the natural frequency in each direction will be separated by approximately −10% to +10%, for example.

Note that, in the present embodiment, as described above, the effective lengths of the first plate-like spring members 71 and 71 and the second plate-like spring members 72 and 72 can be changed by the spring seats 71c to 71c and 72c to 72c, respectively. Therefore, with reference to the natural frequency in the Z direction, the natural frequencies in the X direction and the Y direction can be changed and adjusted so as to be an appropriate value respectively.

The vibration control means 31 is composed mainly of an amplitude adjustment circuit 31a for adjusting the amplitude of the control voltage in each of the X, Y, and Z directions, and a phase adjustment circuit 31b for adjusting each phase difference. In the present embodiment, it is configured such that the amplitude adjustment circuit 31a corresponding to each of the control voltage in the X, Y, and Z is present, and the phase adjustment circuit 31b that adjusts the phase of the control voltage with reference to the phase of the control voltage in the Z direction so as to result in a predetermined phase difference from the phase of the control voltage in the Z direction is provided for the control voltage of the X and Y, respectively.

Then, the control system unit 3 has a conveyance path determination means 33 for determining a conveyance path and a conveyance speed according to the article 9 to be conveyed, and a vibration switching means 32 that issues an order for changing specific control values to each amplitude adjustment circuit 31a and each phase adjustment circuit 31b in accordance with the determined conveyance path and conveyance speed.

Then, the conveyance path determination means 33 stores internally a plurality of data items of the conveyance path and the conveyance speed according to the article 9 to be conveyed, selects the conveyance path and the conveyance speed from that data by an instruction from outside, which is not illustrated, and then, gives an order to the vibration switching means 32 so as to switch the vibration mode in conformity with the conveyance path and conveyance speed which are selected then.

In addition, the vibration switching means 32 determines respective specific control values of each amplitude adjustment circuit 31a and each phase adjustment circuit 31b such that the conveyance path and the conveyance speed become the ordered target values, and outputs an order so as to switch to the control values.

The article conveyance device 1 that is configured as described above operates specifically as follows, and performs the conveyance and sorting of the article 9 loaded on the movable bench 6.

Figure 10:
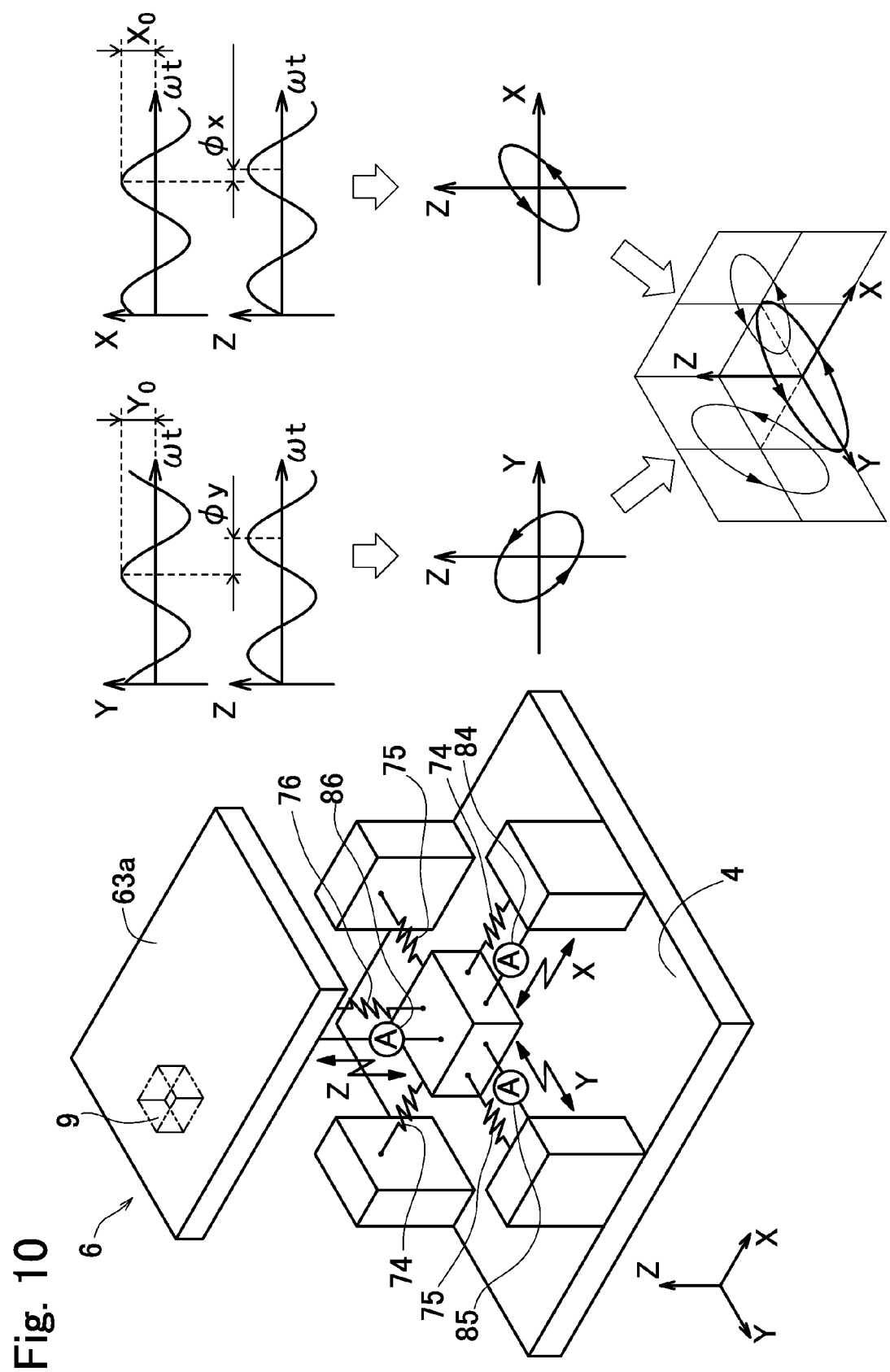
[FIG. 10]

Here, by simplifying the vibration device as illustrated in the schematic diagram of FIG. 10, a case in which the movable bench 6 is elastically supported with respect to the base 4 in each of the X, Y, and Z directions by elastic bodies 74, 75 and 76, and excitation means 84, 85, and 86 are provided in each direction is supposed. As a result of such a configuration, it is possible to operate the movable bench 6 in the three directions by the excitation means 84, 85 and 86 provided in the three, that is, the X, Y, and Z directions. The elastic bodies 74 to 76 in the schematic diagram of FIG. 10 correspond to the first to third plate-like spring members 71 to 73 (see FIG. 4), and the excitation means 84 to 86 correspond to the first to third piezoelectric elements 81 to 83 (see FIG. 4) as the first and second horizontal excitation means and the vertical excitation means, respectively.

A periodic vibration displacement expressed by $Z=Z_0 \times \sin\omega t$ is applied in the Z direction relative to the movable bench 6 of the model illustrated in FIG. 10. Here, $Z_0$ indicates the amplitude of the Z direction, $\omega$ indicates the angular frequency, and t indicates the time. In addition, also in each of the X and Y directions, vibrations having the same frequency as in the Z direction are applied as indicated by the formulas $X=X_0 \times \sin(\omega t+\phi x)$, $Y=Y_0 \times \sin(\omega t+\phi y)$. Here, $X_0$ and $Y_0$ indicate the amplitude in the X direction and the Y direction, respectively, and $\phi x$ and $\phi y$ indicate the phase difference of the vibrations in the X direction and the Y direction respectively with respect to the vibrations in the Z direction.

In this way, by applying sinusoidal wave-like periodic vibration displacement in each of the X, Y, and Z directions, three-dimensional vibration into which these are combined together can be caused to the movable bench 6. For example, as illustrated in FIG. 10, when vibrations are caused in the X and Y directions with providing the phase differences of $\phi x$ and $\phi y$ to the vibration component of the Z direction, vibrations having an elliptical trajectory with the right side on top are caused on the XZ plane in a two-dimensional manner, and vibrations having an elliptical trajectory with the right side at the bottom are caused on the YZ plane. Then, furthermore by combining together the two vibrations, an elliptical trajectory on a three-dimensional space is caused as illustrated at the bottom right of the figure.

Also, by changing the amplitude and phase of the vibration displacement in each direction, the size and direction of the two-dimensional elliptical trajectory in the XZ plane and the YZ plane can be changed, and in correspondence, the size and direction of the elliptical trajectory on the three-dimensional space can be changed freely. It must be noted that in order to thus impart the periodic vibration displacement in each direction, it is controlled that a periodic excitation force is imparted in each direction.

As described above, when the movable bench 6 vibrates while tracing an elliptical trajectory, the article 9 loaded on top of the movable bench 6 starts moving. Also, in this movement, the movement speed component in the X direction can be controlled by the elliptical trajectory in the XZ plane, and the movement speed component in the Y direction can be controlled by the elliptical trajectory in the YZ plane. That is, by changing the amplitude and the phase difference of the vibrations in each of the X direction and the Y direction with reference to the vibration component in the Z direction, the movement speed component in the X and Y directions can be changed and conveyance can be performed in any direction.

Specifically, the change of the movement speed is performed as follows.

Figure 11:
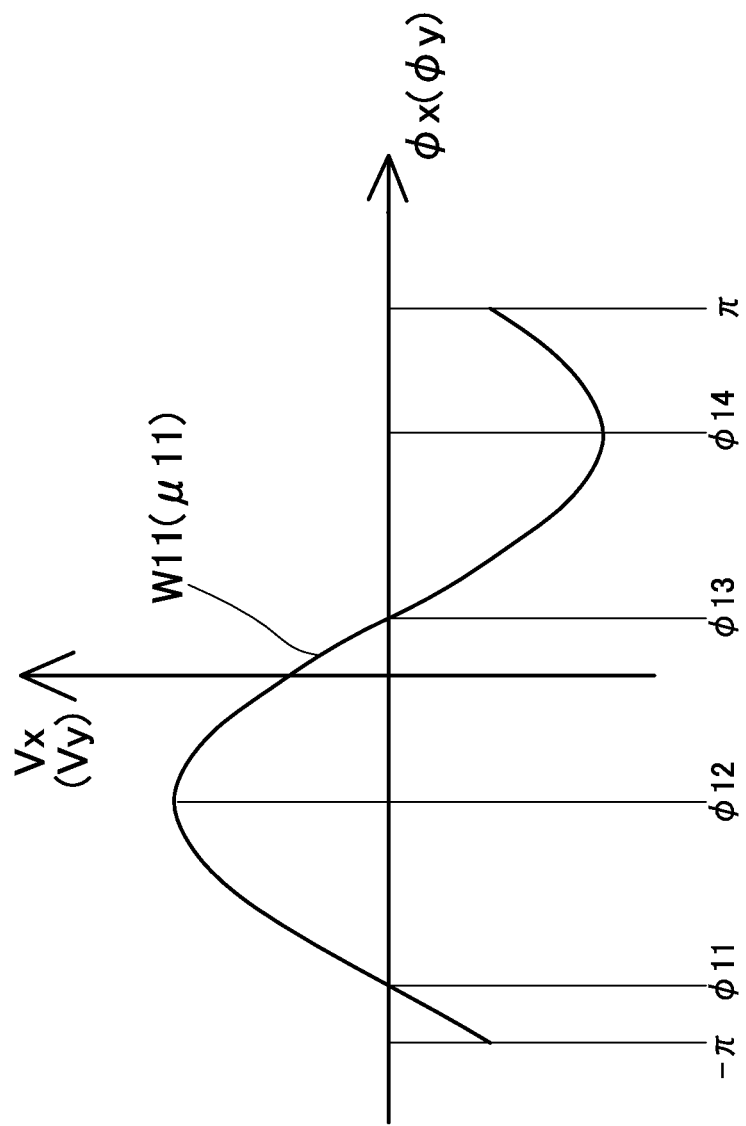
[FIG. 11]

According to the knowledge of the inventors, if explanation is provided by using FIG. 11 while referring to FIG. 10, the movement speed Vx (Vy) of the article 9 changes to trace the curve that is similar to the sinusoidal wave by the phase difference $\phi x$ ($\phi y$). Therefore, when a phase difference of a vibration component in the X direction with respect to a vibration component in the Z direction is set to $\phi 12$ in FIG. 10, the article 9 will be conveyed in a direction in which the X becomes positive. Also, when the phase difference is set to $\phi 14$, the article 9 will be conveyed in a direction in which the X becomes negative. In contrast to these cases, when the phase difference is set to $\phi 11$ or $\phi 13$, the movement speed Vx becomes 0, and the article 9 will become a state in which the article stops moving in the X direction. In addition, by changing the phase difference between $\phi 11$ and $\phi 13$, between $\phi 13$ and $\pi$, or between $-\pi$ and $\phi 11$, speeds with respect to the positive direction and the negative direction can be increased and decreased, respectively. Such relationships hold not only in the X direction, but also in the Y direction, and similarly, by setting a phase difference with respect to a vibration component in the Z direction, the movement direction and the movement speed can be changed.

In this way, by changing the amplitudes $X_0$ and $Y_0$ of vibration components in respective X and Y directions, and the phase differences $\phi x$ and $\phi y$ with respect to the Z direction vibration component, the movement speeds Vx and Vy in the X and Y directions can be changed.

Figure 12:
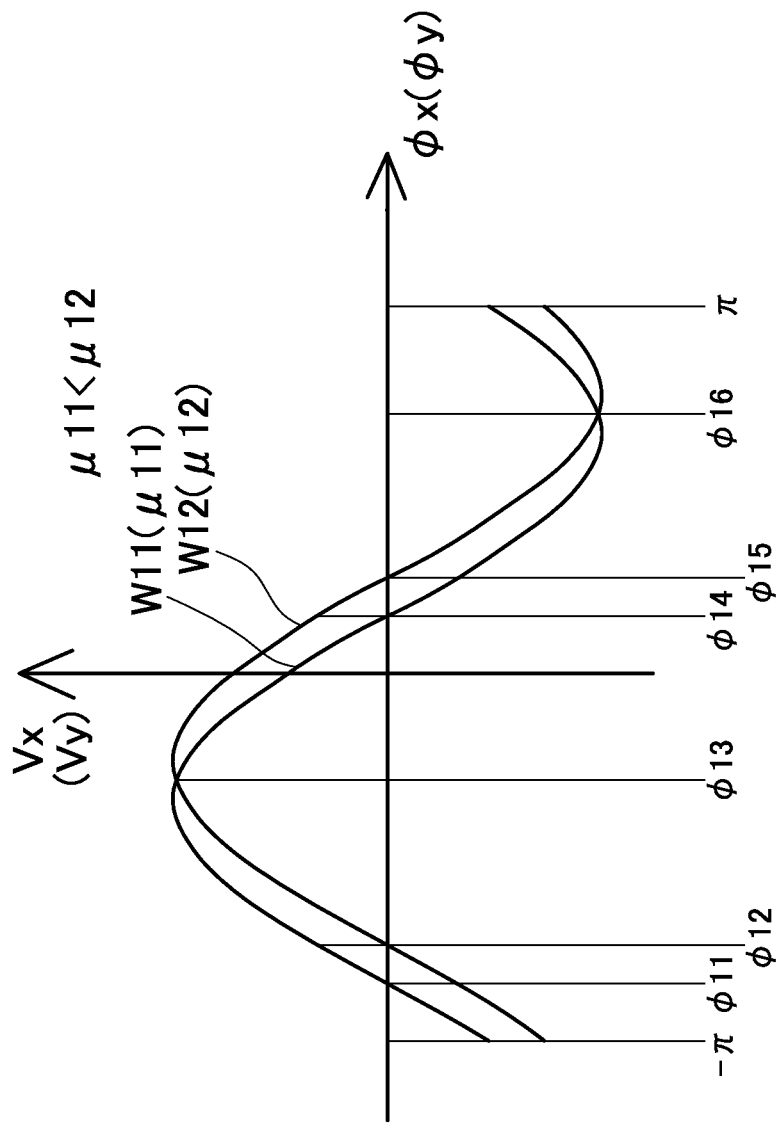
[FIG. 12]

In addition, according to the knowledge of the inventors, if explanation is provided with referring to FIG. 10, the curve indicating the relationship between the phase difference and the movement speed Vx (Vy) of the article 9 illustrated in FIG. 11 changes depending on the coefficient of friction of the article 9 and the movable bench 6, and then becomes a relationship illustrated in FIG. 12. That is, if coefficients of friction between two types of articles W11 and W12 and the movable bench 6 are set as μ11 and μ12, respectively, and if there is a relationship of μ11 <μ12, a graph of the movement speed at W12 becomes a form with a curve of the movement speed at W11 shifted in a direction in which the phase difference becomes positive. Therefore, when articles 9 having different coefficients of friction are simultaneously kept on the movable bench 6 for which elliptical vibration is to be performed, the movement speed and the movement direction are differed.

Specifically, when setting to the phase difference $\phi 11$ illustrated in FIG. 12, w11 does not move, and w12 will move in the negative direction. Also, when setting the phase difference between $\phi 11$ and $\phi 12$, it is possible to move w11 in the positive direction, and to move w12 in the negative direction. Then, when setting the phase difference as $\phi 12$, it is possible not to move W12, and to move only W11 in the positive direction. Also, when setting between $\phi 12$ and $\phi 14$, it is possible to move both w11 and w12 in the positive direction, but to replace the magnitude (large/small) of speeds of w11 and w12 at $\phi 13$ as a border. In addition, when minutely changing the phase difference at a range from $\phi 12$ to $\phi 14$, speed ratio of w11 and w12 can be also changed.

Then, when setting the phase difference as $\phi 14$, it is possible not to move W11, and to move only w12 in the positive direction. In addition, when setting the phase difference between $\phi 14$ and $\phi 15$, it is possible to move w12 in the positive direction, and to move w11 in the negative direction. When setting the phase difference as $\phi 15$, it is possible not to move w12 and to move only w11 in the negative direction. Then, when setting the phase difference in a range from $\phi 15$ to $\pi$, it is possible to move both w11 and w12 in the negative direction, and by changing the phase difference within this range, a ratio of the both movement speeds can also be changed.

Figure 13:
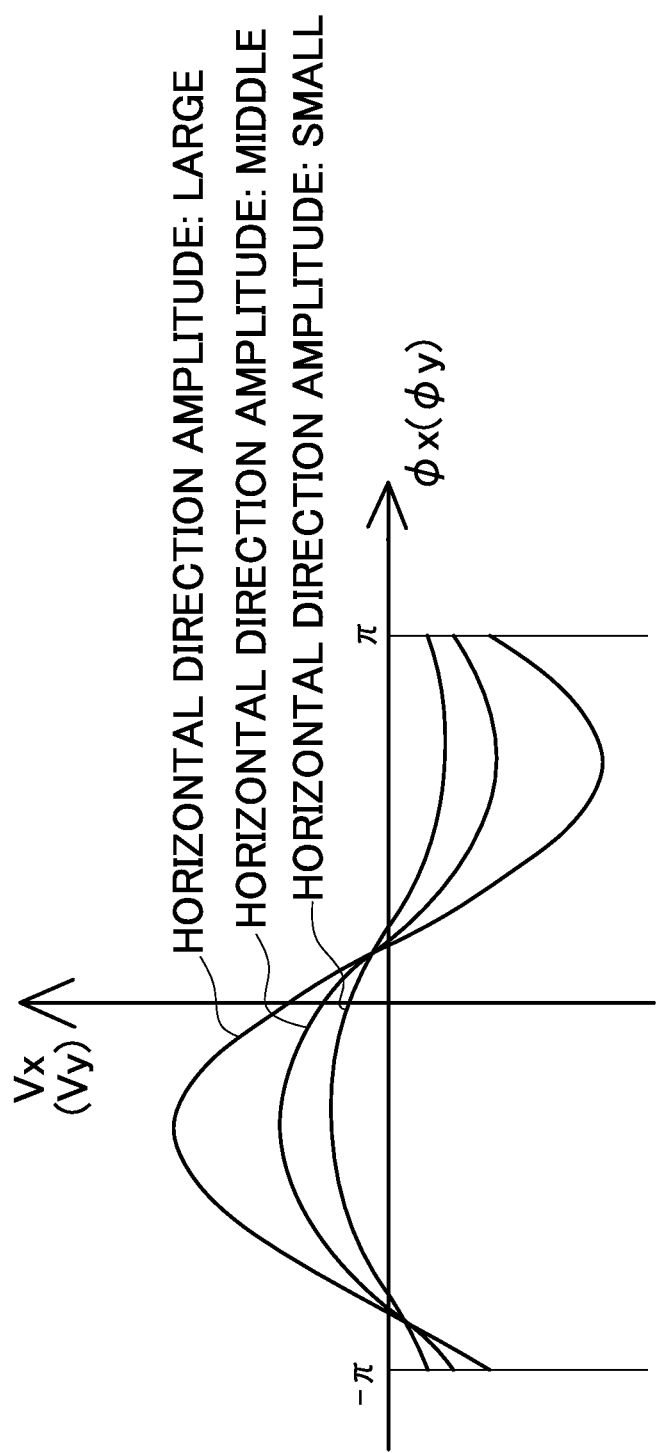
[FIG. 13]

In addition, according to the knowledge of the inventors, if explanation is provided by using FIG. 13 while referring to FIG. 10, the relationship between the phase difference $\phi x$ ($\phi y$) and the movement speed Vx (Vy) of the article 9 changes also by changing the amplitude $X_0$ ($Y_0$). That is, the curve that is similar to a sinusoidal wave, which is the movement speed Vx (Vy) of the article 9 with respect to the phase difference $\phi x$ ($\phi y$), generally changes in proportion to the amplitude $X_0$ ($Y_0$) of the vibration displacement. Therefore, when the movement speed Vx (Vy) of the article 9 is to be doubled, generally, the amplitude of the vibration displacement in the X (Y) direction may be doubled. For achieving this, the amplitude of the control voltage may be changed in order to impart a corresponding excitation force.

By doing in this way, in a case where two types of articles 9 having different coefficients of friction are conveyed in the X (Y) direction, by changing the phase difference $\phi x$ ($\phi y$) of vibration in the X (Y) direction with respect to the vibration in the Z direction, it is possible to move only either of the two types of articles 9, and to change the speed ratio while changing the movement direction, and furthermore, by changing the amplitude of vibration in the X (Y) direction, an absolute value of the movement speed can be controlled. By combining these, it is also possible to change the other speed while maintaining one speed, and to change the direction of conveyance.

By expanding the control of conveyance speed and direction in one direction as described above in two directions, it is possible to move the articles freely within the XY plane. That is, by setting the vibration in the horizontal direction to two directions of the X and Y, and combining with the vibration in the Z direction, respectively, elliptical vibration within the XZ plane and elliptical vibration within the YZ plane are produced respectively, and by generating three-dimensional elliptical vibration into which these vibrations are combined together, and three-dimensionally switching the direction and size of this elliptical vibration, the movement direction and the movement speed of the articles 9 can be controlled in more detail. Then, when elliptical vibration component within the XZ plane and elliptical vibration component within the YZ plane are changed respectively, by changing the amplitude and phase of the periodic excitation force which occurs by the control voltage in the X direction and the Y direction, respectively, with reference to periodic excitation force that occurs by the control voltage in the Z direction, it is possible to impart the movement speed components of the X direction and the Y direction respectively to the articles 9 in accordance with the relationships of the above-described FIGS. 11 to 13.

Therefore, the conveyance of the article 9 can be performed specifically as follows. Hereinafter, while referring to FIG. 1, the explanation is provided in accordance with the plan view in which conveyance modes of each article of FIGS. 14(*a*) to 14(*f*) are exemplified.

First, if the article 9 is only one type, as illustrated in FIG. 14(*a*), the article 9 can be moved in the X direction from a point of time of beginning (T$_0$), and moved by also adding the movement speed component in the Y direction from one point of time (T$_1$) to change the direction. In such cases, there are a case where a conveyance destination is changed in accordance with the type of the article 9, and a case that the article 9 is determined as a defective item on the basis of inspection data by a camera provided separately to be conveyed outside of the line. In order to perform the conveyance in such a mode, the conveyance path determination means 33 in FIG. 1 receives the type of the article 9 to be conveyed as data related to articles to be conveyed from outside, and selects the conveyance path and the conveyance speed according to the article 9 on the basis of internally pre-stored data, or determines the conveyance direction and the conveyance speed on the basis of inspection data as the data related to articles to be conveyed to output the same to the vibration switching means 32. In the vibration switching means 32, it is determined whether or not it is necessary to switch the vibration mode in each direction in response to the conveyance direction and conveyance speed, and if the switching is necessary, specific control values are ordered to each amplitude adjustment circuit 31*a* and phase adjustment circuit 31*b* for adjusting the amplitude and phase of the periodic excitation force in each direction.

Then, such determination of conveyance path change are made as needed, and when the amplitude and phase are adjusted by the vibration switching means 32, it is possible to make the article 9 to move while tracing flexible trajectory in the X and Y directions as illustrated in FIG. 14(*b*). The determination of conveyance path change may be made in accordance with preset timings, or in response to signals from outside.

Also, as illustrated in FIG. 14(*c*), if the articles 9*a* and 9*b* are two types having different coefficients of friction, at beginning stage (T$_0$) the articles can be conveyed in one direction at the same speed, and from one point of time (T$_1$) the articles can be branched in different directions to move. In this case, at the beginning stage (T$_0$), vibration is caused in the X direction with the phase difference φ13 in FIG. 12, vibration is not caused in the Y direction, and from the point of time T$_1$, vibration is caused also in the Y direction and the vibration phase difference from the Z direction is switched between φ11 and φ12 or between φ14 and φ15. Simultaneously also the speed in the X direction is switched so as to provide a speed difference in the X direction between the articles 9*a* and 9*b* by shifting the phase difference of vibration with respect to the Z direction from φ13. In this vibration switching, the conveyance path determination means 33 in FIG. 1 determines appropriate conveyance path and conveyance speed in response to the set timing, or on the basis of data related to articles to be conveyed that is input from outside, and issues a change order of the conveyance direction and conveyance speed to the vibration switching means 32 on the basis of that determination. Then, in the vibration switching means 32, concrete control values of the amplitude and phase in each direction corresponding to the ordered conveyance direction and conveyance speed are determined, and an order is issued to each amplitude adjustment circuit 31*a* and phase adjustment circuit 31*b* so as to change to the control value.

Also, by performing similar control, as illustrated in FIG. 14(*d*), only one of the articles 9*a* and 9*b* can be moved, and also the speed difference can be provided for both articles. In addition, as illustrated in FIG. 14(*e*), after selecting an arbitrary direction, the articles can also be moved in directions opposite to each other along that direction.

In addition, by continuously performing such changes of the conveyance path and speed, as illustrated in FIG. 14(*f*), each of the conveyance paths and the conveyance speeds of the articles 9*a* and 9*b* can be simultaneously controlled within the XY plane independently.

Also, as described above, by performing control to convey articles 9 having different coefficients of friction in different conveyance directions, the conveyance directions can be differed even for articles that can be conceived as having apparently different coefficients of friction, such as different surface profile even when the coefficients of friction are strictly the same. For example, such a case that even for the front face and the back face of the same member, concavities and convexities of the faces are different and contact areas with the movable bench 6 are greatly different is applicable.

As described above, the vibration device 2 according to the present embodiment comprises the base 4, the movable bench 6 elastically supported to the base 4, the first horizontal excitation means 81 that vibrates the movable bench 6 in the X direction as the first horizontal direction, the second horizontal excitation means 82 that vibrates the movable bench 6 in the Y direction as the second horizontal direction that crosses the first horizontal direction, and the vertical excitation means 83 that vibrates the movable bench 6 in the Z direction as the vertical direction, the vibration device 2 comprises the first middle benches 51 and 51 and the second middle bench 52 between the base 4 and the movable bench 6, the vibration device 2 includes the first horizontal elastic support means, the second horizontal elastic support means, and the vertical elastic support means that elastically connect the base 4, the first middle bench 51, the second middle bench 52, and the movable bench 6 sequentially in each direction of the X, Y, and Z, and the first horizontal elastic support means is configured from the first plate-like spring member 71 with the thickness direction approximately matching to the first horizontal direction and with the longitudinal direction arranged in the horizontal direction, the second horizontal elastic support means is configured from the second plate-like spring member 72 with the thickness direction approximately matching to the second horizontal direction and with the longitudinal direction arranged in the horizontal direction, and the vertical elastic support means is configured from the third plate-like spring member 73 with the thickness direction approximately matching to the vertical direction and with the longitudinal direction arranged in the horizontal direction.

Because of being configured in this way, since the first to third plate-like spring members 71 to 73 as the elastic support means that elastically support the movable bench 6 are provided in directions where these members easily elastically deform in each direction of the X, Y, and Z, and each of the plate-like spring members 71 to 73 has large rigidity in a direction that differs from the plate thickness direction, the movable bench 6 can be elastically supported in each direction respectively and independently. Therefore, when vibrating in each direction by the first horizontal excitation means 81, the second horizontal excitation means 82, and the vertical excitation means 83, the vibrations can be controlled independently without having an impact on each other's direction. In addition, since these plate-like spring members 71 to 73 are respectively arranged in a direction where the longitudinal direction becomes horizontal, the height from the base 4 to the movable bench 6 can be suppressed, and pitching and rolling of the movable bench 6 can be suppressed.

Also, because the first to third plate-like spring members 71 to 73 are configured to be provided in parallel in plural while being separated at the predetermined distance, each of the plate-like spring members 71 to 73 is connected so as to configure a part of parallel link, and is therefore easily displaced while retaining a state in which the interval is constant with respect to each direction. Therefore, deformations in twisted mode are suppressed in each of the plate-like spring members 71 to 73, and therefore, it is possible to perform the above-described support in the three directions more stably.

Also, since it is configured such that respective excitation means are the piezoelectric elements 81 to 83 stuck on at least one face of the first to third plate-like spring members 71 to 73, and the first to third plate-like spring members 71 to 73 are vibrated by applying the sinusoidal voltage to the piezoelectric elements 81 to 83 to cause periodic elongations, the configuration can be simplified and compacted by integrating respective plate-like spring members 71 to 73 as the elastic support means, and the excitation means 81 to 83.

Also, the spring seats 71c to 72c are provided respectively between the first middle bench 51 and the first plate-like spring member 71, and between the second middle bench 52 and the second plate-like spring member 72, and positions of the spring seats 71c to 72c are respectively configured to be changeable with respect to the longitudinal directions of the first and second plate-like spring members 71 and 72, and therefore the natural frequencies of the plate-like spring members 71 and 72 can be changed easily by changing the positions of respective spring seats 71c to 72c with respect to the longitudinal directions of the plate-like spring members 71 and 72. With this, it is possible to easily perform adjustments in which the natural frequencies with respect to each direction are made to be separated and closer.

In addition, the article conveyance device 1 according to the present embodiment conveys the article 9 loaded on the movable bench 6 by the vibrations of the movable bench 6, and is configured to comprise the above-described vibration device 2, the vibration control means 31 that controls the respective excitation means 81 to 83 so as to generate simultaneously the periodic excitation forces by the plurality of excitation means 81 to 83 which the vibration device 2 has, with the phase difference and at the same frequency, to cause three-dimensional vibration trajectory to the movable bench 6, and the vibration switching means 32 that switches the amplitude and phase difference of the periodic excitation forces by the respective excitation means 81 to 83.

Because of being configured in this way, the article conveyance device 1 having excellent controllability and being capable of conveying the article 9 on the movable bench 6 in arbitrary directions can be configured.

<Second Embodiment>

Figure 15:
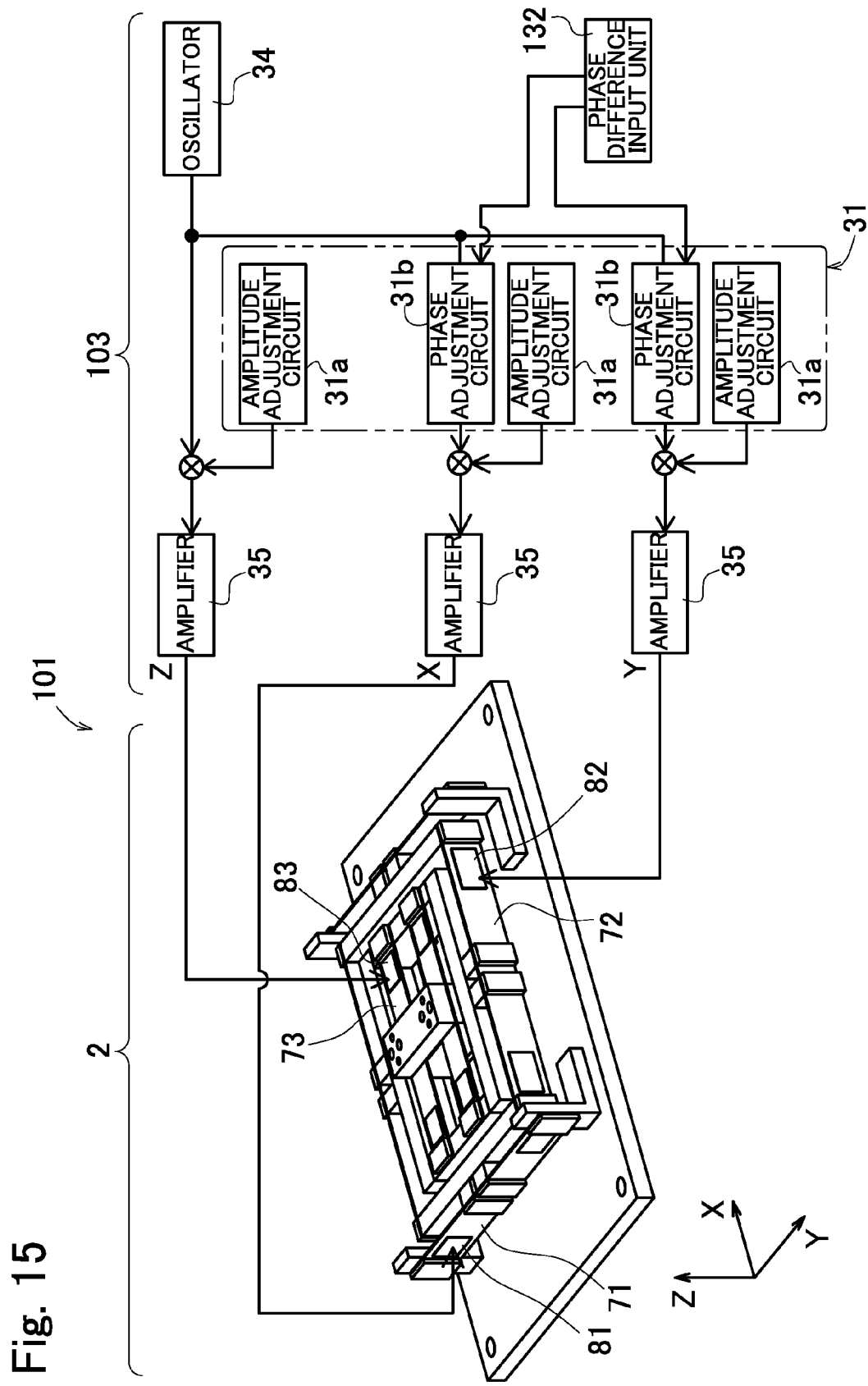
[FIG. 15]

FIG. 15 illustrates a second embodiment, configured as an article sorting device 101 that is one of the article moving devices, using the vibration device 2 of the present invention. For the same portion as the first embodiment, the same sign is applied, and the explanation is omitted.

In this embodiment, the configuration as the vibration device 2 is the same as the case of the first embodiment, only a control system unit 103 for controlling this device is different. Specifically, this embodiment does not have the vibration switching means 32 and conveyance path determination means 33 which the control system unit 3 in the first embodiment as illustrated in FIG. 1 has, and as illustrated in FIG. 15 this embodiment has a phase difference input unit 132 as substitutes for these means. The phase difference input unit 132 is configured to issue an order to each phase adjustment circuit 31b corresponding to the X and Y directions so as to set to the phase difference as a result of being inputted respective phase differences in the X direction and the Y direction with the phase of the control voltage in the Z direction as a reference.

Here, an operation principle of the article sorting device 101 in the present embodiment is also similar to one that is explained using FIGS. 10 to 13 in the above described first embodiment, and changes the movement speed and the movement direction of the article 9 by the coefficients of friction of the movable bench 6 and the article 9, and the phase difference and amplitude of the vibration in each direction.

Specifically, the sorting of the articles 9 is performed as follows.

Figure 16:
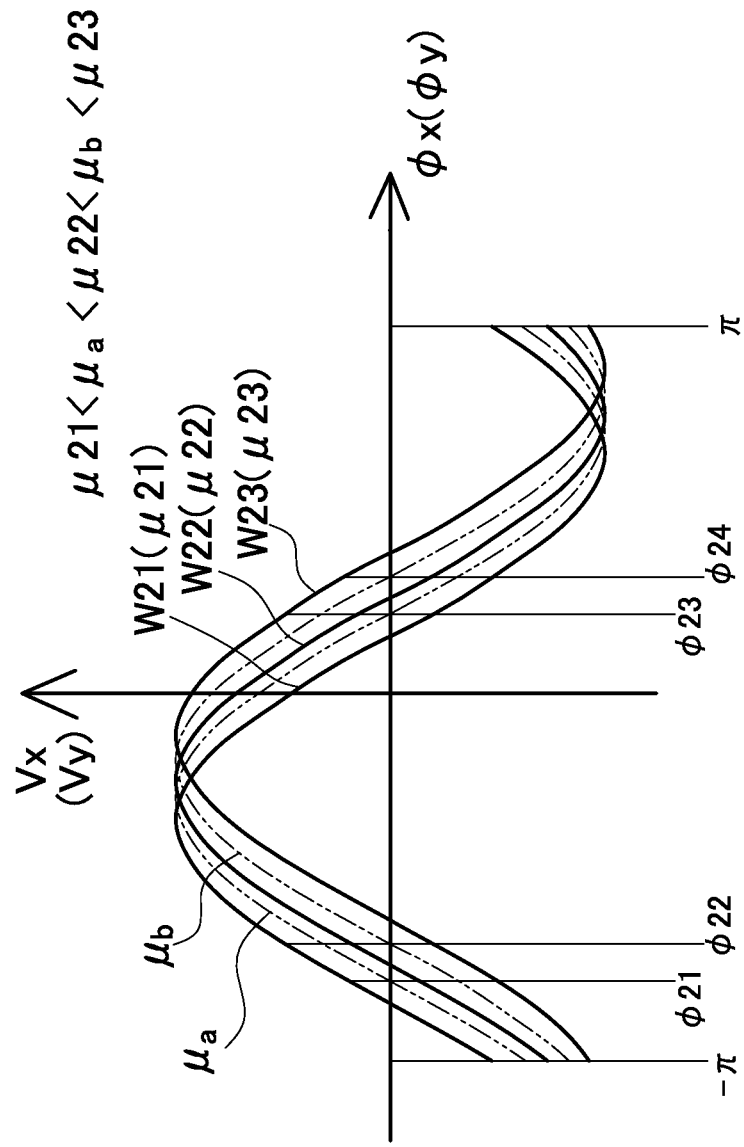
[FIG.16]

According to the knowledge of the inventors, if explanation is provided by using FIG. 16 while referring to FIG. 10, as a result of the phase difference $\phi x$ ($\phi y$), the movement speed Vx (Vy) of the article 9 changes so as to trace a curve similar to a sinusoidal wave, and the movement speed Vx (Vy) also changes depending on the coefficient of friction between the article 9 and the movable bench 6. That is, if there is a relationship of $\mu 21 < \mu 22 < \mu 23$ in which coefficients of friction between three types of articles W21, W22, and W23 and the movable bench 6 are set as $\mu 21$, $\mu 22$, and $\mu 23$, respectively, a graph of the movement speed at W22 becomes a form with a curve of the movement speed at W21 shifted in a direction in which the phase difference becomes positive, and a graph of the movement speed at W23 becomes a form with that curve further shifted in the direction in which the phase difference becomes positive. Therefore, when articles 9 having different coefficients of friction are simultaneously kept on the movable bench 6 for which elliptical vibration is to be performed, the movement speed and the movement direction are differed.

Specifically, when setting the phase difference to $\phi 21$ illustrated in FIG. 16, W21 goes in the positive direction, and W22 and W23 go to the same negative direction, but the movement speed of W23 is higher than that of W22. Further, when setting the phase difference to $\phi 22$, W21 goes in the positive direction, W22 goes in the positive direction at lower speed than W21, and W23 goes in the negative direction. When setting the phase difference to $\phi 23$, W21 goes in the negative direction, W22 goes in the positive direction, and W23 goes in the positive direction at higher speed than W22. When setting the phase difference to $\phi 24$, W21 goes in the negative direction, W22 goes in the negative direction at lower speed than W21, and W23 goes in the positive direction. Also other than such $\phi 21$ to $\phi 24$ the phase can be set arbitrarily, all of W21 to W23 can be moved in the positive direction or the backward direction, and the order of the magnitude of the movement speed can also be changed.

Also, as described above by using FIG. 13, the relationship between the phase difference $\phi x$ ($\phi y$) and the movement speed Vx (Vy) of the article 9 changes also by changing the amplitude $X_0$ ($Y_0$). That is, the curve that is similar to a sinusoidal wave, which is the movement speed Vx (Vy) of the article 9 with respect to the phase difference ϕx (ϕy), generally changes in proportion to the amplitude X0 (Y0) of the vibration displacement. Therefore, when the movement speed Vx (Vy) of the article 9 is to be doubled, generally, the amplitude of the vibration displacement in the X (Y) direction may be doubled. For achieving this, the amplitude of the control voltage may be changed in order to impart a corresponding excitation force.

By performing such vibration control in one direction with respect to the orthogonal X and Y directions simultaneously, the plurality of types of articles 9 can be sorted on the movable bench 6 and moved in different directions.

Figure 17:
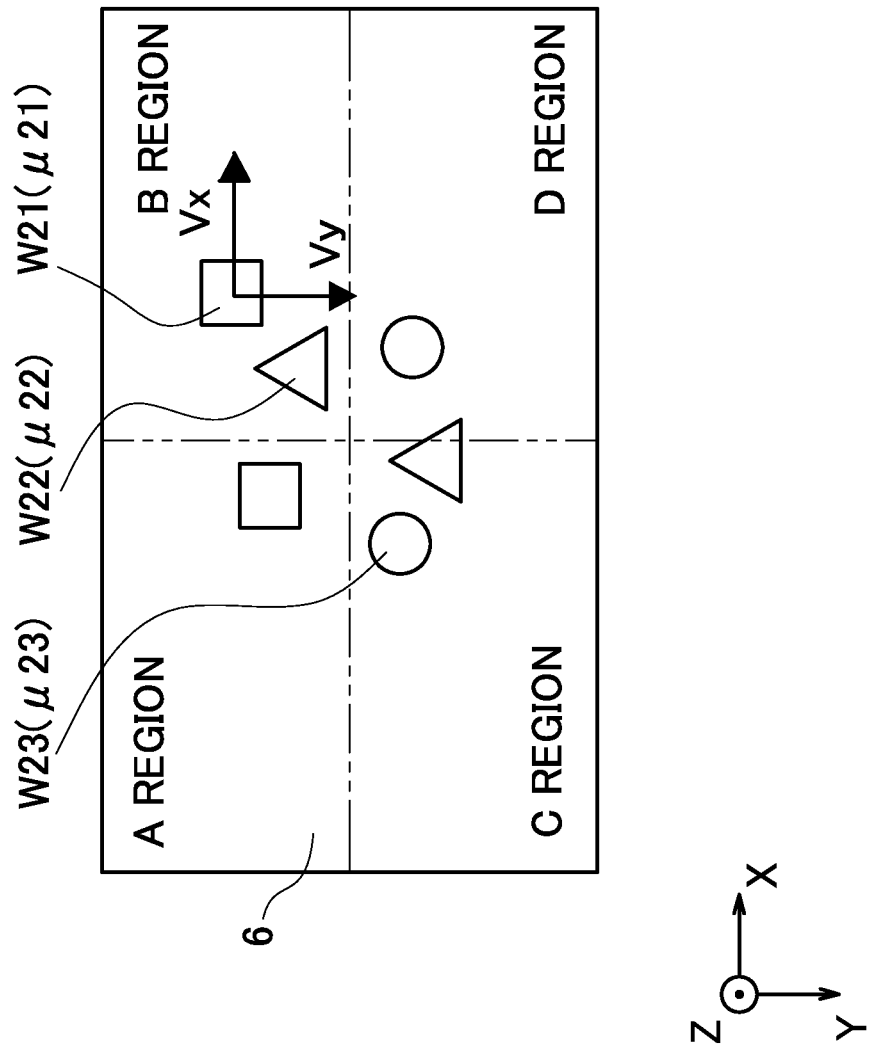
FIG. 17 is a plan view illustrating movement regions when a plurality of articles having different coefficients of friction are moved by using the vibration device.

Hereinafter, as illustrated in FIG. 17, the explanation is provided with supposing that the three types of articles of W21, W22, and W23 are loaded on the movable bench 6. Note that, respective coefficients of friction are set as μ21, μ22, and μ23, and there shall be a relationship of μ21<μ22<μ23 among these coefficients.

The movement speed of such articles on the movable bench 6 can be thought by decomposing the speed into the X directional movement speed component Vx and the Y directional movement speed component Vy, and as described above Vx and Vy can be controlled by the elliptical trajectory within the XZ plane and the elliptical trajectory within the YZ plane, respectively, and have the above-described relationship of FIG. 16, for the relationship with the phase difference with respect to the vibration component in the Z direction, respectively.

Here, as directions for moving the articles W21, W22, and W23 having different coefficients of friction, as illustrated in FIG. 17 the region is divided by up, down, left, and right and the divided regions are set as A, B, C and D regions, respectively. By changing the phase differences ϕx and ϕy, with respect to the vibration component in the Z direction, of the vibration components of the X and Y, the movement direction can be set to any of these regions.

For example, when setting ϕx and ϕy to ϕ21 and ϕ22, respectively, illustrated in FIG. 16, as indicated in the Table of FIG. 18(a), the X directional movement speed components Vx of the W21, W22, and W23 become values of the positive (+), the negative (−), and the negative (−), respectively, and the Y directional movement speed components Vy thereof become values of the positive (+), the positive (+), and the negative (−), respectively. That is, in the region illustrated in FIG. 17, the W21 will be about to move to the D region, the W22 will be about to move to the C region, and the W23 will be about to move to the A region, and as a result, as illustrated in FIG. 20(a), the W21 to W23 move while being sorted into respective regions.

Similar to this, as illustrated in the Table of FIG. 18(b), when ϕx=ϕ21 and ϕy=ϕ24, the W21, W22, and W23 proceed to the B, A, and Cregions, respectively, and as a result, as illustrated in FIG. 20(b), the W21 to W23 move while being sorted into respective regions.

In addition, as illustrated in FIGS. 18(c) and 18(d) and FIGS. 19(e) to 19(h), when ϕx=ϕ22 and ϕy=ϕ21, the 21, W22, and W23 move while being sorted into the D, B, and A regions, respectively, when ϕx=ϕ22 and ϕy=ϕ23, the W21, W22, and W23 move while being sorted into the B, D, and C regions, respectively, when ϕx=ϕ23 and ϕy=ϕ22, the W21, W22, and W23 move while being sorted into the C, D, and B regions, respectively, when ϕx=ϕ23 and ϕy=ϕ24, the W21, W22, and W23 move while being sorted into the A, B, and D regions, respectively, when ϕx=ϕ24 and ϕy=ϕ21, the W21, W22, and W23 move while being sorted into the C, A, and B regions, respectively, and when ϕx=ϕ24 and ϕy=ϕ23, the W21, W22, and W23 move while being sorted into the A, C, and D regions, respectively.

In this way, if the articles 9 have different coefficients of friction, the articles 9 can move to different directions, respectively, and each article can be changed in an arbitrary movement direction.

By using the principle as described above, specifically, the sorting of the articles 9 is performed using the present article sorting device 101 as follows. Hereinafter, the explanation is provided using FIG. 15 and FIG. 16.

First, respective phase differences ϕx and ϕy of the vibration components in the X direction and in the Y direction with respect to the vibration component in the Z direction are input from the phase difference input unit 132. In accordance with the input values, the phase difference input unit 132 orders to each corresponding phase adjustment circuits 31b and 31b so as to shift the phases of vibrations in the X and Y directions by ϕx or ϕy. Then, the phase adjustment circuit 31b imparts the phase difference from the vibration component in the Z direction by shifting the phase by ϕx or ϕy from the initial signals of the oscillator 34 to apply it as the control voltage to the first piezoelectric element 81 and the second piezoelectric element 82. In this way, for example, when the setting of ϕx=ϕ23 and ϕx=ϕ22 are input from the phase difference input unit 132, the articles 9 having the above-described properties of the W21, W22, and W23 can be sorted into the C, D and B regions of FIG. 17, respectively, similar to the case of FIG. 19(e).

Also, if the phase differences as illustrated in FIG. 18 and FIG. 19 are set from the phase difference input unit 132, the articles 9 can then be sorted as described in the respective Tables.

Here, in the present invention, when setting to the phase difference for performing the above-described sorting, the coefficient of friction at which the movement speed becomes 0 is defined as a reference coefficient of friction. That is, the reference coefficient of friction corresponding to the phase differences ϕ21 and ϕ23 in FIG. 16 is pa, and the reference coefficient of friction corresponding to ϕ22 and ϕ24 in FIG. 16 is μb. That is, setting the phase difference to ϕ23 is synonymous with setting the reference coefficient of friction to pa as the boundary where the sorting is performed while setting such that the article 9 having a larger coefficient of friction than this reference coefficient is made to go in the positive direction, and the article 9 having a smaller coefficient of friction than this reference coefficient is made to go in the negative direction. Similarly, setting the phase difference to ϕ22 is synonymous with setting the reference coefficient of friction to μb as the boundary where the sorting is performed while setting such that the article 9 having a larger coefficient of friction than this reference coefficient is made to go in the negative direction, and the article 9 having a smaller coefficient of friction than this reference coefficient is made to go in the positive direction.

Thus, the above-described phase difference input unit 132 can also be configured such that as being configured not to input the phase difference itself as the reference for sorting in each direction of the X and Y, but as being configured to input the reference coefficient of friction with respect to in each direction of the X and Y, and either of positive and negative directions to which the article moves in accordance with the magnitude (large/small) of the coefficient of friction to the reference coefficient of friction, the phase differences are set automatically and output on the basis of the graph of FIG. 16 stored internally from the information.

In addition, as it can be seen from FIG. 16, by changing the phase difference of vibration with respect to the vibration in the Z direction, the movement direction of the articles 9 having different coefficients of friction can be changed, and simultaneously, the speed difference can be provided. Therefore, the present article sorting device 101 can sort the articles not only into the regions corresponding to the four corners on the movable bench 6, but can sort the articles also into more than four types, after making a more detailed region setting such as the middle of the regions.

Also, as described above, by performing control to sort the articles 9 having different coefficients of friction, the sorting can be performed even for articles that can be conceived as having apparently different coefficients of friction, such as different surface profile even when the coefficient of friction is strictly the same. For example, such a case that even for the front face and the back face of the same member, concavities and convexities of the faces are different and contact areas with the movable bench 6 are greatly different is applicable.

As described above, the article sorting device 101 of the present embodiment is for sorting the plurality of articles 9 loaded on the movable bench 6 by the vibrations of the movable bench 6, and comprises the above-described vibration device 2, and the vibration control means 31 that controls the respective excitation means 81 to 83 so as to simultaneously generate the periodic excitation forces by the plurality of excitation means 81 to 83 which the vibration device 2 has, with the phase difference and at the same frequency, to cause the three-dimensional vibration trajectory to the movable bench 6, and the device 101 is configured to simultaneously sort the plurality of articles 9 loaded on the movable bench 6, by setting a phase difference between the periodic excitation force by the first horizontal excitation means 81 and the periodic excitation force by the vertical excitation means 83, and a phase difference between the periodic excitation force by the second horizontal excitation means 82 and the periodic excitation force by the vertical excitation means 83, respectively, so as to move each article to a different direction on the basis of the magnitude with respect to the reference coefficient of friction, of the coefficient of friction that each article 9 has, with the predetermined reference coefficient of friction as the boundary.

Because of being configured in this way, the article sorting device 101 having excellent controllability and being capable of sorting the plurality of articles 9 on the movable bench 6 in accordance with the coefficients of friction can be configured.

<Third Embodiment>

Figure 21:
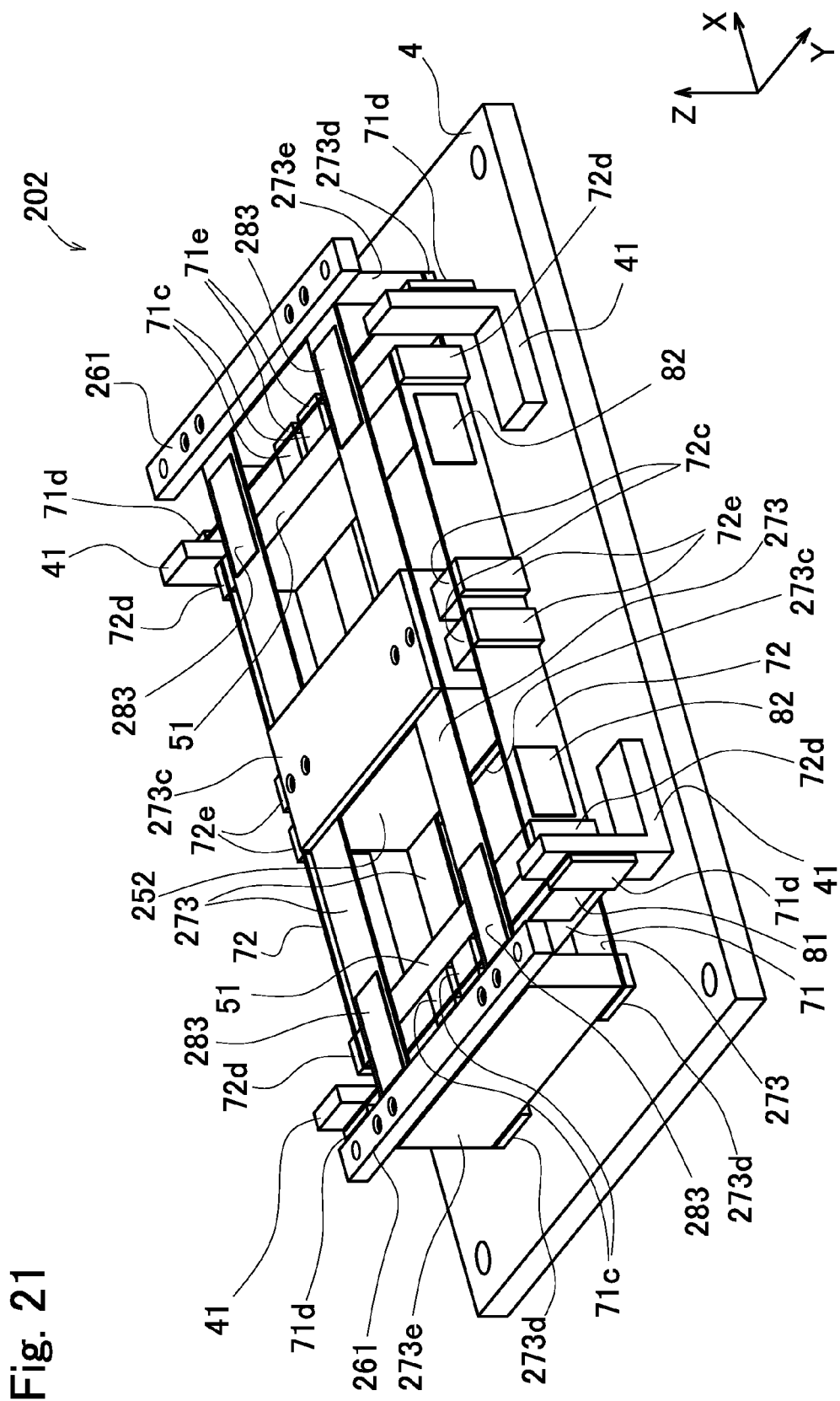
[FIG. 21]

FIG. 21 illustrates a vibration device 202, in a different form, alternative to the vibration device 2 which is common to the above-described first embodiment and second embodiment. The same signs are applied to the same portions as the cases of the first embodiment and the second embodiment, and the explanation is omitted.

In this embodiment, the form from the base 4 to the sequentially connected first plate-like spring member 71, the first middle bench 51, and the second spring member 72 are approximately the same as the form in FIG. 4.

As illustrated in FIG. 21, a second middle bench 252 connected with the second plate-like spring member 72 via the spring seat 72c has a rectangular parallelepiped block-like shape. Then, from the top face and under face of the second middle bench 252, the third plate-like spring members 73 to 73 are provided to extend toward both sides of the X direction, respectively, and are connected to spring-to-spring blocks 273e and 273e formed as rectangular parallelepiped-like blocks disposed outside of the first plate-like spring members 71 and 71, respectively.

With respect to the spring-to-spring blocks 273e and 273e, respectively, a pair of third plate-like spring members 73 to 73 which are disposed so as to be separated in the Z direction and in parallel is connected, and the blocks 273e and 273e are fixed so as to be sandwiched between spring retainers 273d to 273d from the lower direction and the movable seats 261 and 261 from the upper direction.

In the present embodiment, the movable seats 261 and 261 are different from the case of FIG. 3, and are in a form separated in the X direction, resulting in that the conveyance bench 63 can be directly fixed to the movable seats 261 and 261 without providing the movable plate 62 (see FIG. 3). On the contrary to this, in a case where the movable seat 61 is near the middle as the vibration device 2 described in FIG. 3, in order to avoid providing screws near the middle of the conveyance bench 63, it is necessary to provide the movable plate 62 between the movable seat 61 and the conveyance bench 63, and to have a configuration in which screw positions are shifted. Accordingly, compared with such configurations, when having the configuration as the present embodiment, the weight of the movable portion can be reduced.

Also when being configured as described above, the effect similar to the case of the vibration device 2 explained as the first embodiment and the second embodiment can be obtained. In addition, as an alternative to the vibration device 2 in the first embodiment, it is also possible to be configured as the article conveyance device by combining with the control system unit 3 with using the vibration device 202 of the present embodiment, and in that case the effect similar to the article conveyance device explained in the first embodiment can be obtained. Also, as an alternative to the vibration device 2 in the second embodiment, it is also possible to be configured as the article conveyance device by combining with the control system unit 103 with using the vibration device 202 of the present embodiment, and in that case the effect similar to the article sorting device explained in the second embodiment can be obtained.

<Fourth Embodiment>

Figure 22:
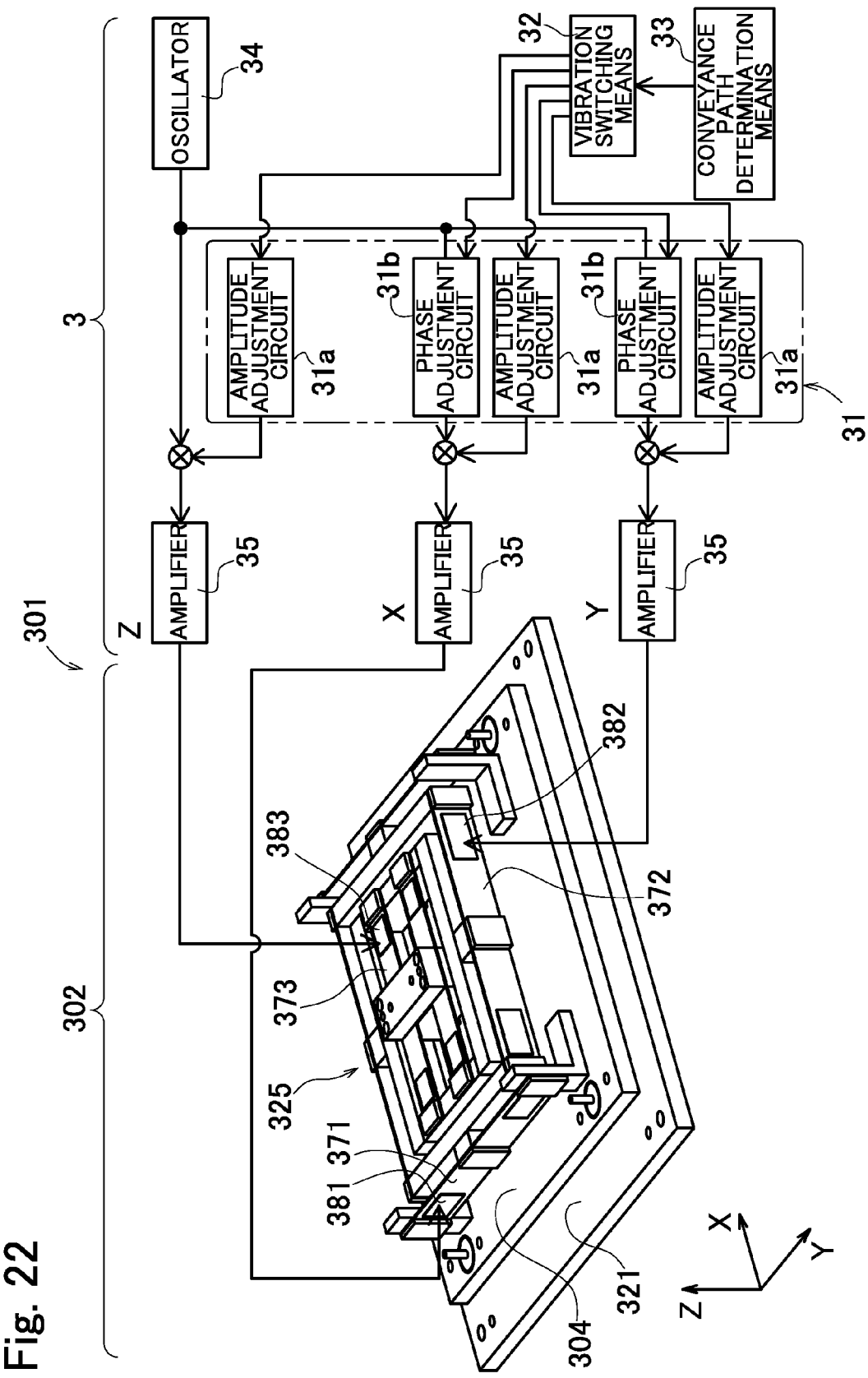
[FIG. 22]

In FIG. 22, a form in which a vibration device 302 according to a fourth embodiment of the present invention and in addition the control system unit 3 for controlling this device 302 are configured as an article conveyance device 301 that is one of the article moving devices, is illustrated.

The vibration device 302 illustrated in this figure is in a state where a mounting bench and a peripheral wall part which are described later are removed, and a state where a drive part 325 is exposed, and the drive part 325 is elastically supported on a base 304, and piezoelectric elements 381, 382, and 383 as the excitation means are provided in the drive part. In addition, the base 304 is elastically supported on a fixed bench 321.

The control system unit 3 is configured such that the vibrations are caused by performing a control of the voltage to be applied to the piezoelectric elements 381, 382, and 383 to impart the periodic excitation force to the vibration device 302 in each direction of the X as the first horizontal direction, the Y as the second horizontal direction, and the Z as the vertical direction.

Note that, similar to the above-described other embodiments, each direction of the X, Y, and Z is defined as illustrated in the coordinate axis in the drawings, and also in the following, the explanation will be advanced along the coordinate axis illustrated in the drawings as appropriate.

Figure 23:
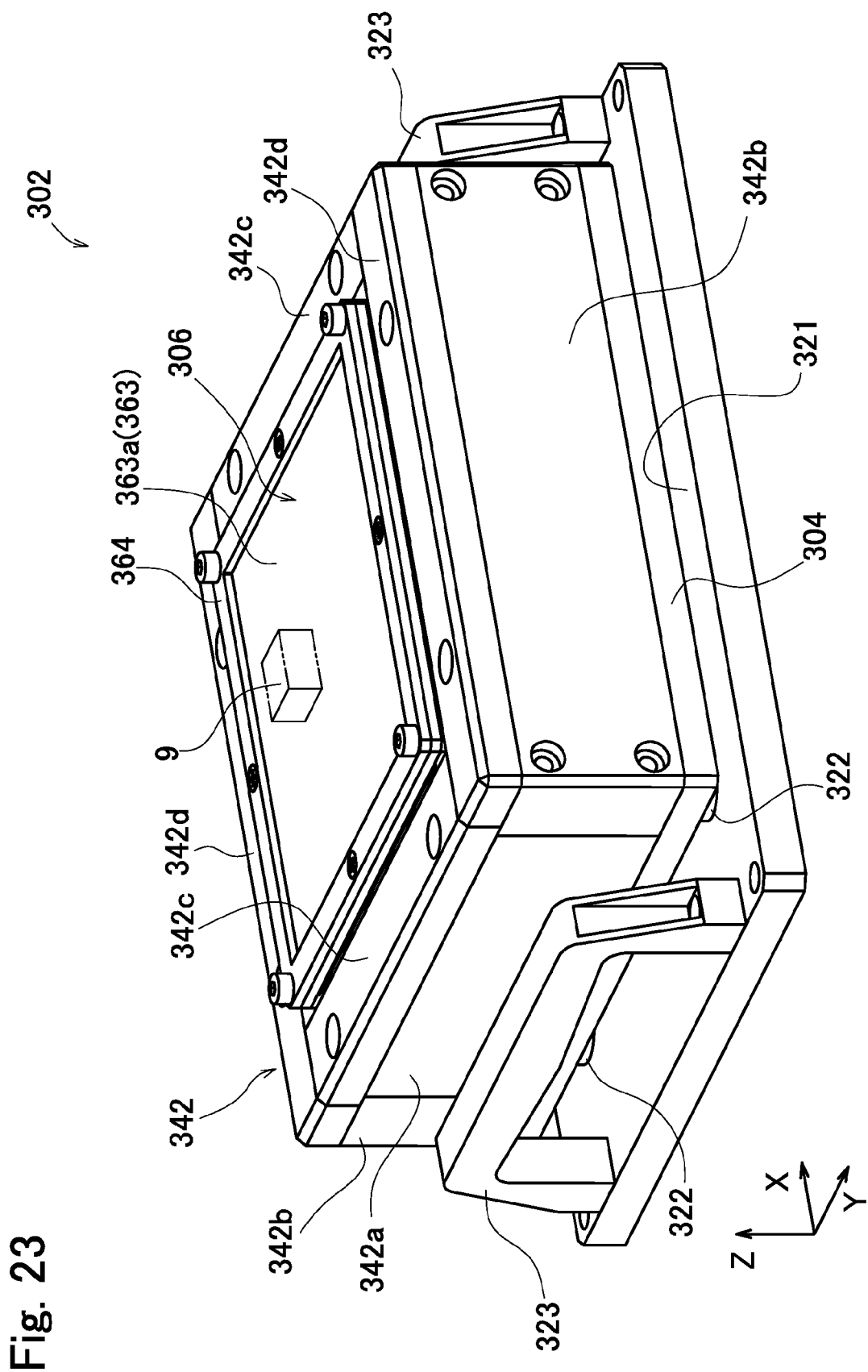
[FIG. 23]
Figure 24:
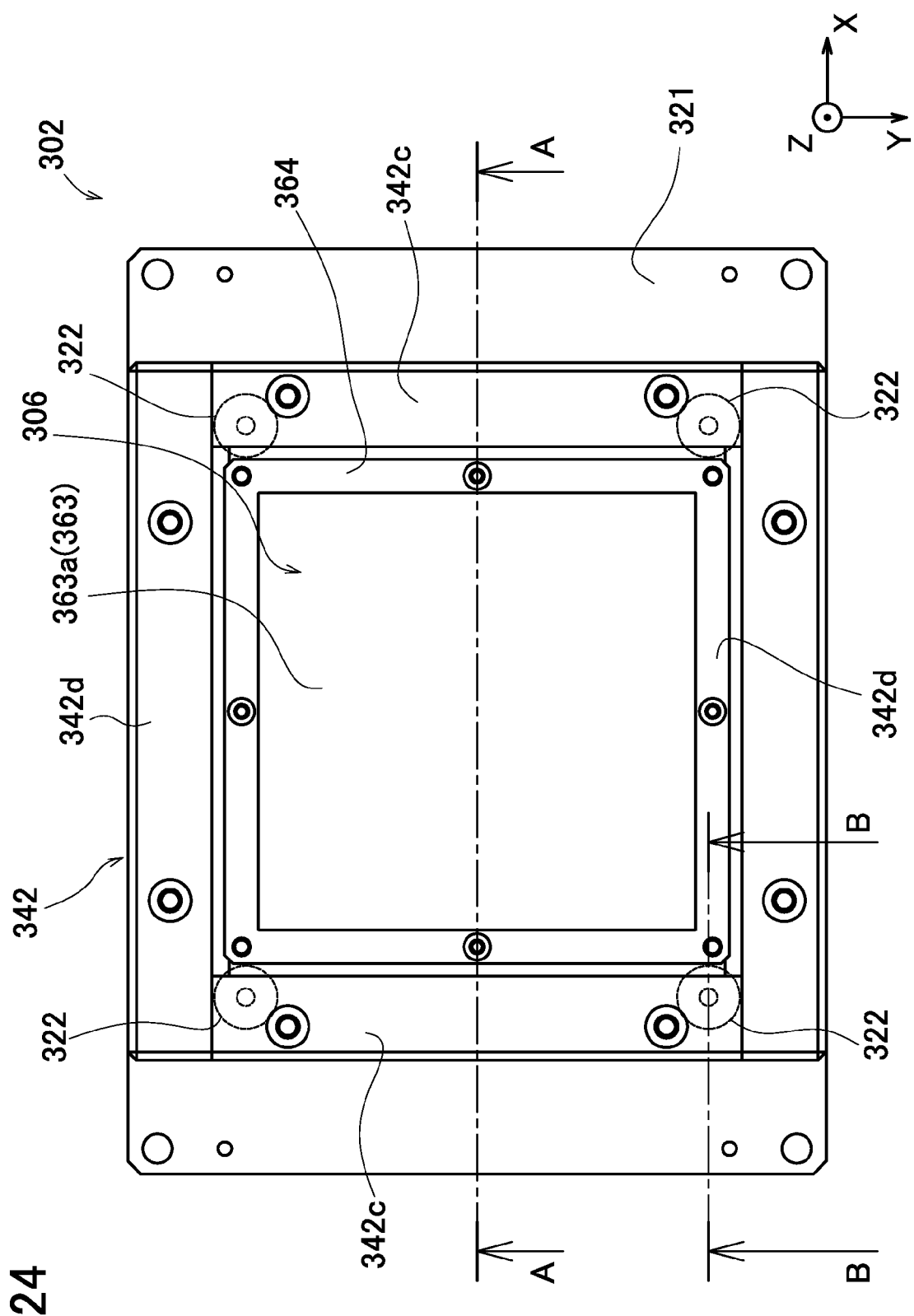
[FIG. 24]

FIG. 23 is a perspective view illustrating the above-described vibration device 302 as a state where the device is actually used, and FIG. 24 illustrates this as a plan view. As illustrated in FIG. 23 and FIG. 24, in this state, four faces of the front face, the back face, and the lateral faces are covered with the above-described peripheral wall part 342 installed along the outer peripheral edge of the base 304. Also, a rectangular-shaped mounting bench 363 that configures one part of the movable bench 306 is provided at the top face, and as a mounting face, a top face 363a of the mounting bench 363 is configured to be able to load the article 9 to be conveyed.

The peripheral wall part 342 has a function of covering and protecting the four faces of the drive part 325 (see FIG. 22), and a function of increasing the weight of the base 304 and adjusting the barycentric position, and is configured by combining lower part weights 342a to 342b and top part weights 342c to 342d which are formed like a block.

The base 304 is elastically supported on the fixed bench 321 via vibration isolation springs 322 to 322 disposed at four corners of the under face, and the fixed bench 321 is allowed to be installed at any installation surface. At the fixed bench 321, since a pair of handles 323 and 323 are provided with being separated in the X direction, the transportation of the vibration device 302 can be easily performed by grasping the handles 323 and 323.

Because of the configuration where the base 304 is elastically supported via the vibration isolation springs 322 to 322 as described above, even if the vibrations are caused to the movable bench 306, propagation of the vibrations to the fixed bench 321 can be suppressed, and transmission of the vibrations with respect to the installation surface can be prevented. Note that, in the vibration device 302 in the present embodiment, although the fixed bench 321 is provided at the lower side of the base 304 for easily performing the transportation and installation, it is also possible to install directly on the installation surface via the vibration isolation springs 322 to 322. That is, although the present embodiment has the configuration where the fixed bench 321 is provided in view of transportability, from the spirit of the present invention it cannot be said that the fixed bench 321 is an essential constituent element, and the fixed bench 321 can be identified with the installation surface. As described later, the present invention has a characteristic that the overall device mass is regarded as one that a plurality of mass bodies are connected, and there shows an association among the barycentric positions of these mass bodies. In this context, the overall device mass designates a total mass of portions on and over the base 304 elastically supported by the vibration isolation springs 322 to 322, and a mass of the fixed bench 321 explained as being not essential in the present invention is not taken into consideration.

Figure 25:
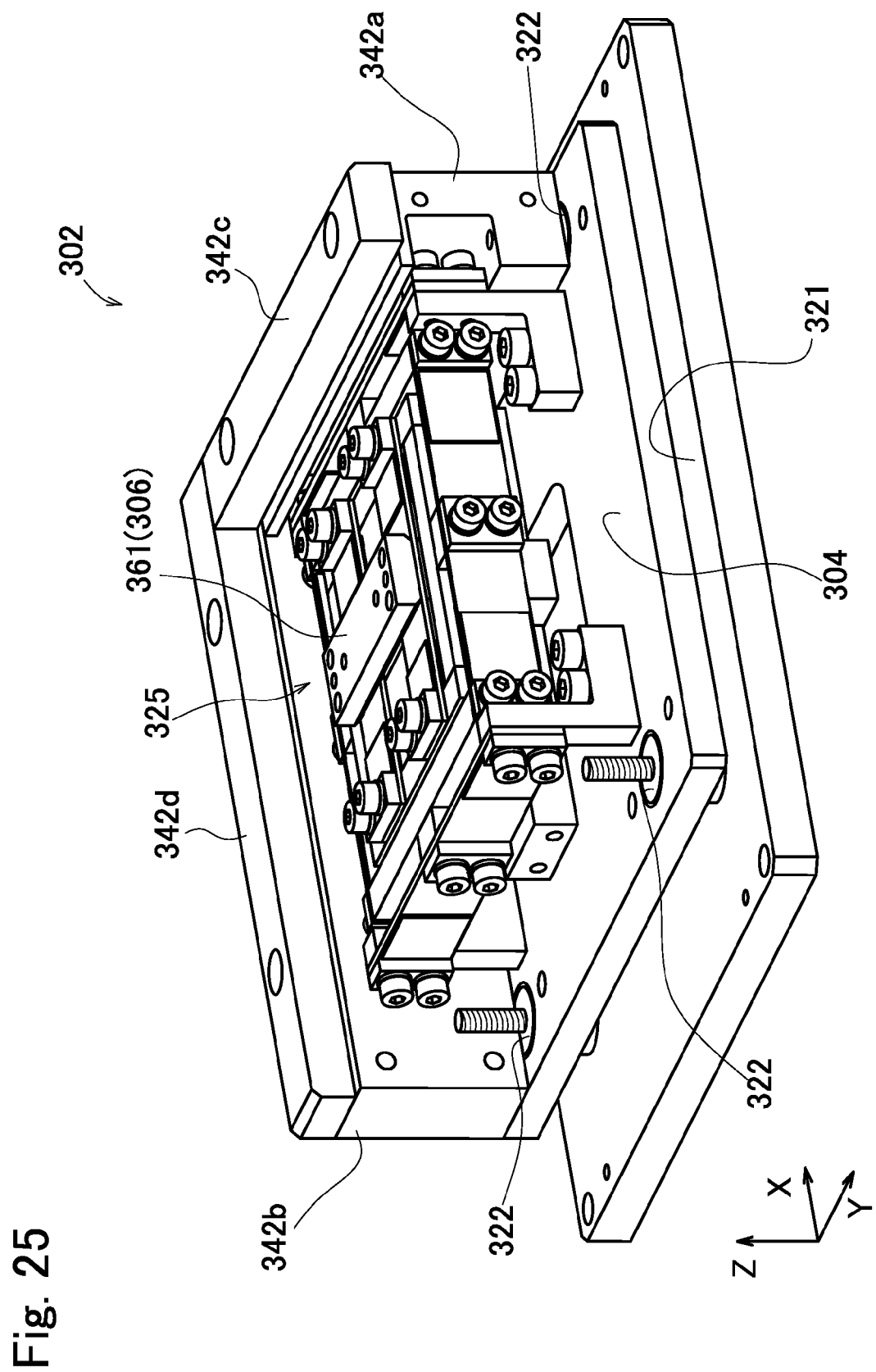
[FIG. 25]

A state where a part of members that configure the movable bench 306, a part of the lower part weights 342a to 342b and top part weights 342c to 342d, and the handles 323 and 323 are removed from the vibration device 302 of FIG. 23, is illustrated in FIG. 25.

The vibration device 302 has a movable seat 361 therein, which is elastically supported with respect to the three axis directions of the X, Y, and Z, and the movable seat 361 is formed as a rectangular parallelepiped-like block. At the top part of the movable seat 361, the above-described mounting bench 363 (see FIG. 23) is installed. The movable seat 361 configures the movable bench 306 integrally with the mounting bench 363, and is elastically supported with respect to the base 304 inside the vibration device 302, and the vibrations can be imparted by an excitation means which is described after.

As illustrated in FIG. 24, the vibration isolation springs 322 to 322 for elastically supporting the base 304 with respect to the fixed bench 321 are disposed at four corners of the base 304. As illustrated in FIG. 25, the vibration isolation springs 322 to 322 are provided so as to project from the base 304, and the pointed end is configured to be connected to the lower part weights 342a and 342a disposed so as to extend in the Y direction, and to elastically support the base 304 via these weights.

Figure 29:
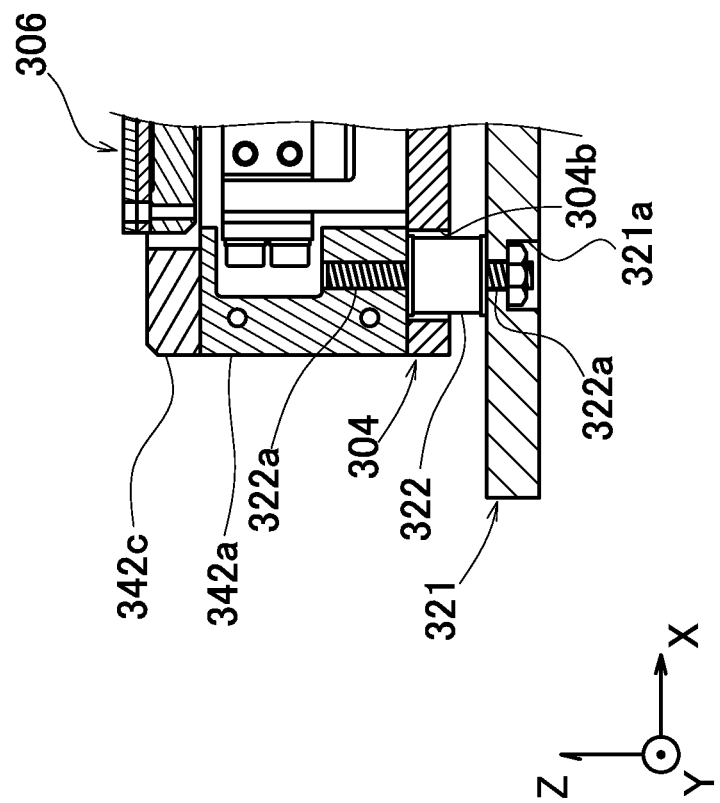
[FIG. 29]

For a specific connection configuration of the vibration isolation spring 322, the explanation is provided using FIG. 29. This figure is a cross-sectional arrow view taken along line B-B in FIG. 24.

As the vibration isolation spring 322, one in a general form can be used, and herein, one having a cylindrical elastic part at the middle, and comprising a disc-like plate at both sides with sandwiching the elastic part, and in which screw parts 322a and 322a are projected to both sides from the plate, is used. The vibration isolation spring 322 fixes the screw part 322a by using a nut to a hole part 321a formed in the fixed bench 321, with one side end face abutted on the top face of the fixed bench 321. In addition, the opposite side end face is configured to screw the screw part 322a until abutting the under face of the lower part weight 342a with the opposite side end face inserting into a hole part 304b formed in the base 304.

In this way, the vibration isolation spring 322 is allowed to elastically support the base 304 connected to the lower part weight 342a with respect to the fixed bench 321. As described above, when having a configuration where the fixed bench 321 is not used, it may be configured so as to dispose the vibration isolation spring 322 on the installation surface directly, using the vibration isolation spring 322 not having the screw part 322a at the lower end.

Figure 26:
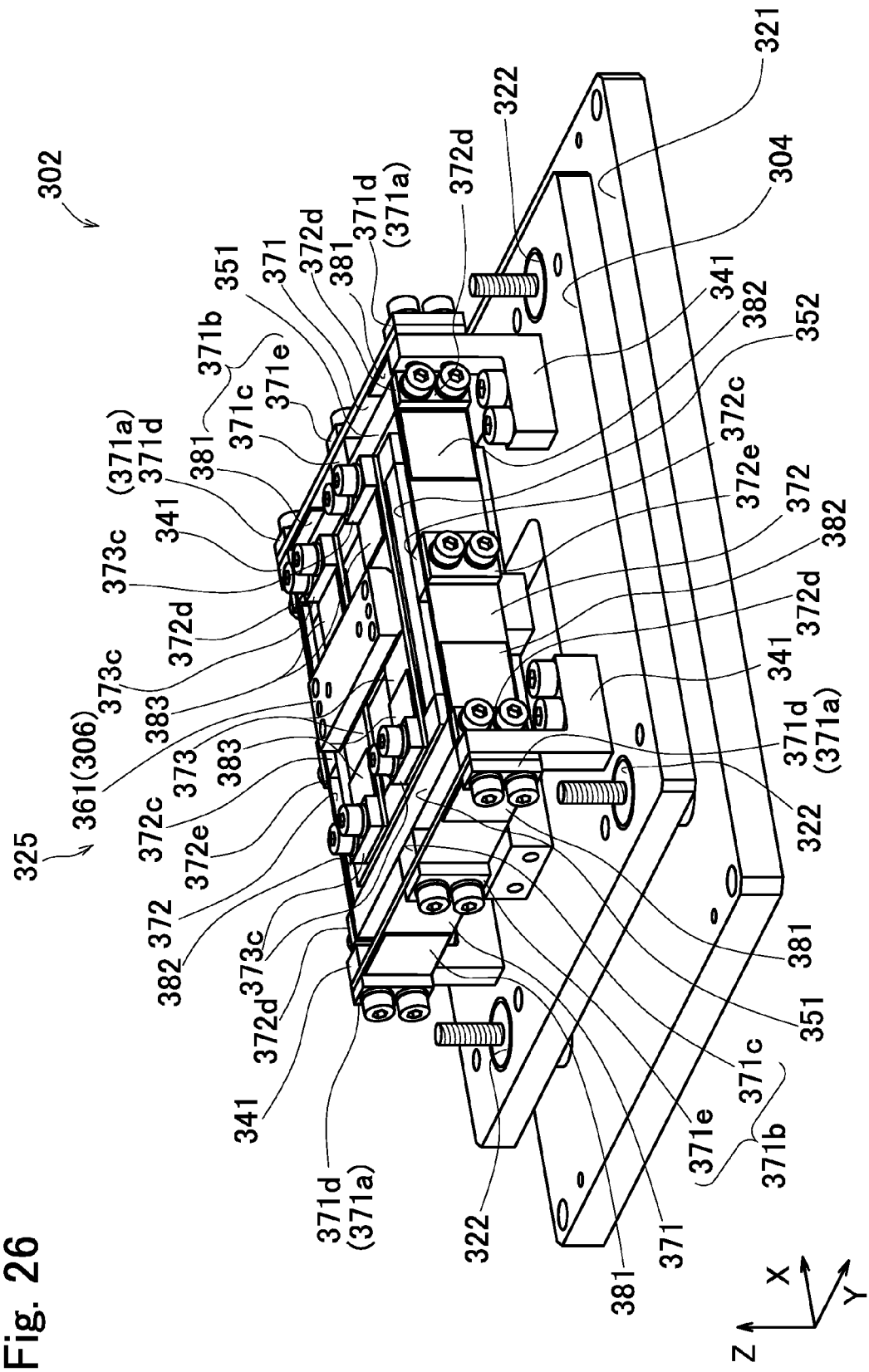
[FIG. 26]

A state where the peripheral wall part 342 is further removed from the vibration device 302 in the state of FIG. 25 is illustrated in FIG. 26. Note that, intrinsically, the base 304 loses the support by removing the peripheral wall part 342 and cannot keep a separated state from the fixed bench 321, but in the present figure it is described in a usual position relationship where the base 304 is elastically supported.

Hereinafter, by using this figure, the configuration of the vibration device 302 according to the present embodiment is explained in detail.

This vibration device 302 is configured to elastically support the movable seat 361 in the three directions of the X, Y, and Z, with respect to the base 304 elastically supported using the above-described vibration isolation spring 322 on the fixed bench 321 that can be approximately identified with the installation surface, and is provided with the first plate-like spring members 371 and 371 as the first horizontal elastic support means, the second plate-like spring members 372 and 372 as the second horizontal elastic support means, and the third plate-like spring members 373 and 373 as the vertical elastic support means so as to sequentially connect the base 304, first middle benches 351 and 351, a second middle bench 352, and the movable seat 361 as the rigid body portion. The respective plate-like spring members 371 to 373 are disposed such that the plate thickness direction becomes in the X, Y, and Z directions, respectively, resulting in that the elastic deformation can be easily performed with respect to the directions.

In addition, first piezoelectric elements 381 to 381 as the first horizontal excitation means for vibrating the movable seat 361 in the three directions of the X, Y, and Z, second piezoelectric elements 382 to 382 as the second horizontal excitation means, and third piezoelectric elements 383 to 383 as the vertical excitation means are included.

Hereinafter, explanations for these configurations are provided in more detail.

First, the fixed bench 321 and the base 304 are formed as the rectangular-shaped plate, respectively, and as described above, the base 304 is elastically supported on the fixed bench 321 by the vibration isolation springs 322 to 322 provided at the four corners. The vibration isolation springs 322 to 322, for which one that shows weak spring characteristic having about one-tenth of the spring constant as compared with the above-described plate-like spring members 371 to 373 installed in each direction is used, is configured to suppress the propagation of vibrations with respect to the installation surface from the base 304, and to reduce counterforce from the installation surface to stabilize the attitude of the base 304. Also, with respect to the resonance frequency in each direction of the X, Y, and Z in a mode where the movable bench 306 vibrates in the opposite phase with respect to the base 304, the resonance frequency in the Z direction in a mode where the overall device on the base 304 vibrates with respect to the fixed bench 321 integrally is kept at or below one-tenth, and also when causing the vibrations to the movable bench 306, the base 304 can be stabilized.

Then, on the base 304, attachment blocks 341 are fixed so as to be rectangularly disposed at four places in positions slightly closer to the center than the vibration isolation springs 322 to 322. The attachment blocks 341 are formed as blocks having an L-shaped cross section respectively, and are in a state where one side that forms the letter L is abutted to the base 304, and the other side is raised. Then, the raised side is configured to form the YZ plane orthogonal to the X direction. Then, the first plate-like spring members 371 and 371 are provided to connect to the attachment blocks 341 and 341 which are adjacent in pairs in the Y direction. Since the first plate-like spring members 371 and 371 are attached in the YZ plane which the above-described respective attachment blocks 341 to 341 have, the plate thickness direction will be in the X direction and the longitudinal direction will be in the Y direction.

Also, the first plate-like spring members 371 and 371 will be provided in parallel by two parts with the members 371 and 371 separated at a predetermined distance in the X direction, because the members 371 and 371 are respectively provided at the two pairs of attachment blocks 341 to 341.

Also, both end parts of the first plate-like spring members 371 and 371 are supported such that the deflection angle is regulated, because the both end parts are fixed by using a bolt so as to be sandwiched between rectangular-shaped spring retainers 371d to 371d and the YZ plane which the above-described respective attachment blocks 341 to 341 have.

Then, near the center of the longitudinal direction of the first plate-like spring members 371 and 371, the first middle benches 351 and 351 are respectively connected via the spring seats 371c. The first middle benches 351 are formed in a rectangular parallelepiped shape extending in the Y direction, respectively. In addition, spring retainers 371e and 371e are provided so as to oppose to the respective spring seats 371c and 371c, respectively. The first plate-like spring members 371 and 371, in which the deflection angle is regulated so as to be sandwiched by the opposing spring seats 371c and 371c and spring retainers 371e and 371e respectively, are connected to the above-described first middle benches 351 and 351 by being bolt-fastened at these portions. Although the first middle benches 351 and 351 are in two-divided configuration as illustrated in the plan view of FIG. 27, since the benches 351 and 351 are connected by the second plate-like spring members 372 and 372 which are described later, the benches 351 and 351 operate integrally.

Returning to FIG. 26, the above-described first middle benches 351 and 351 are formed in the rectangular parallelepiped shape as described above, and six faces are disposed so as to be in a direction orthogonal to each plane of the X, Y, and Z axes, respectively. Then, two second plate-like spring members 372 and 372 are provided so as to connect between the XZ planes orthogonal to the Y axis which each has.

By attaching the members 372 and 372 in this way, the two second plate-like spring members 372 and 372 are disposed in parallel while being separated from each other at a predetermined distance in the Y direction, and the plate thickness directions are respectively orthogonal to the Y axis, and the longitudinal direction is directed to the X direction.

Because such that both end parts are sandwiched between rectangular-shaped spring retainers 372d to 372d and the XZ plane which the above-described first middle benches 351 and 351 have, the members 372 and 372 are fixed by bolt fasteners in that portion, the second plate-like spring members 372 and 372 are supported such that the deflection angle is regulated.

Near the center, in the longitudinal direction, of the second plate-like spring members 372 and 372, the second middle bench 352 is connected via the spring seats 372c and 372c. In addition, spring retainers 372e and 372e are provided so as to oppose to each of the spring seats 372c and 372c. The second plate-like spring members 372 and 372, in which the deflection angle is regulated so as to be sandwiched by the opposing spring seats 372c and 372c and spring retainers 372e and 372e respectively, are connected to the above-described second middle bench 352 by being bolt-fastened at these portions.

Figure 27:
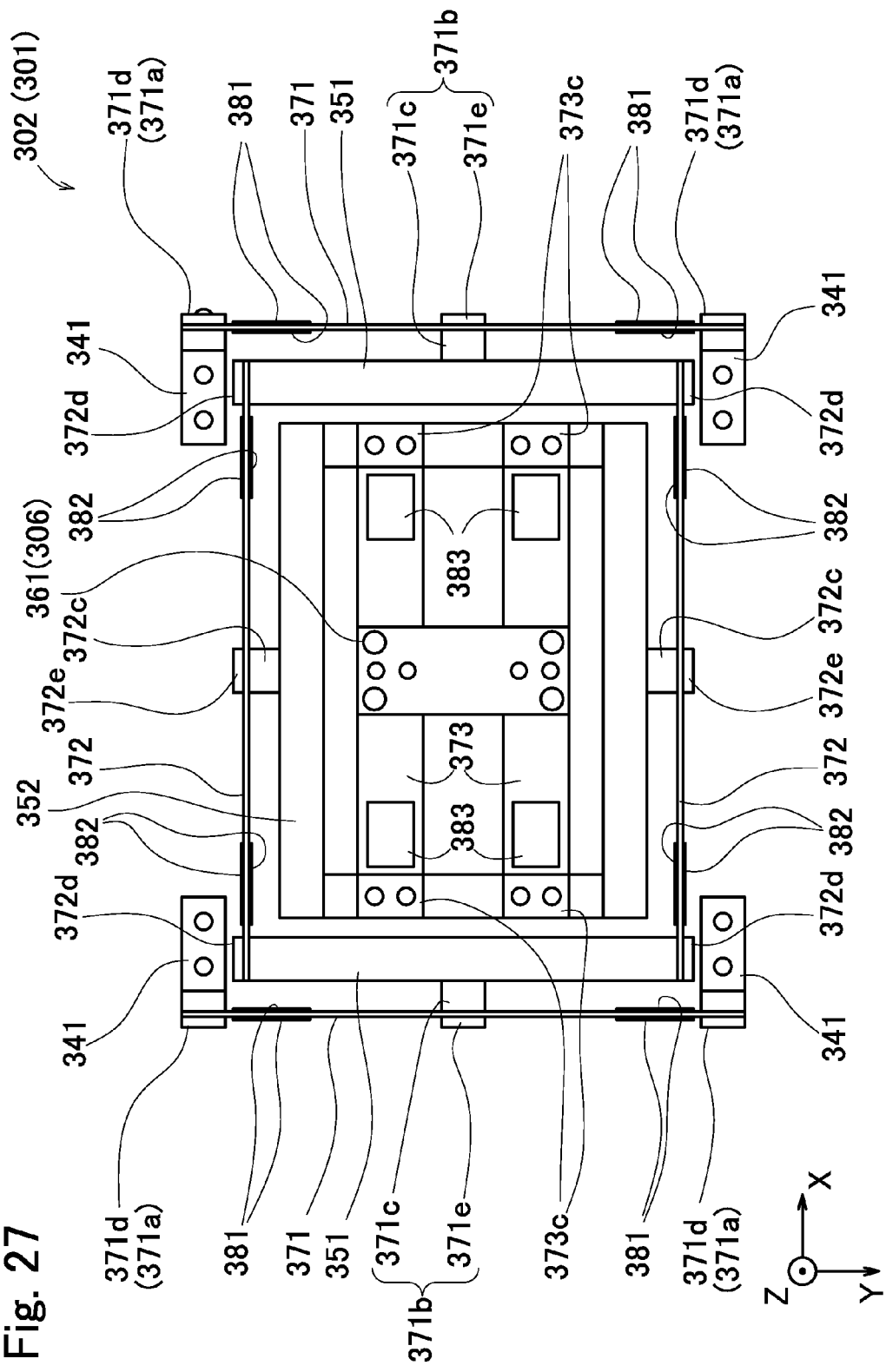
[FIG. 27]

The second middle bench 352 is configured as a rectangular frame body as illustrated in the plan view of FIG. 27, and is formed by combining four rectangular parallelepiped blocks each having six faces which are orthogonal to each other in the X, Y, and Z directions.

As described above, the first plate-like spring members 371 and 371 and the second plate-like spring members 372 and 372 can change the spring constant, and also change the natural frequency, by changing the effective length by changing the size of the spring seats 371c to 371c and the spring retainers 371e to 371e, and by using one having the different thickness and width.

Figure 28:
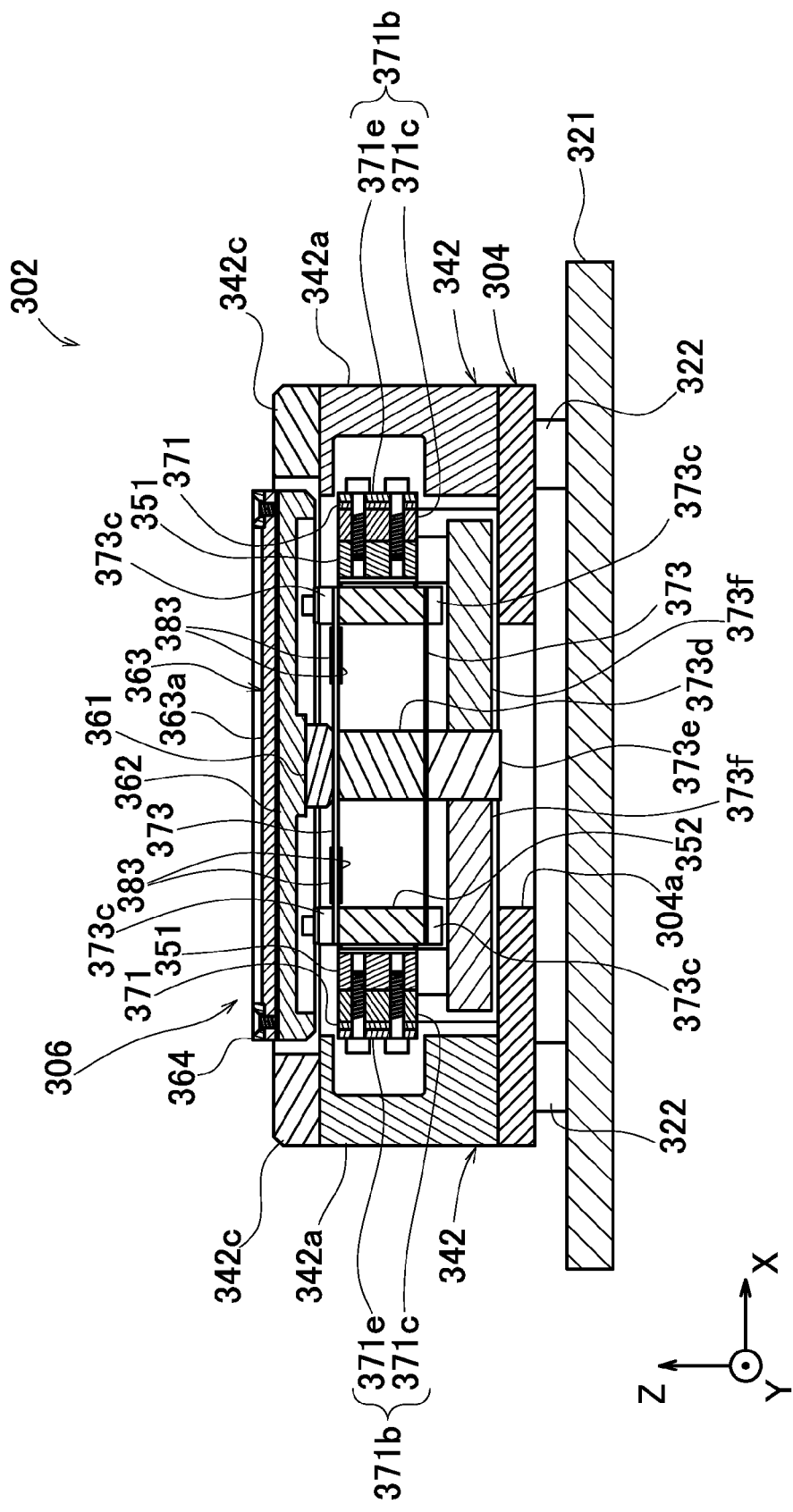
[FIG. 28]

Here, a cross-sectional arrow view taken along line A-A in FIG. 24 is illustrated in FIG. 28, and the explanation is continued supplementary using FIG. 28 in addition to FIG. 26.

A total of four third plate-like spring members 373 to 373 are provided by two respectively at the top face and under face of the second middle bench 352 configured as the rectangular frame body. The third plate-like spring members 373 to 373 are provided so as to connect in the X direction between respective XY planes formed as the top face and under face of the portion that exists at positions of two sides parallel to the Y direction, of sides that configures the rectangle which forms the second middle bench 352. Both end parts of the third plate-like spring members 373 and 373 are fixed by bolt-fasteners so as to be sandwiched between the rectangular-shaped spring retainers 373c to 373c and the XY plane which the above-described second middle bench 352 has, and therefore, the both end parts of the third plate-like spring members are supported such that the deflection angle is regulated at this portion.

Also, near the middle part of the third plate-like spring members 373 and 373 connected at the top face of the second middle bench 352, and the third plate-like spring members 373 and 373 connected at the under face of the second middle bench 352, a spring-to-spring block 373d is provided in order to maintain the interval between both of the members.

In addition, below the spring-to-spring block 373d, a spring retainer 373e is provided with sandwiching the third plate-like spring members 373 and 373 that are connected at the under face of the second middle bench 352. The spring retainer 373e can perform the fixing using the screws, which are not illustrated, with the two third plate-like spring members 373 and 373 sandwiched between the under face of the second middle bench 352 and the spring retainer 373e.

Also, above the spring-to-spring block 373d, the above-described movable seat 361 is provided with sandwiching the third plate-like spring members 373 and 373 that are connected at the top face of the second middle bench 352. The movable seat 361 can perform the fixing using screws, with two third plate-like spring members 373 and 373 sandwiched between the top face of the second middle bench 352 and the movable seat 361. At the top face of the movable seat 361, the movable plate 362 formed like a rectangular plate is attached, at the top face thereof, the mounting bench 363 is screw-fastened together with a frame member 364. The top face of this mounting bench 363 will be the mounting face 363a for loading the article. The mounting bench 363, frame member 364, and movable plate 362 configure the above-described movable bench 306 (see FIG. 24) together with the movable seat 361.

In addition, counter weights 373f and 373f, which are formed like blocks so as to project to the left and right of the spring retainer 373e, are provided to balance with the movable bench 306, so that the barycentric position of overall of the movable bench 306 side supported by the third plate-like spring members 373 and 373 is almost the same position as the center between the third plate-like spring members 373 and 373 in the horizontal direction and the vertical direction. Hereinafter, this barycentric position is referred to as "the barycentric position in the movable bench 306."

In this way, by positioning "the barycentric position in the movable bench 306" at the center in the horizontal direction and the vertical direction between the third plate-like spring members 373 and 373, even if the vibrations in the X direction and the Y direction are caused with respect to the movable bench 306, the so-called swivel phenomenon, in which the movable bench 306 tilts by impact of inertial force, can be suppressed.

As described above, in the vibration device 302 of the present embodiment illustrated in FIG. 26, it is configured that the first middle benches 351 and 351 are elastically supported with respect to the base 304 by the first plate-like spring members 371 and 371 in the X direction, the second middle bench 352 is elastically supported with respect to the first middle benches 351 and 351 by the second plate-like spring members 372 to 372 in the Y direction, and the movable seat 361 is elastically supported with respect to the second middle bench 352 by the third plate-like spring members 373 to 373 in the Z direction. By providing such configurations, the movable bench 306 is configured to be elastically supported with respect to the base 304 in each direction of the X, Y, and Z.

Each of the plate-like spring members 371 to 373 has elasticity in the X, Y, and Z directions which are the plate thickness directions respectively, and has sufficient rigidity in the width direction and longitudinal direction orthogonal to this direction. Therefore, the support in each direction can be considered as being independent.

Also, for each direction, by providing the first to third plate-like spring members 371 to 373 in parallel respectively, and by making the members to support in pairs, it is configured as if the members configured one part of the parallel link. By this, each of the plate-like spring members 371 to 373 is configured to be able to be displaced while keeping the relationship where the clearance is constant between the pairs, without performing the twist movement.

Also, in the vibration device 302 of the present embodiment, as illustrated in FIG. 23 and FIG. 24, by providing the peripheral wall part 342 having a function as a barycentric adjustment member on the base 304, the barycentric position of the base 304, the peripheral wall part 342, and the members fixed to these is configured to be adjustable. Hereinafter, this barycentric position is referred to as "the barycentric position in the base 304." The base 304 can easily adjust the barycentric position of the base 304 to a higher position by providing the peripheral wall part 342, since the weight of the base 304 is reduced by providing an opening part 304a in the middle part as illustrated in FIG. 28. By doing so, the barycentric position of the base 304 is set to a position that is almost the same as the barycentric position in the above-described movable bench 306 in the horizontal direction and the vertical direction.

The peripheral wall part 342 is configured to be able to minutely adjust the barycentric position of the horizontal direction and the up-and-down direction, since the part 342 have a configuration in which the lower part weights 342a to 342b configured from four blocks, and similarly the top part weights 342c to 342d configured from four block are connected up and down. Particularly, the top part weights 342c to 342d can easily perform replacement because the weights 342c to 342d appear outside, and can instantly cope with various condition changes such as device conditions and use conditions, such as balance adjustment with equipment to be additionally connected such as an inspection machine, and balance adjustment with the weight of an article to be conveyed.

Also, by providing weight as the peripheral wall part 342 with respect to the base 304, the base 304 is configured to have a mass about ten times as large as a mass of the movable bench 306. In this way, even if the excitation force is imparted, in each direction of the X, Y, and Z, with respect to the movable bench 306, the vibration displacement which occurs to the base 304 by the counterforce can be reduced. Therefore, also at the operation, the position of the base 304 can be stabilized, and the movable bench 306 can be vibrated with higher accuracy.

Also, when the peripheral wall part 342 is seen from the viewpoint of protection of the drive part 325, at least the plate-like spring members 371 to 373 as the elastic support means, and the piezoelectric elements 381 to 383 which are provided at these members are preferably configured to be covered from outside.

For "the barycentric position of the base 304" defined as described above, the rigid body portion positioned from the first plate-like spring members 371 to 371 to the second plate-like spring members 372 to 372 are referred to as "a barycentric position in the first middle bench 351", and the rigid body portion positioned from the second plate-like spring members 372 to 372 to the third plate-like spring members 373 to 373 are referred to as "a barycentric position in the second middle bench 352." The first plate-like spring members 371 to 371 and the second plate-like spring members 372 to 372 are respectively provided at an attachment position which is almost the same as in the Z direction, and equally disposed with the above-described movable bench 306 as the center. For this reason, both of " the barycentric position in the first middle bench 351" and "the barycentric position in the second middle bench 352" are configured to be almost the same as the above-described "barycentric position in the movable bench 306" and "barycentric position of the base 304," with respect to the horizontal direction and vertical direction. Note that, if the plate-like spring members 371 to 373 are provided with dividing in the Z direction, it is sufficient that their center position is thought as the above-described attachment position.

In other words regarding the above-described relationship of the barycentric position, if the mass of overall device elastically supported using the vibration isolation springs 322 to 322 is supposed as a first mass body, a second mass body, and a third mass body sequentially connected from the base 304 side via the first plate-like spring members 371 to 371 and the second plate-like spring members 372 to 372, these mass bodies have a relationship that respective barycentric positions are almost the same each other in the horizontal direction and vertical direction.

Because of being configured in this way, when assuming as two mass bodies of a mass body (the first mass body) of the base 304 side elastically connected in the X direction via the first plate-like spring members 371 to 371, and a mass body (the second mass body+the third mass body) of the first middle bench 351 side, the barycentric positions of the two mass bodies are almost the same with respect to both of the horizontal direction and vertical direction. Therefore, if portions of the first middle bench 351 side integrally cause vibrations in the X direction, since the rotation moment does not occur between both mass bodies, the attitude is stable without occurring tilt at the base 304 side, and as a result, operation stabilization of the movable bench 306 can be achieved.

Also, when the overall device is considered as two mass bodies of a mass body (the first mass body+the second mass body) of the first middle bench 351 side elastically connected in the Y direction via the second plate-like spring members 371 to 371, and a mass body (the third mass body) of the second middle bench 352 side, the barycentric positions of the two mass bodies are almost the same with respect to both of the horizontal direction and vertical direction. Therefore, also with respect to the Y direction, the effect similar to the above is obtained.

The vibration device 302 of the present embodiment illustrated in FIG. 26 has excitation means 381 to 383 independently in the X, Y, and Z directions.

First, the first horizontal excitation means that is the excitation means in the X direction is configured from a total of eight first piezoelectric elements 381 to 381 which are stuck by two respectively in the front and back near the both ends of two first plate-like spring members 371 and 371. The first piezoelectric elements 381 to 381 cause elongation or contraction in the Y direction by being applied with voltage, and can cause the displacement in the X direction by causing the bending to the first plate-like spring members 371 and 371.

Since the first plate-like spring member 371 has a bend point in the middle at which the bending direction changes, from a base-side connection point 371*a* positioned by the spring retainer 371*d* of the end part, to a first middle bench-side connection point 371*b* positioned by the spring seat 371*c* and the spring retainer 371*e* of the middle, affixing the first piezoelectric elements 381 to 381 up to the portion, instead, will inhibit the deformation and reduce the efficiency. Therefore, it is efficient that the first piezoelectric elements 381 to 381 are provided closer to any end parts, but avoiding the middle of the effective length of spring.

The first piezoelectric elements 381 to 381 are provided at the same position from the end part respectively, and can cause the same deformation by adjusting the output. Thereby, this allows to similarly deform the first plate-like spring members 371 and 371 made to be separated in the X direction while keeping the interval between the members 371 and 371, and to displace the first middle benches 351 and 351 only in the X direction while keeping the horizontal state.

Next, similar to the above-described first horizontal excitation means, the second horizontal excitation means that is the excitation means in the Y direction is configured from a total of eight second piezoelectric elements 382 to 382 which are stuck by two respectively in the front and back near the both ends of the two second plate-like spring member 372 and 372. The second piezoelectric elements 382 to 382 cause the elongation or contraction in the X direction by being applied with voltage, and can cause the displacement in the Y direction by causing the bending to the second plate-like spring members 372 and 372. Also the second piezoelectric elements 382 to 382 are attached at similar positions to the first piezoelectric elements 381 to 381, thereby this allows to similarly deform the second plate-like spring members 372 and 372 made to be separated in the Y direction while keeping the interval between the members 372 and 372, and to displace the second middle bench 352 only in the Y direction while keeping the horizontal state.

In addition, the vertical excitation means that is the excitation means in the Z direction is configured from a total of eight third piezoelectric elements 383 to 383 which are stuck by two respectively in the front and back near the both ends of two plate-like spring members 373 and 373 of the upper side of the plate-like spring members 373 to 373 provided up and down by two. The third piezoelectric elements 383 to 383 cause the elongation or contraction in the X direction by being applied with voltage, and can cause the displacement in the Z direction by causing the bending to the third plate-like spring members 373 and 373. Also the third piezoelectric elements 383 to 383 are attached at similar positions to the first piezoelectric elements 381 to 381 and the second piezoelectric elements 382 to 382, thereby this allows to similarly deform the third plate-like spring members 373 and 373 made to be separated in the Z direction while keeping the interval between the members 373 and 373, and to displace the movable seat 361 only in the Z direction while keeping the horizontal state. Note that, the third piezoelectric elements 383 to 383 can also be provided at two third plate-like spring members 373 and 373 which are provided at the lower side, and can also be provided at a total of four third plate-like spring members 373 to 373 of the upper side and the lower side.

As described above, by changing the voltage that can impart the displacement in each direction of the X, Y, and Z in the form of sinusoidal waves, periodic excitation force can be imparted, in each direction, with respect to the movable seat 361.

With respect to the vibration device 302 configured as described above, similar to the above-described first embodiment, as illustrated in FIG. 22, the control system unit 3 is configured, and by respectively applying the sinusoidal wave-like control voltage to the first piezoelectric element 381, the second piezoelectric element 382, and the third piezoelectric element 383, the periodic excitation forces for generating the vibration in each direction of the X, Y, and Z are caused.

The control system unit 3 is the same as explained in the first embodiment, is configured to be able to control the vibration device 302 similarly, and configures the article conveyance device 301 that is one of the article moving devices in combination with the vibration device 302.

Also in the article conveyance device 301 configured in this way, similar to the article conveyance device 1 in the first embodiment (see FIG. 1), the conveyance and sorting of the articles 9 loaded on the movable bench 306 (see FIG. 23) can be performed.

Specifically, also the vibration device 302 of the present embodiment, similar to the case of the first embodiment, can be represented schematically as illustrated in FIG. 10, and can obtain the characteristics as illustrated in FIG. 11 to FIG. 13. Then, by utilizing such characteristics, as explained using FIGS. 14(a) to 14(f) as the first embodiment, the conveyance and sorting of the articles 9 on the movable bench 6 (306) can be performed.

As described above, by using the vibration device 302 in the present embodiment, by configuring the article conveyance device 301 as the article moving device, the article 9 can be conveyed in any direction. In addition, for the vibration device 302 in the present embodiment, as described above, since the barycentric position relationship of the first to third mass bodies is configured, the barycentric position of portions elastically connected in the X direction via the first plate-like spring members 371 to 371 is configured to be almost the same in the horizontal direction and vertical direction, and the barycentric position of portions elastically connected in the Y direction via the second plate-like spring members 372 to 372 is configured to be almost the same in the horizontal direction and vertical direction, and then in the vibrations in the X direction and the Y direction, the generation of the rotation moment between the base 304 side and the movable bench 306 side can be suppressed. Thereby, this allows the base 304 to be elastically supported on the fixed bench 321 by the vibration isolation springs 322 to 322, but to keep the attitude stably without occurring the tilt. Therefore, the vibration can be caused stably at the side of the movable bench 306 supported by the base 304, and the highly accurate conveyance of the article 9 can be performed. Also, by stabilizing the attitude of the base 304, unnecessary vibration does not transmit with respect to the fixed bench 321 and installation surface, and transmission of vibration and generation of noise can be suppressed to contribute to improvement in the work environment.

In addition, since the first plate-like spring members 371 to 371 and the second plate-like spring members 372 to 372 are provided so as to be almost the same in the vertical direction with respect to the barycentric position of the first to third mass bodies, the excitation forces in the X direction and the Y direction by the first piezoelectric elements 381 to 381 and the second piezoelectric elements 382 to 382 is configured to act in the barycentric direction. Therefore, by stabilizing the attitude of the above-described first to third mass bodies, operation of the movable bench 306 can be more stabilized.

Also, in the vibration device 302 of the present embodiment, it is configured such that the counter weights 373f and 373f are provided at the movable bench 306 which configures a part of the above-described third mass body, and the barycentric position of the movable bench 306 is almost the same as the center between the third plate-like spring members 373 to 373. Therefore, when the vibrations are caused in the X and Y directions, the movable bench 306 is tilted from action of inertial force, without occurring the so-called swivel, the movable bench 306 can be more stably vibrated, and operation with higher accuracy can be performed.

In addition, by providing the peripheral wall part 342 at the base 304, the drive part 325 is protected, and displacement of the base 304 by counterforce of excitation force can be reduced because of increase in mass of the base 304 side, resulting in that operation stability of the movable bench 306 can be further improved.

As described above, the vibration device 302 according to the present embodiment is the vibration device 302 which comprises the base 304 supported on the ground surface via the vibration isolation spring 322, the movable bench 306 elastically supported with respect to the base 304, the first piezoelectric elements 381 to 381 that vibrates the movable bench 306 in the X direction, the second piezoelectric elements 382 to 382 that vibrates the movable bench 306 in the Y direction, and the third piezoelectric elements 383 to 383 that vibrates the movable bench 306 in the Z direction, and the vibration device 302 comprises the first middle benches 351 and 351 and the second middle bench 352 between the base 304 and the movable bench 306, and includes the plurality of first plate-like spring members 371 to 371, the plurality of second plate-like spring members 372 to 372, and the plurality of third plate-like spring members 373 to 373 that elastically connect the base 304, the first middle benches 351 and 351, the second middle bench 352, and the movable bench 306 sequentially in the X direction, the Y direction, and the Z direction, and is configured such that if the overall device is supposed as the first mass body, the second mass body, and the third mass body with the first plate-like spring members 371 to 371 and the second plate-like spring members 372 to 372 as the boundaries, respective barycentric positions of these mass bodies are almost the same in the vertical direction and horizontal direction.

Because of being configured in this way, by exciting vibration in three directions of two horizontal directions of the XY and the vertical direction (the Z direction), three-dimensional vibration can be caused to the movable bench 306, and even with a configuration in which the vibration isolation springs 322 to 322 are provided below the base 304, when the excitation force is caused in the horizontal direction, generation of the rotation moment can be suppressed and the attitude of the base 304 is stabilized, and vibration can be caused correctly to the movable bench 306. Also, without propagating the vibration with respect to the installation surface, transmission of vibration to the surroundings and generation of noise can be suppressed and the work environment can be improved.

In addition, since the barycentric position of the each mass body and the attachment position of respective plate-like spring members 371 to 373 are configured so as to be almost the same in the vertical direction, it is possible to cause the vibration with the attitude of the movable bench 306 further stabilized with respect to the two horizontal directions.

Also, since it is configured such that the plurality of the third plate-like spring members 373 to 373 are provided so as to be symmetrical to each excitation direction with the barycentric position of each mass body as the center, and the counter weights 373f and 373f to the movable bench 306 are provided at positions which are symmetrical with sandwiching the third plate-like spring members 373 to 373, unexpected vibrations such as the swivel of the movable bench 306 at the operation can also suppressed.

In addition, the peripheral wall part 342 raised from near the outer peripheral edge of the base 304 is provided, and since the peripheral wall part 342 is configured to surround the plate-like spring members 371 to 373 and piezoelectric elements 381 to 383, and configured to be as the barycentric adjustment member that adjusts the barycentric position of the base 304, the barycentric position of the base 304 can be raised to easily match the barycentric position for each of the above-described mass bodies, and the peripheral wall part 342 can function as a cover to protect the drive part 325.

In addition, the article conveyance device 301 as the article moving device according to the present embodiment is configured to comprise the vibration device 302 that is configured as described above, the vibration control means 31 that controls the each piezoelectric elements 381 to 383 so as to cause three-dimensional elliptical vibration trajectory to the movable bench 306 by simultaneously generating periodic excitation forces by the piezoelectric elements 381 to 383 as the plurality of excitation means which the vibration device 302 has, with the phase difference and at the same frequency, and the vibration switching means 32 that switches the amplitude and phase difference of the periodic excitation forces by each excitation means. Thereby, this allows to effectively be configured as the article conveyance device 301 having excellent controllability and being capable of conveying the article 9 on the movable bench 306 in any direction.

<Fifth Embodiment>

Figure 30:
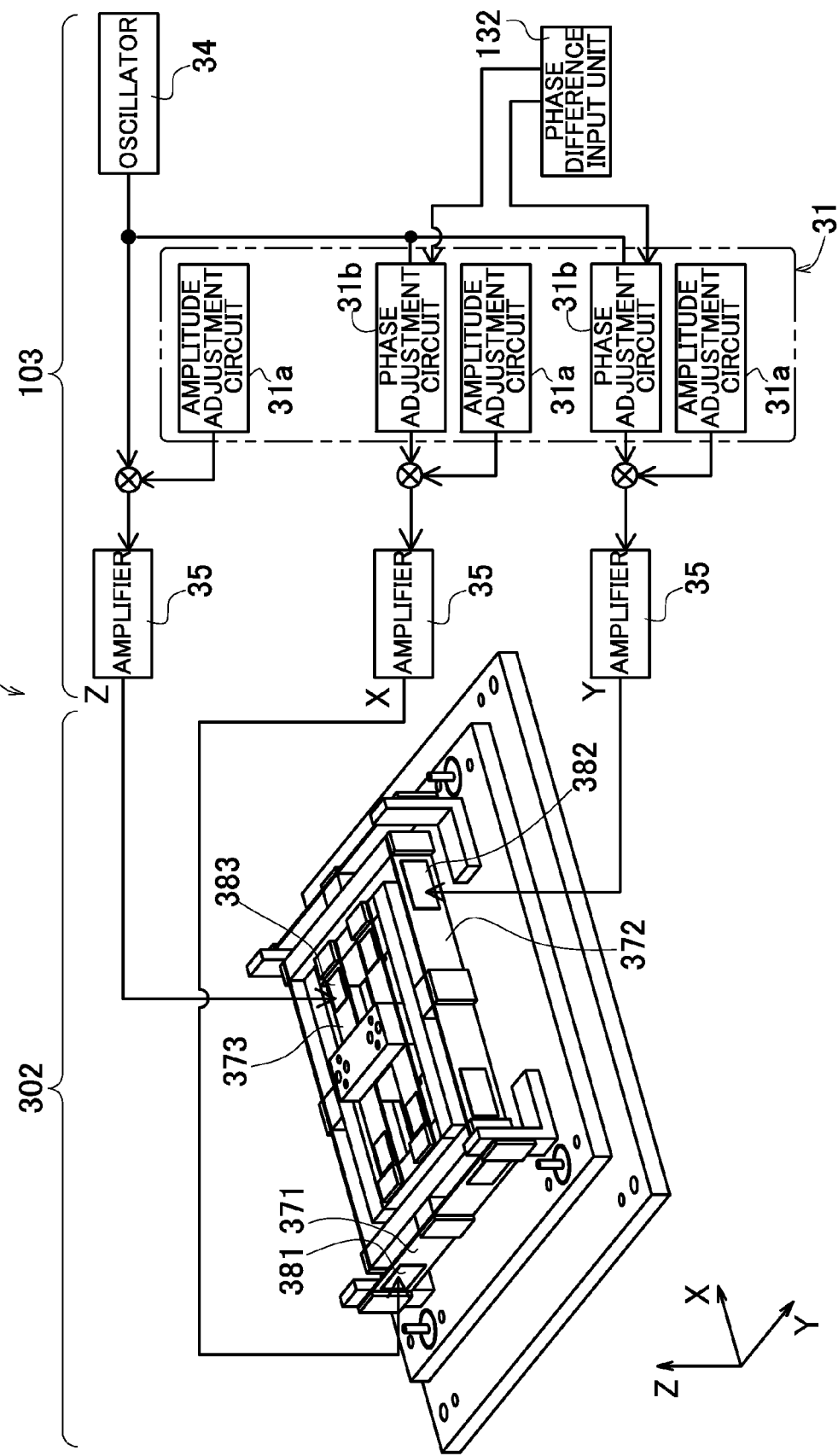
[FIG. 30]

As illustrated in FIG. 30, a fifth embodiment is one which configures an article sorting device 401 that is one of the article moving devices, using the same vibration device 302 as one in the fourth embodiment. The same signs are applied to the same portions as the fourth embodiment, and the explanation is omitted.

In this embodiment, the configuration as the vibration device 302 is similar to the case of the fourth embodiment, and only the control system unit 103 for controlling this device is different. The control system unit 103 uses the same unit illustrated in FIG. 15 as the second embodiment.

Therefore, the same action as explained using FIG. 16 to FIG. 20 in the second embodiment can be caused, and similar to this, the sorting of articles 9 can be performed preferably.

As described above, in the present embodiment, since the same device as the vibration device 302 explained in the fourth embodiment is used, the same effect as the vibration device 302 explained in the above-described fourth embodiment can be obtained.

In addition to that, the article sorting device 401 as the article moving device according to the present embodiment comprises the above-described vibration device 302, and the vibration control means 31 that controls the piezoelectric elements 381 to 383 so as to cause three-dimensional vibration trajectory to the movable bench 306 by simultaneously generating the periodic excitation forces by the piezoelectric elements 381 to 383 as the plurality of excitation means which the vibration device 302 has, with the phase difference and at the same frequency, and is configured to simultaneously sort the plurality of articles 9 loaded on the movable bench 306, by setting a phase difference between the periodic excitation force by the piezoelectric elements 381 and 382 as the horizontal excitation means and the periodic excitation force by the piezoelectric element 383 as the vertical excitation means, so as to move each article in a different direction on the basis of the magnitude with respect to the reference coefficient of friction, of coefficient of friction that respective articles has, respectively, with a predetermined reference coefficient of friction as the boundary.

By doing in this way, the article sorting device 401 having excellent controllability and being capable of sorting the plurality of articles 9 on the movable bench 306 in accordance with the coefficients of friction can be effectively configured.

<Sixth Embodiment>

Figure 31:
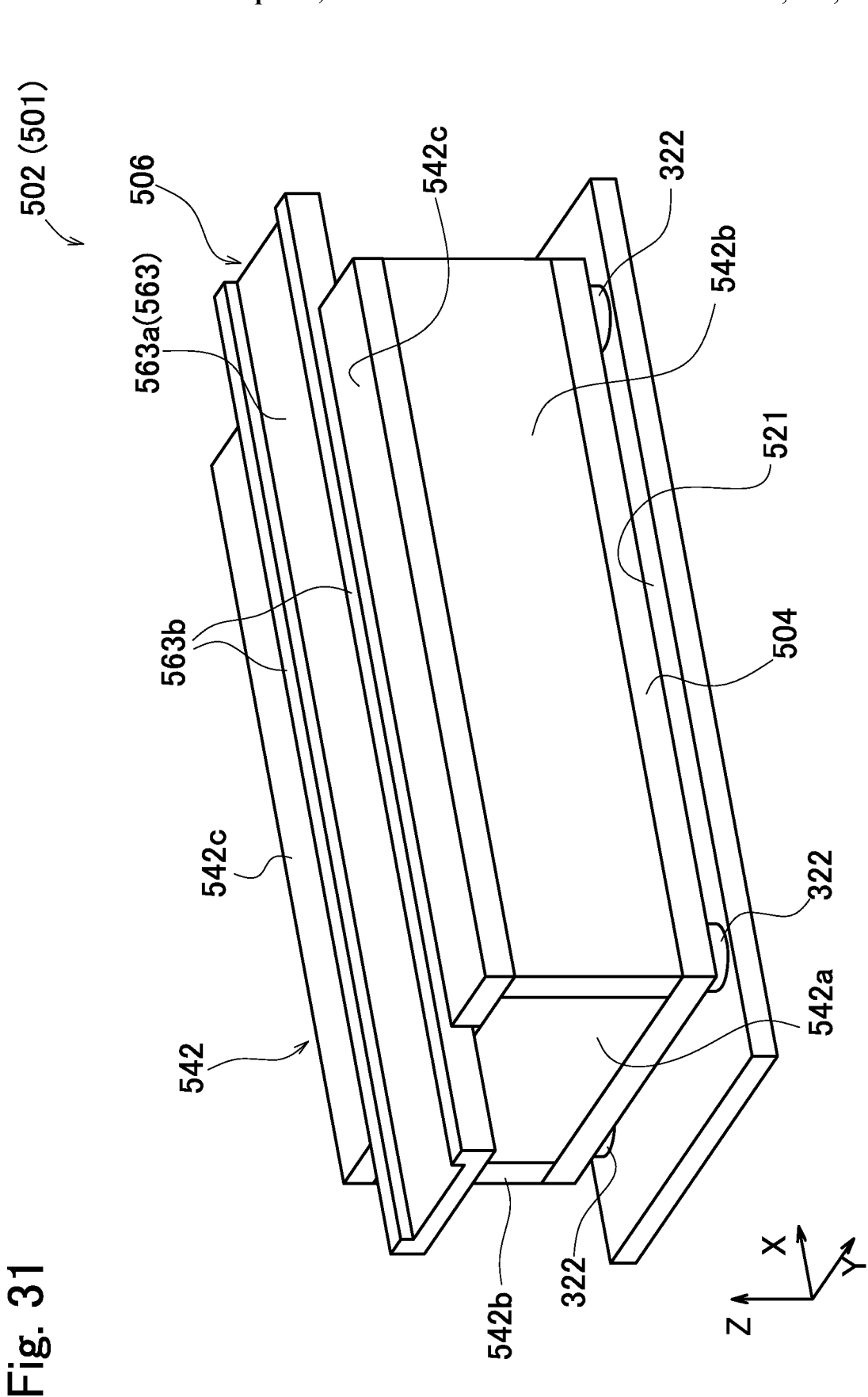
[FIG. 31]

As illustrated in FIG. 31, a sixth embodiment is configured as a vibration device 502 that is different from the device in the first to fifth embodiments. The same signs are applied to the same portions as the cases of the first to fifth embodiments, and the explanation is omitted.

As described later, the vibration device 502 can cause arbitrary elliptical vibration trajectories within the XZ plane by imparting excitation forces in the X direction and the Z direction with respect to a movable bench 506, and by adding the control system unit 3 (see FIG. 1 and FIG. 22) similar to the first embodiment and the fourth embodiment, an article moving device 501 comprising the control system unit 3 can be configured as an article conveyance device that performs the conveyance of articles with respect to the forward and backward directions of the X. In addition, by adding the control system unit 103 (see FIG. 15 and FIG. 30) similar to the second embodiment and the fifth embodiment, the article moving device 501 comprising the control system unit 103 can be configured also as an article sorting device that performs the sorting of articles with respect to the forward and backward directions of the X.

Although the detailed configuration explanation regarding the control system unit which is used in the present embodiment is omitted, it is sufficient to only have a configuration in which the phase adjustment circuit 31b, amplitude adjustment circuit 31a, and amplifier 35 for controlling excitation force in the Y direction are omitted from the control system unit 3 in FIG. 1 or FIG. 22 or the control system unit 103 in FIG. 15 or FIG. 30.

Figure 33:
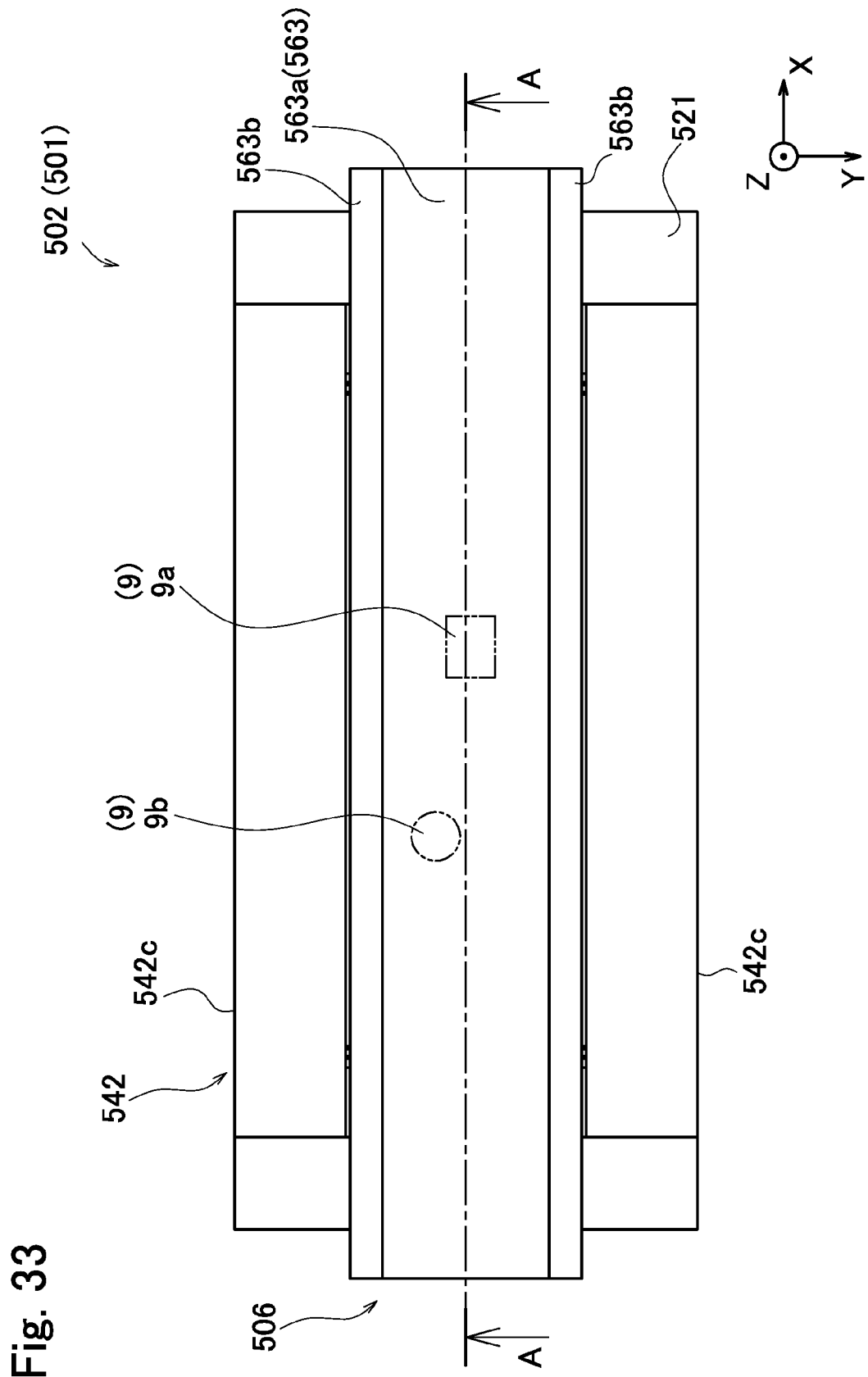
[FIG. 33]

For the vibration device 502 in the present embodiment, as illustrated in FIG. 31 and FIG. 33, a base 504 is elastically supported via the vibration isolation springs 322 to 322 at the top part of a fixed bench 521 formed like the rectangular plate. To the base 504, as described later, the movable bench 506 is elastically supported with respect to the X direction and the Z direction, and a peripheral wall part 542 is provided along outer peripheral edge of the base 504 so as to cover these support parts. The peripheral wall part 542 is configured by configuring lower part weights 542a to 542b composed of four blocks as the rectangular-shaped frame body, and by providing top part weights 542c and 542c composed of two blocks at the top part thereof.

At the top part of the movable bench 506, a mounting bench 563 extending in the X direction is provided, and the top face of the mounting bench 563 is configured to be able to load the article 9 as a mounting face 563a. Then, so as to sandwich the mounting face 563a in the width direction, step parts 563b and 563b are provided in the respective forward and backward directions of the Y, and therefore movement, in the Y direction, of the article 9 loaded on the mounting face 563a is regulated.

Figure 32:
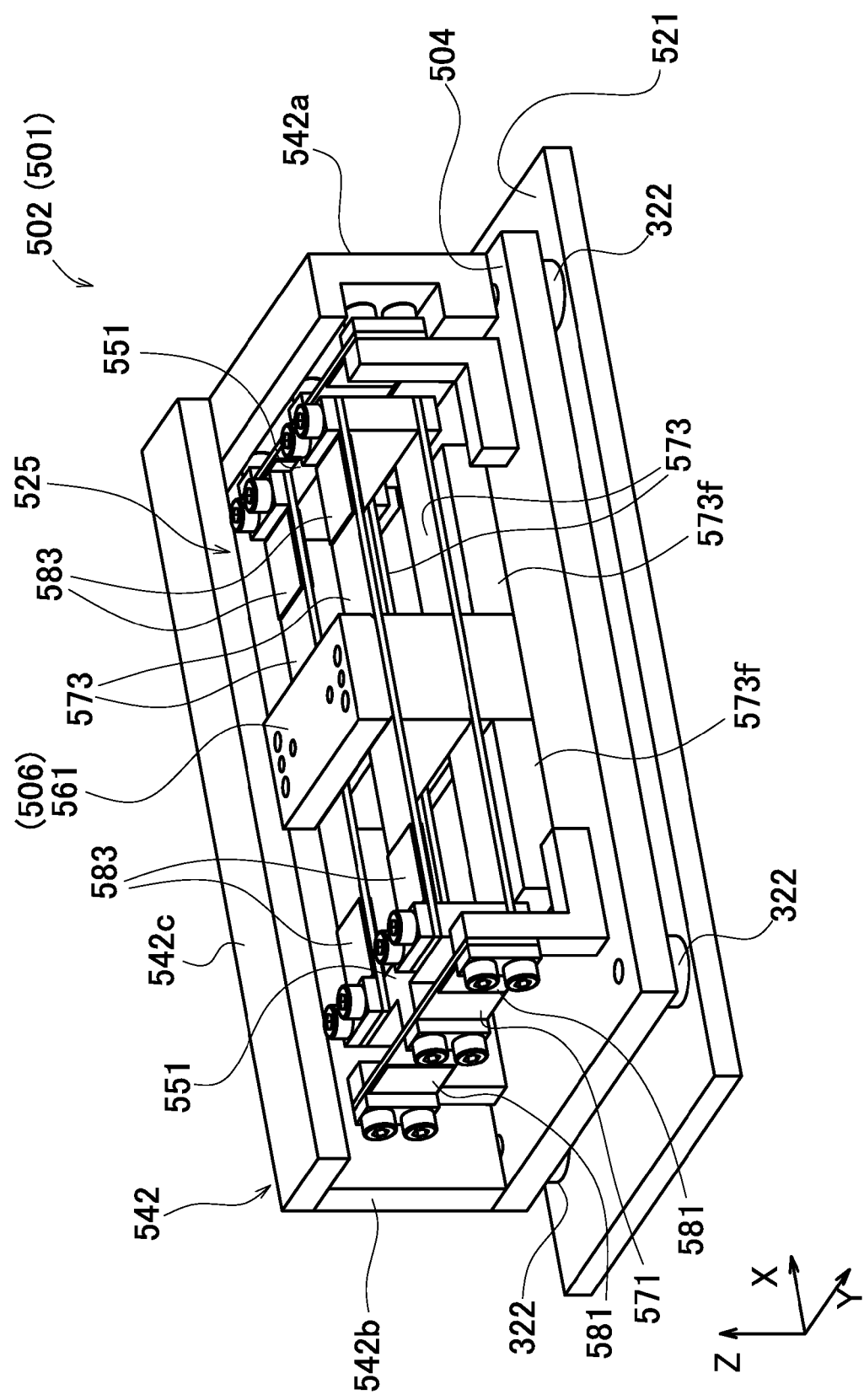
[FIG. 32]

A state where the mounting bench 563 and a part of the peripheral wall part 542 are removed from the state of FIG. 31 is illustrated in FIG. 32.

A basic configuration of the elastic support means and excitation means in which the movable bench 506 is as the center, is similar to the vibration device 302 in the fourth embodiment illustrated in FIG. 26, and can be a configuration that the second plate-like spring members 372 and 372 and the second piezoelectric elements 382 to 382 regarding the Y direction are removed from this configuration, and the third plate-like spring members 373 and 373 are supported directly with respect to the first middle benches 351 and 351.

If brief explanation is provided by using FIG. 32, first, with respect to the base 504, two middle benches 551 are elastically supported via two first plate-like spring members 571 and 571 configured to be able to displace elastically in the X direction that is the horizontal direction. In addition, with respect to a middle bench 551, a movable seat 561 is supported elastically via four third plate-like spring members 573 to 573 configured to be able to displace elastically in the Z direction that is the vertical direction.

Figure 34:
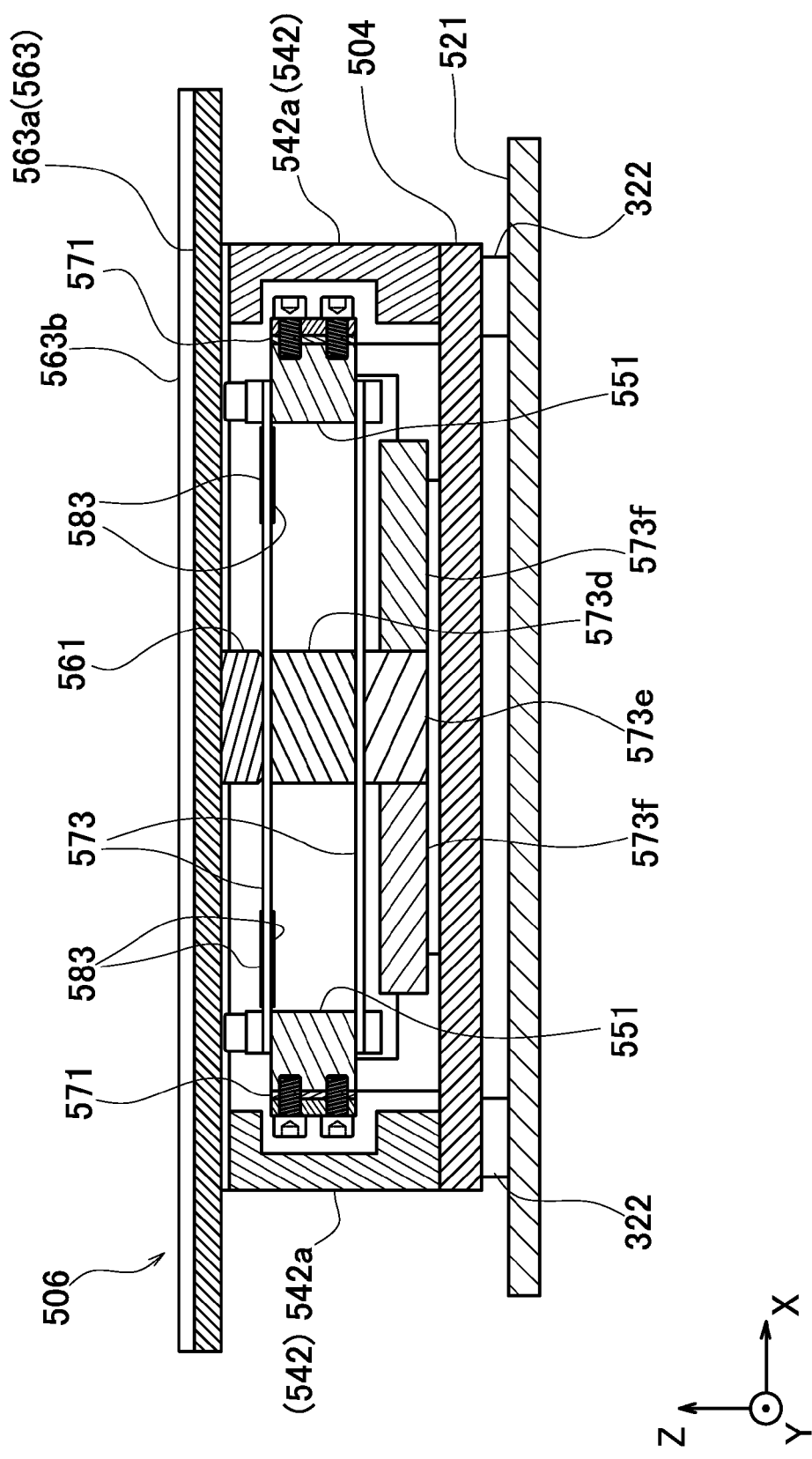
[FIG. 34]

Here, a cross-sectional arrow view taken along line A-A in FIG. 33 is shown in FIG. 34. As it can be seen from this figure, the third plate-like spring members 573 to 573 are disposed up and down in parallel with sandwiching a spring-to-spring block 573d, further, the movable seat 561 is provided at the top part thereof with sandwiching the third plate-like spring member 573, and a spring seat 573e is provided at the lower part with sandwiching the third plate-like spring member 573.

The movable seat 561 configures the movable bench 506 integrally with the mounting bench 563 by providing the mounting bench 563 at the top part of the movable seat 561.

Also, at the spring seat 573e, counter weights 573f and 573f are provided to balance with the movable bench 506, and it is configured to have a relationship that the barycentric position of overall movable bench 506 side that is elastically connected via the third plate-like spring members 573 to 573 is almost the same as the center position between the third plate-like spring members 573 and 573 in the horizontal direction and the vertical direction.

Also, with respect to this barycentric position, the center position of the third plate-like spring members 573 to 573 is also configured to be the same in the vertical direction. In addition, all of the middle benches 551 and 551, the first plate-like spring members 571 and 571, and the third plate-like spring members 573 to 573 are provided so as to be symmetrical with respect to each direction of the X, Y, and Z with the above-described barycentric position as the center. Therefore, the barycentric position of overall mass of the middle benches 551 and 551 side supported by the first plate-like spring member 571 and 571 is almost the same position as the center between the third plate-like spring members 573 to 573 in the horizontal direction and vertical direction.

In addition, by providing the peripheral wall part 542 with respect to the base 504, the barycentric position of the base 504 side is configured to be adjustable. By doing this, the barycentric position of the base 504 side is also almost the same position as the center between the third plate-like spring members 573 to 573 in the horizontal direction and vertical direction.

In other words for the above-described point, if the overall device is considered by replacing with two mass bodies composed of a mass body of the base 504 side and a mass body of the middle bench 551 side with the first plate-like spring member 571 and 571 as the boundary, it can be said to have a relationship in which the barycentric positions of these mass bodies are almost the same position in the horizontal direction and vertical direction.

Also, in the vibration device 502, with respect to members positioned above of the first plate-like spring members 571 and 571 and the third plate-like spring members 573 to 573, piezoelectric elements 581, 581, 583, and 583 are provided respectively, and the excitation of vibration in each direction can be performed by controlling the elements by the voltage.

When configuring the article moving device 501 using the vibration device 502 as the article conveyance device as described in the first embodiment and the fourth embodiment, the article 9 which is put on the mounting face 563a as illustrated in FIG. 33 can be conveyed in any direction of the forward direction or the backward direction of the X, further while changing speed. Also, when configuring the article moving device 501 as the article sorting device as described in the second embodiment and the fifth embodiment, if the articles 9 are the articles 9a and 9b having different coefficients of friction, both articles can be sorted by moving one article in the forward direction of the X while moving the other in the backward direction.

In a case that such operation is performed, because of having the relationship of the barycentric position as described above, the attitude of the base 504 can be stabilized, and vibration of the movable bench 506 is accurately caused. Also, the counter weights 573f and 573f are attached to the movable bench 506 and the barycentric position is made appropriate, and thereby the swivel phenomenon of the movable bench 506 can also be suppressed and the accuracy is further improved. In addition, the peripheral wall part 542 is provided with respect to the base 504, and thereby the drive part 525 can be protected, and the weight of the base 504 can be increased, operation of the base 504 by counterforce with respect to excitation force can be reduced, and the above-described effect can further be heightened.

As described above, the vibration device 502 in the present embodiment comprises the base 521 supported on the ground surface via the vibration isolation springs 322 to 322, the movable bench 506 elastically supported with respect to the base 521, the first piezoelectric elements 581 to 581 that vibrates the movable bench 506 in the horizontal direction, and the third piezoelectric elements 583 to 583 that vibrates the movable bench 506 in the vertical direction, and the vibration device comprises the middle benches 551 and 551 between the base 521 and the movable bench 506, and includes the plurality of first plate-like spring members 571 and 571 and the plurality of third plate-like spring members 573 to 573 that elastically connect the base 521, the middle bench 551, and the movable bench 506 in the horizontal direction and vertical direction sequentially, and is configured such that if the overall device is supposed as two mass bodies with the first plate-like spring members 571 and 571 as the boundary, respective barycentric positions of the mass bodies are almost the same in the vertical direction and horizontal direction.

Because of being configured in this way, elliptical vibration trajectory can be caused to the movable bench 506 by exciting vibration in the horizontal direction and vertical direction, and also when having a configuration in which the vibration isolation springs 322 to 322 are provided under the base 504, it becomes possible to suppress generation of rotation moment when excitation force is caused in the horizontal direction and to stabilize the attitude of the base 504, and to correctly cause vibrations to the movable bench 506. Also, without propagating the vibration with respect to the installation surface, transmission of vibration to the surroundings and generation of noise can be suppressed and the work environment can be improved.

<Seventh Embodiment>

Figure 35:
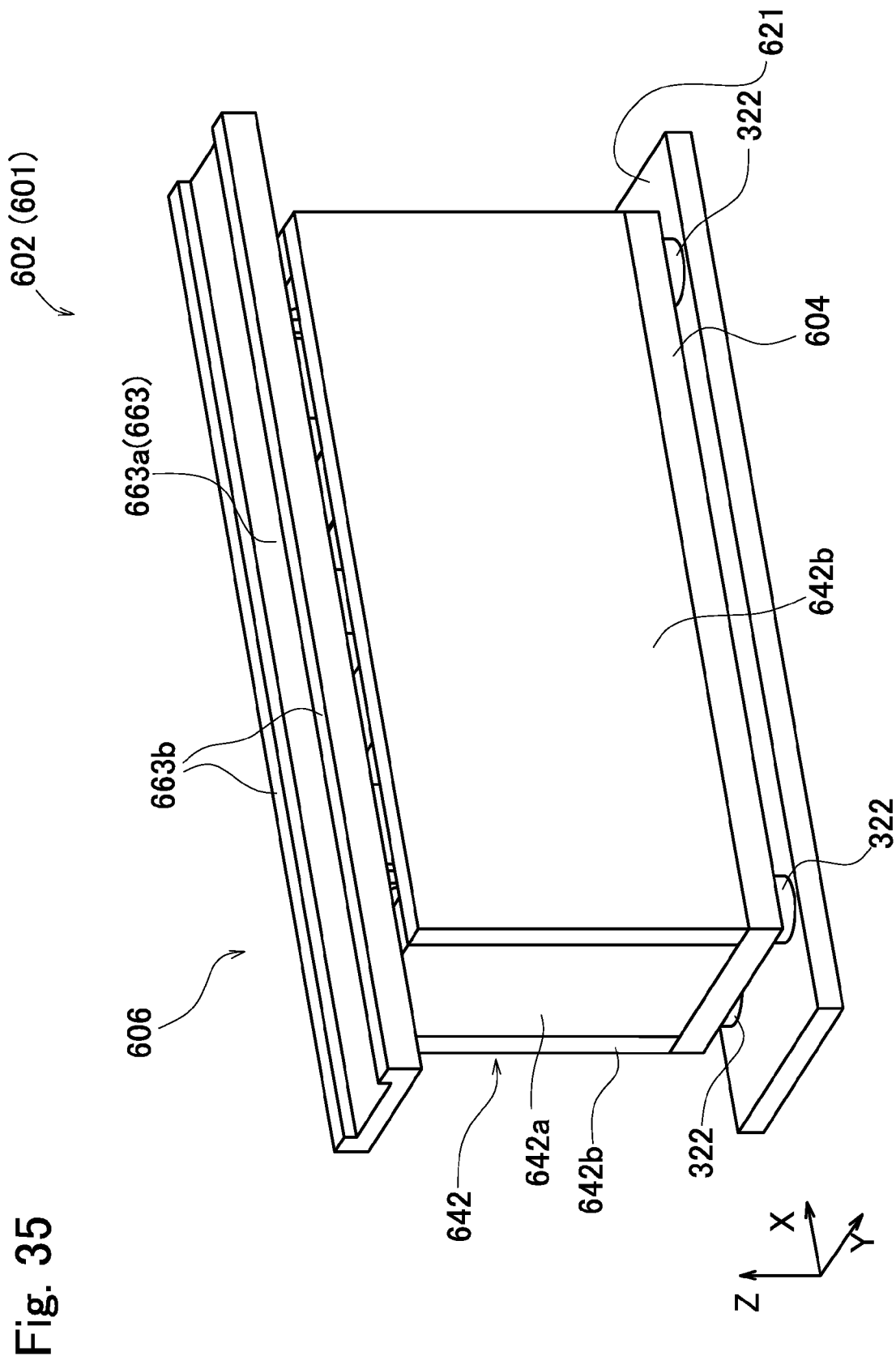
[FIG. 35]

A seventh embodiment is one that is configured as a vibration device 602 that differs from the device in the first to sixth embodiments, as illustrated in FIG. 35. The same signs are applied to the same portions as the cases of the first to six embodiments, and the explanation is omitted.

Similar to the case of the sixth embodiment, the vibration device 602 can cause arbitrary elliptical vibration trajectory within the XZ plane by imparting excitation forces in the X direction and the Z direction with respect to a movable bench 606, and as compared with the case of the vibration device 502 of the sixth embodiment (see FIG. 31), is configured so as to be larger in the height direction (the Z direction), and to be smaller in the machine width direction (the Y direction). Also in the vibration device 602, similar to the case of the sixth embodiment, by adding the control system unit 3 (see FIG. 1 and FIG. 22) similar to the first embodiment and the fourth embodiment, an article moving device 601 comprising the control system unit 3 can be configured as the article conveyance device that performs the conveyance of articles with respect to the forward and backward directions of the X, and by adding the control system unit 103 (see FIG. 15 and FIG. 30) similar to the second embodiment and the fifth embodiment, the article moving device 601 comprising the control system unit 103 can be configured as the article sorting device that performs the sorting of articles with respect to the forward and backward directions of the X.

Figure 37:
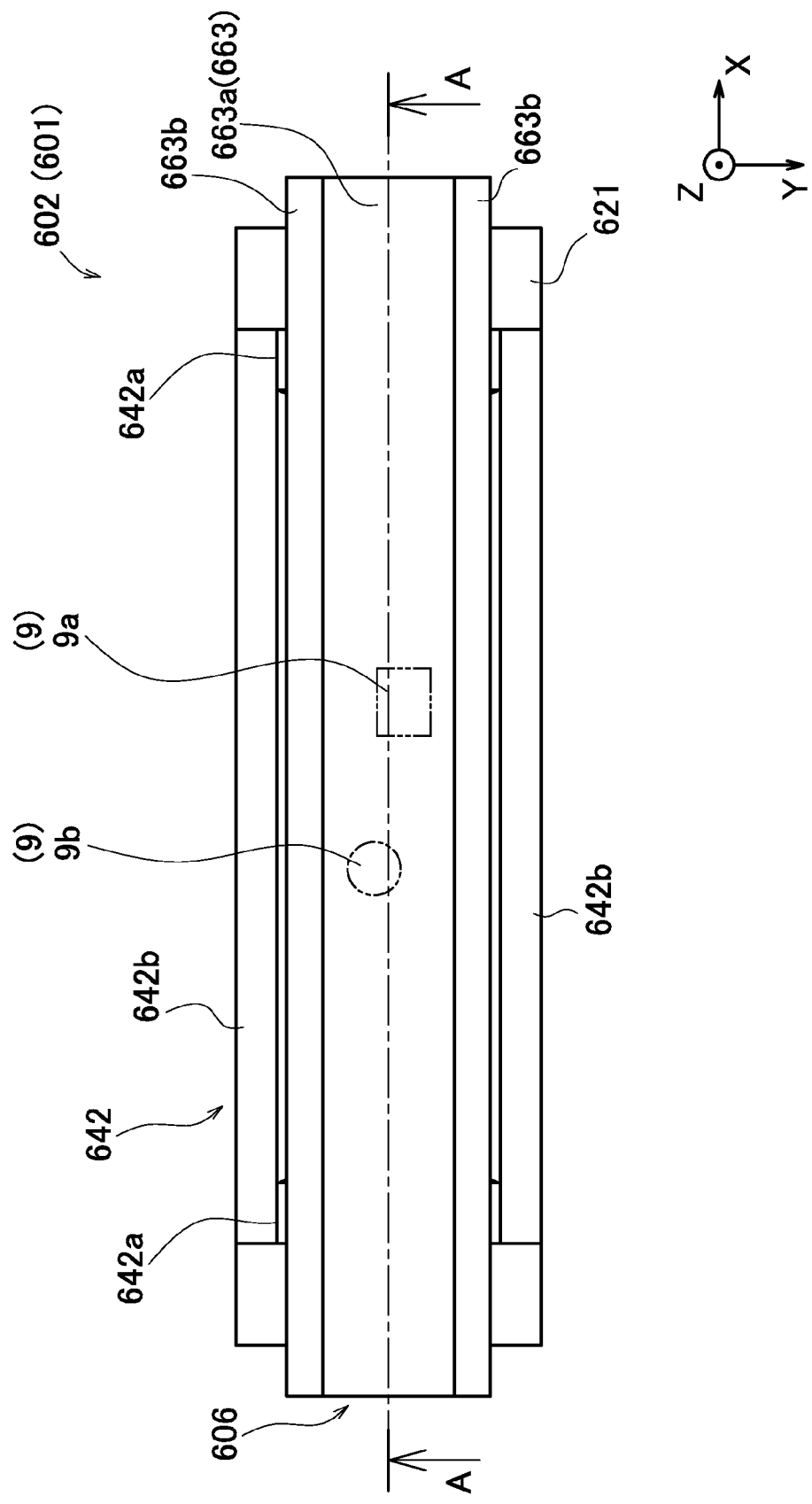
[FIG. 37]

For the vibration device 602 in the present embodiment, as illustrated in FIG. 35 and FIG. 37, at the top part of a fixed bench 621 formed like a rectangular plate extending in the X direction, a base 604 is elastically supported via the vibration isolation springs 322 to 322. With respect to the base 604, as described later, the movable bench 606 is elastically supported with respect to the X direction and the Z direction, and a peripheral wall part 642 is provided along an outer peripheral edge of the base 604 so as to cover these support part. The peripheral wall part 642 is configured as a rectangular-shaped frame body from weight members 642a to 642b composed of four blocks.

At the top part of the movable bench 606, a mounting bench 663 extending in the X direction is provided, and the top face of the mounting bench 663 is configured to be able to load the article 9 as a mounting face 663a. Then, so as to sandwich the mounting face 663a step parts 663b and 663b are provided in the forward and backward directions of the Y, respectively, so that movement, in the Y direction, of the article 9 loaded on the mounting face 663a is regulated.

Figure 36:
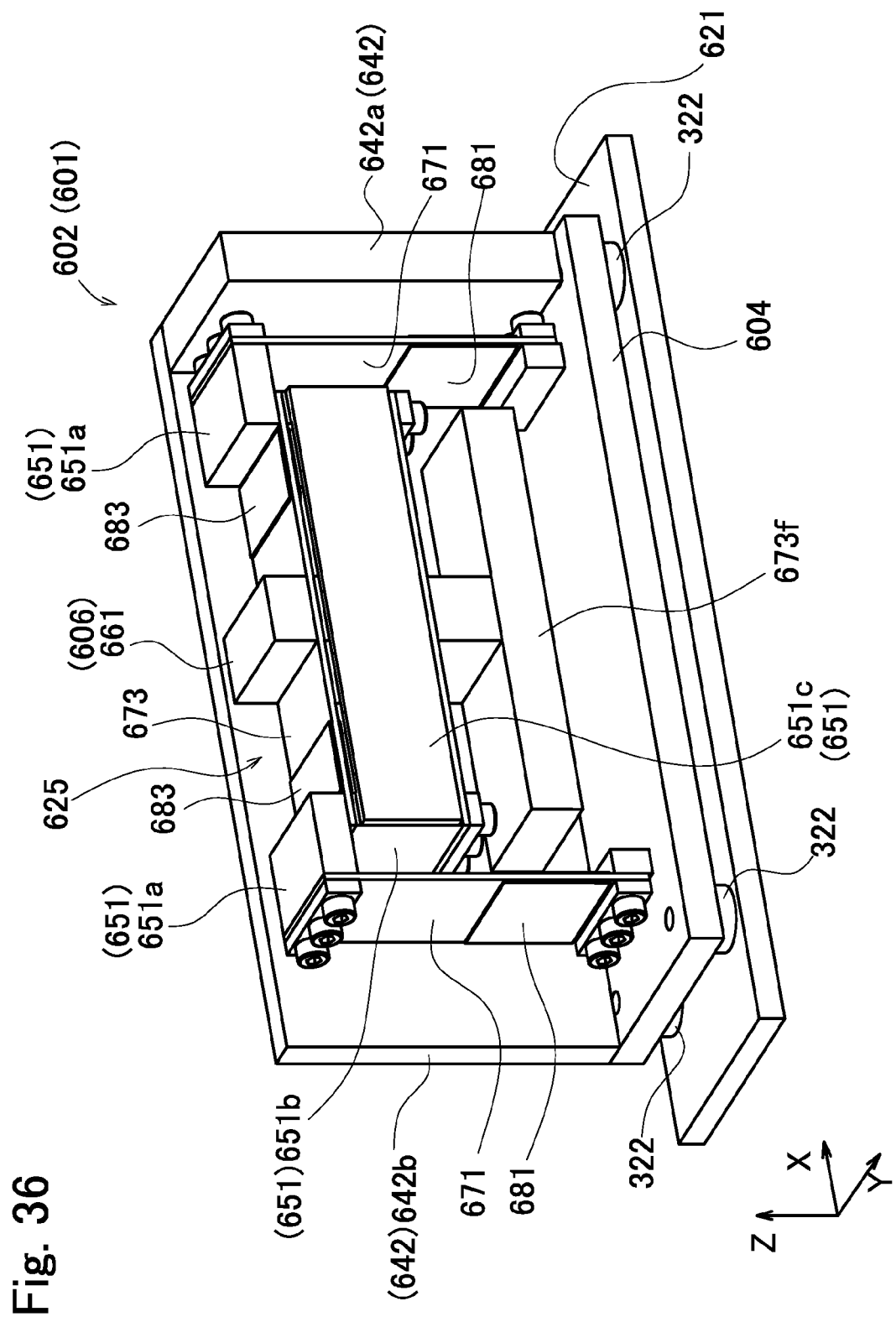
[FIG. 36]

A state where the mounting bench 663 and a part of the peripheral wall part 642 are removed from the state of FIG. 35 is illustrated in FIG. 36.

A basic configuration of elastic support means and excitation means with the movable bench 606 as the center is approximately similar to the vibration device 502 in the sixth embodiment illustrated in FIG. 32, and is different from the attachment direction of the first plate-like spring members 571 and 571 for elastically supporting the movable bench 506 side in the X direction with respect to the base 504, and from the configuration of the middle benches 551 and 551.

If brief explanation is provided by using FIG. 36, first, with respect to the base 604, a pair of first plate-like spring members 671 and 671 is disposed in parallel while being separated in the X direction, and are attached so as to be raised in the Z direction. Then, at the top parts thereof, two blocks 651a and 651a that configure a part of a middle bench 651 are connected. By doing this, the blocks 651a and 651a are elastically supported with respect to the base 604 in the X direction.

In addition, across the blocks 651a and 651a, a pair of third plate-like spring members 671 and 671 disposed by facing each other up and down while directing the normal line direction in the Z direction is provided, so that a movable seat 661 is elastically supported in the Z direction by being supported by these members. Between each end part of the pair of third plate-like spring members 671 and 671, blocks 651b and 651b are provided, so that parallelism between the third plate-like spring members 671 and 671 can be kept. Also, in order to be able to retain these positional relationships, a pair of plates 651c and 651c is provided as reinforcement members, and it is configured so as to be sandwiched by these plates. The above-described blocks 651a and 651a, blocks 651b and 651b, and plates 651c and 651c are configured to configure one middle bench 651 as the rigid body, and to keep an almost constant form.

Figure 38:
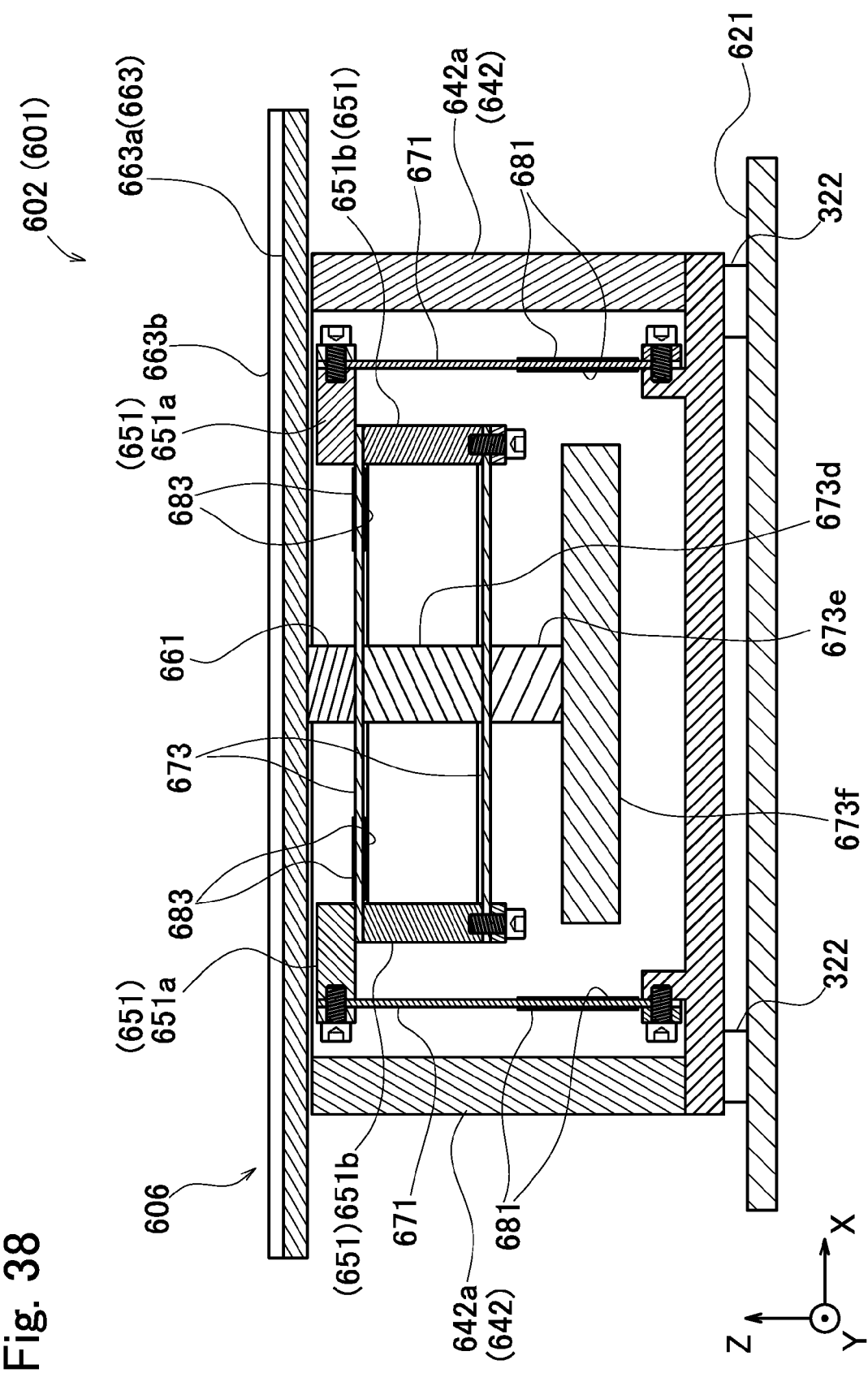
[FIG. 38]

Here, a cross-sectional arrow view taken along line A-A in FIG. 37 is illustrated in FIG. 38. As it can be seen from this figure, the third plate-like spring members 673 and 673 are disposed up and down in parallel with sandwiching a spring-to-spring block 673d, and furthermore the movable seat 661 is provided at the top part thereof with sandwiching the third plate-like spring member 673, and a spring seat 673e is provided at the lower part thereof with sandwiching the third plate-like spring member 673.

The movable seat 661 configures the movable bench 606 integrally with the mounting bench 663 by providing the mounting bench 663 at the top part of the movable seat 661.

Also, at the spring seat 673e, a counter weight 673f is provided to balance with the movable bench 606, and it is configured to have a relationship that the barycentric position of the overall movable bench 606 side that is elastically connected via the third plate-like spring members 673 and 673 is almost the same as the center position between the third plate-like spring members 673 and 673 in the horizontal direction and vertical direction.

In addition, a relationship of the barycentric position between masses with the first plate-like spring members 671 and 671 as the boundary, and a relationship of the barycentric position between masses with the third plate-like spring members 673 and 673 as the boundary are also configured similarly to the sixth embodiment. It can be said that a different point from the sixth embodiment is only a point where the center between the third plate-like spring members 673 and 673 and the center between the first plate-like spring members 671 and 671 are configured by slightly shifting in the Z direction.

Also when being configured as described above, similar to the case of the sixth embodiment, with respect to the movable bench 606, vibrations can be caused in the X and Z directions, and the articles can be conveyed and sorted by adding the control system unit to be configured as the article moving device 601.

The vibration device 602 in this embodiment can stabilize the attitude of the base 604 during the operation and cause vibrations of the movable bench 606 accurately, by having a barycentric position relationship similar to the case of the sixth embodiment. Also, the counter weight 673f is attached with respect to movable bench 606 and the barycentric position is made appropriate, thereby, the swivel phenomenon is suppressed, and operation accuracy is further improved. In addition, the peripheral wall part 642 is provided with respect to the base 604, so that a drive part 625 can be protected, and the weight of the base 604 can be increased to reduce operation of the base 604 by counterforce with respect to excitation force, and the above-described effect can be enhanced.

Note that, the specific configurations of the respective components are not limited only to the above-described first to seventh embodiments.

For example, in the first embodiment, the excitation means 81 to 83 in each direction are configured to impart excitation force in respective directions of the X, Y, and Z orthogonal to each other, however, as long as vibration trajectory that is three-dimensionally combined together can be created/changed to the movable bench 6, it is not needed necessarily to be made orthogonal to each other, but merely respective directions may be made to cross. Also, it is not needed to set each excitation means 81 to 83 strictly in the vertical and horizontal directions, and various utilization modes, such as tilting the base 4 and installing the base 4 vertically, are also possible. More specifically, if the excitation means is obliquely provided, excitation force including components in a plurality of directions of the horizontal and vertical directions can also be caused by one excitation means. These points are similar also in the other second to seventh embodiments.

Also, in the first embodiment, although configured as a unimorph type in which the first to third piezoelectric elements 81 to 83 to be stuck on the first to third plate-like spring members 71 to 73 are provided at either face of back and front, it can also be configured as a bimorph type in which the first to third piezoelectric elements are provided at both faces so as to further increase excitation force. These points are similar also in the other second to seventh embodiments, and can be configured in any of the unimorph type and the bimorph type.

Also, in the first embodiment, as described in FIG. 4, the first to third piezoelectric elements 81 to 83 are respectively stuck on outer half of the first to third plate-like spring members 71 to 73, but can be configured to be stuck on inner half, and also, can be configured to be provided on outer half and inner half, respectively. Also, respective piezoelectric elements 81 to 83 are stuck on outer half of the plate-like spring members 71 to 73, respectively, but can also be configured to be stuck on inner half by reversing this configuration, and can also be configured to be provided on outer half and inner half, respectively. Also these points can be said as being similar in the other second to seventh embodiments.

In addition, the first embodiment has the configuration that the first to third plate-like spring members 71 to 73 are supported at end parts respectively while supporting another member in the middle, but the first to third plate-like spring members 71 to 73 can be configured as two plate-like spring members respectively by dividing near the middle. Also such a point can be said as being similar in the other second to seventh embodiments.

Also, in the first embodiment, the first to third plate-like spring members 71 to 73 for performing elastic support, and the piezoelectric element as the first to third excitation means 81 to 83 that perform excitation in each direction are integrally configured, however, if requirement for reducing in size is low, an electromagnet can be used as the excitation means to configure independently of the plate-like spring members 71 to 73. This point is also similar in the other second to seventh embodiments, and these embodiments can have the configuration using the electromagnet.

Also, in the above-described embodiment, with reference to the phase of periodic excitation force in the Z direction, the control circuit is configured to adjust the phase of periodic excitation force in the X direction and periodic excitation force in the Y direction, however, as long as the phase difference between the periodic excitation force in the Z direction and each periodic excitation force in the X direction and the Y direction can be set as a predetermined value, the control circuit may be configured to change the phase of periodic excitation force of direction.

As the vibration isolation spring 322 illustrated in the fourth embodiment, as long as having a sufficiently lower spring constant with respect to the plate-like spring members 371 to 373, a metal spring configuration, or a configuration from an elastic body such as rubber can favorably be used without any inconvenience. This point is similar also in the other fifth to seventh embodiments.

Various other changes may be applied to other configurations without departing from the spirit and scope of the present invention.

INDUSTRIAL APPLICABILITY

According to the above detailed first invention, it is possible to provide a vibration device capable of effectively elastically supporting a movable bench while having the simple configuration, and of suppressing the pitching and rolling of the movable bench because of low height up to the conveyance surface, and an article conveyance device and an article sorting device having excellent controllability and using the vibration device. Also, according to the second invention, it is possible to provide a vibration device capable of stabilizing the attitude of a base even with the mode in which the base is supported via a vibration isolation spring because the rotation moment that occurs, at the time when the excitation force is allowed to act on a movable bench, can be suppressed, of improving operation accuracy by further stabilizing the vibration of the movable bench to be supported by the base, and of preventing noise and vibration etc., by suppressing the propagation of vibration to the installation surface to improve the work environment, and an article conveyance device and an article sorting device having excellent controllability and using the vibration device.

REFERENCE SIGNS LIST

1 . . . article conveyance device (article moving device)
2 . . . vibration device
3 . . . control system unit
4 . . . base
6 . . . movable bench
9, 9a, 9b . . . article
31 . . . vibration control means
32 . . . vibration switching means
33 . . . conveyance path determination means
34 . . . oscillator
35 . . . control voltage amplifier
42 . . . cover
51 . . . first middle bench
52 . . . second middle bench
61 . . . movable seat
62 . . . movable plate
63 . . . conveyance bench
71 . . . first plate-like spring member (first horizontal elastic support means)
72 . . . second plate-like spring member (second horizontal elastic support means)
71 . . . third plate-like spring member (vertical elastic support means)
81 . . . first piezoelectric element (first horizontal excitation means)
82 . . . second piezoelectric element (second horizontal excitation means)
83 . . . third piezoelectric element (vertical excitation means)
101 . . . article sorting device (article moving device)
132 . . . phase difference input unit
322 . . . vibration isolation spring
373f . . . counter weight

The invention claimed is:

1. A vibration device comprising a base, a movable bench elastically supported with respect to the base, a first horizontal excitation unit that vibrates the movable bench in a first horizontal direction, a second horizontal excitation unit that vibrates the movable bench in a second horizontal direction that crosses the first horizontal direction, and a vertical excitation unit that vibrates the movable bench in a vertical direction, the vibration device comprising:
  a first middle bench and a second middle bench between the base and the movable bench, and the vibration device including:
  a first horizontal elastic support unit configured to vibrate in the first horizontal direction;
  a second horizontal elastic support unit configured to vibrate in the second horizontal direction; and
  a vertical elastic support unit that elastically connect the base, the first middle bench, the second middle bench, and the movable bench sequentially in the first horizontal direction, the second horizontal direction, and the vertical direction, wherein
  the first horizontal elastic support unit is configured from a first plate-like spring member with a thickness direction approximately matching to the first horizontal direction and with a longitudinal direction arranged in a horizontal direction, the second horizontal elastic support unit is configured from a second plate-like spring member with a thickness direction approximately matching to the second horizontal direction and with a longitudinal direction arranged in a horizontal direction, the vertical elastic support unit is configured from a third plate-like spring member with a thickness direction approximately matching to the vertical direction and with a longitudinal direction arranged in a horizontal direction, the first horizontal direction is X-direction and the second horizontal direction is Y-direction, the first horizontal elastic support unit elastically supports the first middle bench respective to the base in the first horizontal direction, the second horizontal elastic support unit is connected to the first middle bench and elastically supports the second middle bench in the second horizontal direction, the vertical elastic support unit is connected to the second middle bench and elastically supports the movable bench in the vertical direction; and the base, the first middle bench, the second middle bench, the first horizontal elastic support unit, the second horizontal elastic support unit, and the vertical elastic support unit are located below said movable bench.

2. The vibration device according to claim 1, wherein at least any of the first to third plate-like spring members are provided in parallel in plural while being separated at a predetermined distance.

3. The vibration device according to claim 1, wherein the first and second horizontal excitation units and the vertical excitation unit are piezoelectric elements that are stuck on at least one face of the first to third plate-like spring members, and the first to third plate-like spring members are vibrated by applying sinusoidal voltage to these piezoelectric elements to cause periodic elongation.

4. The vibration device according to claim 2, wherein the first and second horizontal excitation units and the vertical excitation unit are piezoelectric elements that are stuck on at least one face of the first to third plate-like spring members, and the first to third plate-like spring members are vibrated by applying sinusoidal voltage to these piezoelectric elements to cause periodic elongation.

5. The vibration device according to claim 1, wherein spring seats are provided between at least any of the base and the first middle bench and the first plate-like spring member, and between at least any of the first middle bench and the second middle bench and the second plate-like spring member, respectively, and positions of the spring seats are configured to be changeable with respect to the longitudinal directions of the first and the second plate-like spring members, respectively.

6. An article conveyance device that conveys the article loaded on a movable bench by vibration of the movable bench, the article conveyance device comprising:

the vibration device according to claim 1, a vibration control unit that controls each excitation unit so as to simultaneously generate periodic excitation force by a plurality of the excitation units which the vibration device has, with a phase difference and at the same frequency, to cause three-dimensional vibration trajectory to the movable bench, and a vibration switching unit that switches an amplitude and the phase difference of the periodic excitation force by the each excitation unit.

7. An article sorting device that sorts a plurality of articles loaded on a movable bench by vibration of the movable bench, the article sorting device comprising:

the vibration device according to claim 1, and a vibration control unit that controls each excitation unit so as to simultaneously generate periodic excitation force by a plurality of the excitation units which the vibration device has, with a phase difference and at the same frequency, to cause three-dimensional vibration trajectory to the movable bench, wherein by setting a phase difference between the periodic excitation force by the horizontal excitation units and periodic excitation force by the vertical excitation unit, so as to move each article to a different direction on the basis of the magnitude, with respect to a reference coefficient of friction, of coefficient of friction which individual article has, with the predetermined reference coefficient of friction as a boundary, the plurality of articles loaded on the movable bench are simultaneously sorted.

\* \* \* \* \*